Sept. 19, 1939. W. T. GOLLWITZER Re. 21,208
PRINTING MACHINE
Original Filed Feb. 24, 1936 17 Sheets-Sheet 1
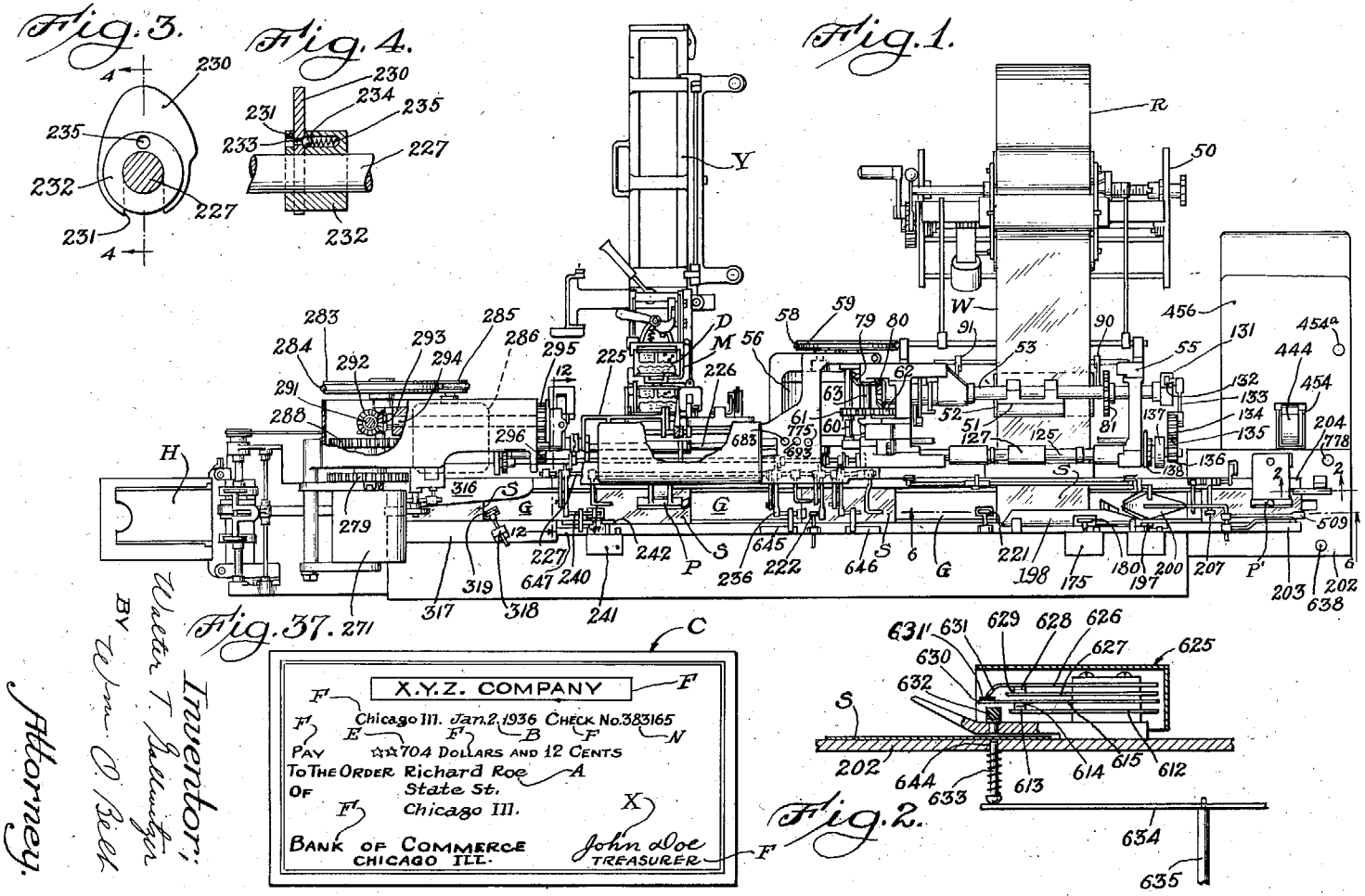
Inventor;
Walter T. Gollwitzer
By Wm. O. Belt
Attorney.

Sept. 19, 1939. W. T. GOLLWITZER Re. 21,208

PRINTING MACHINE

Original Filed Feb. 24, 1936 17 Sheets-Sheet 2

Inventor;
Walter T. Gollwitzer
BY Wm. O. Belt
Attorney.

Sept. 19, 1939. W. T. GOLLWITZER Re. 21,208

PRINTING MACHINE

Original Filed Feb. 24, 1936 17 Sheets-Sheet 3

Inventor;
Walter T. Gollwitzer
BY Wm. O. Belt
Attorney.

PRINTING MACHINE

Original Filed Feb. 24, 1936 17 Sheets-Sheet 4

Inventor;
Walter T. Gollwitzer
BY Wm. O. Belt
Attorney.

PRINTING MACHINE
Original Filed Feb. 24, 1936 17 Sheets-Sheet 5
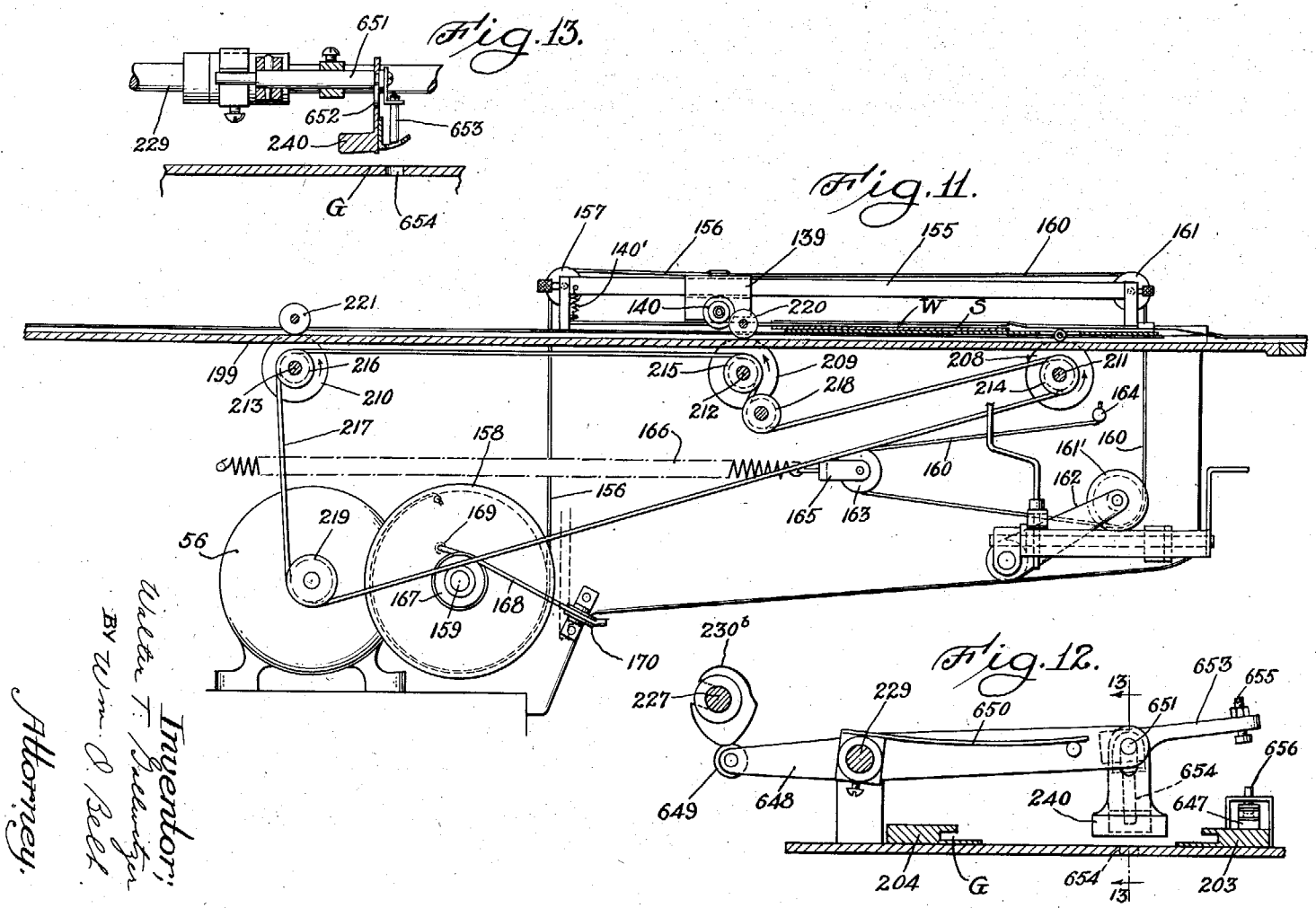
Inventor;
Walter T. Gollwitzer
BY Wm. O. Belt
Attorney.

Sept. 19, 1939. W. T. GOLLWITZER Re. 21,208

PRINTING MACHINE

Original Filed Feb. 24, 1936 17 Sheets-Sheet 6

Inventor;
Walter T. Gollwitzer
BY
Wm. O. Belt
Attorney.

PRINTING MACHINE
Original Filed Feb. 24, 1936 17 Sheets-Sheet 7
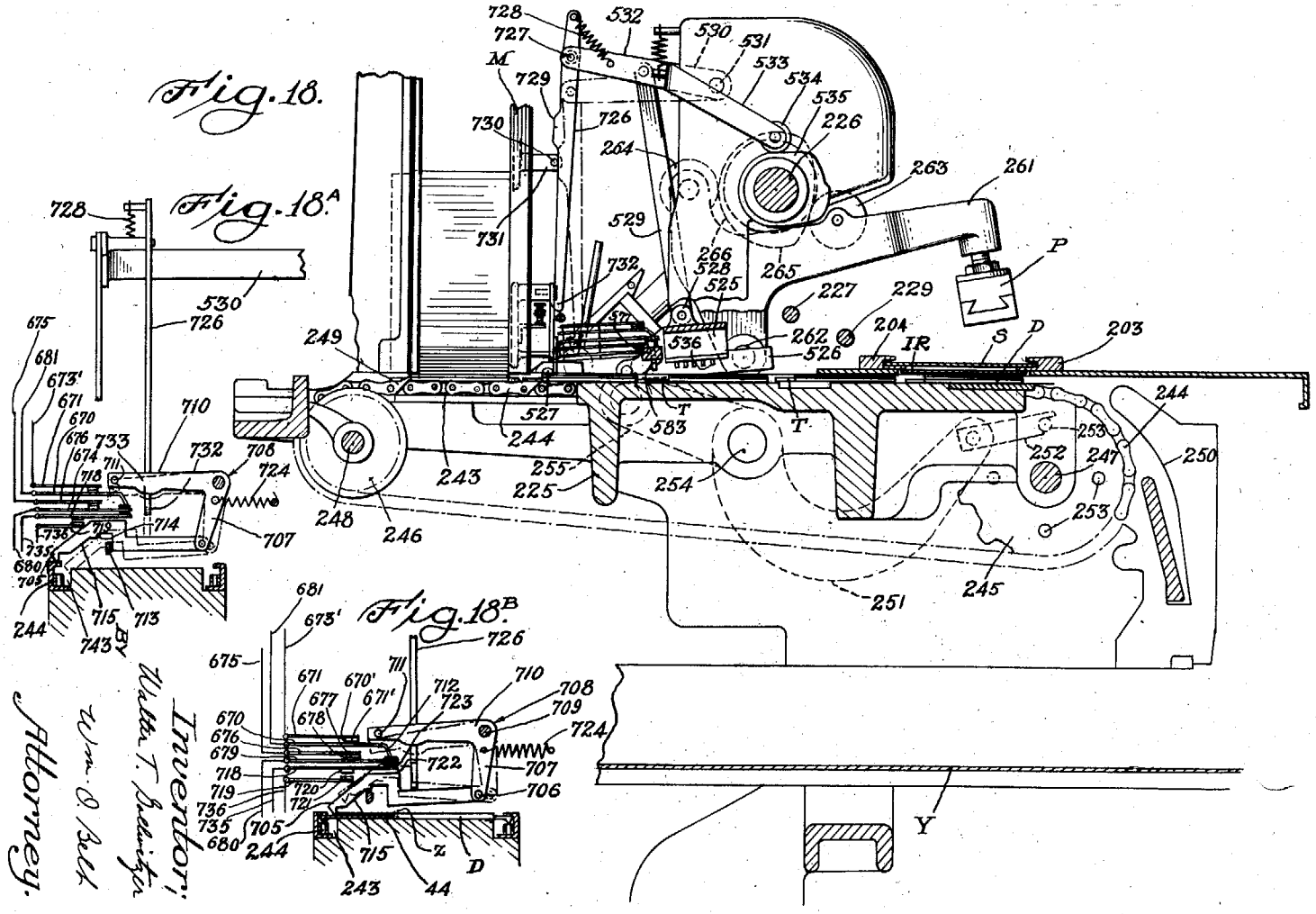

Sept. 19, 1939. W. T. GOLLWITZER Re. 21,208

PRINTING MACHINE

Original Filed Feb. 24, 1936 17 Sheets-Sheet 8

Inventor;
Walter T. Gollwitzer
BY
Wm. O. Belt
Attorney.

PRINTING MACHINE

Original Filed Feb. 24, 1936 17 Sheets-Sheet 9

Inventor;
Walter T. Gollwitzer
BY Wm O. Belt
Attorney.

PRINTING MACHINE

Original Filed Feb. 24, 1936 17 Sheets-Sheet 10

Inventor;
Walter T. Gollwitzer
BY
Wm. O. Belt
Attorney.

Sept. 19, 1939. W. T. GOLLWITZER Re. 21,208

PRINTING MACHINE

Original Filed Feb. 24, 1936 17 Sheets-Sheet 11

Inventor;
Walter T. Gollwitzer
BY
Wm. O. Belt
Attorney.

Sept. 19, 1939. W. T. GOLLWITZER Re. 21,208

PRINTING MACHINE

Original Filed Feb. 24, 1936 17 Sheets-Sheet 12

Inventor;
Walter T. Gollwitzer
BY
Wm. O. Belt
Attorney.

Sept. 19, 1939. W. T. GOLLWITZER Re. 21,208

PRINTING MACHINE

Original Filed Feb. 24, 1936 17 Sheets-Sheet 13

Inventor;
Walter T. Gollwitzer
BY Wm. O. Belt
Attorney.

Sept. 19, 1939. W. T. GOLLWITZER Re. 21,208
PRINTING MACHINE
Original Filed Feb. 24, 1936 17 Sheets-Sheet 14
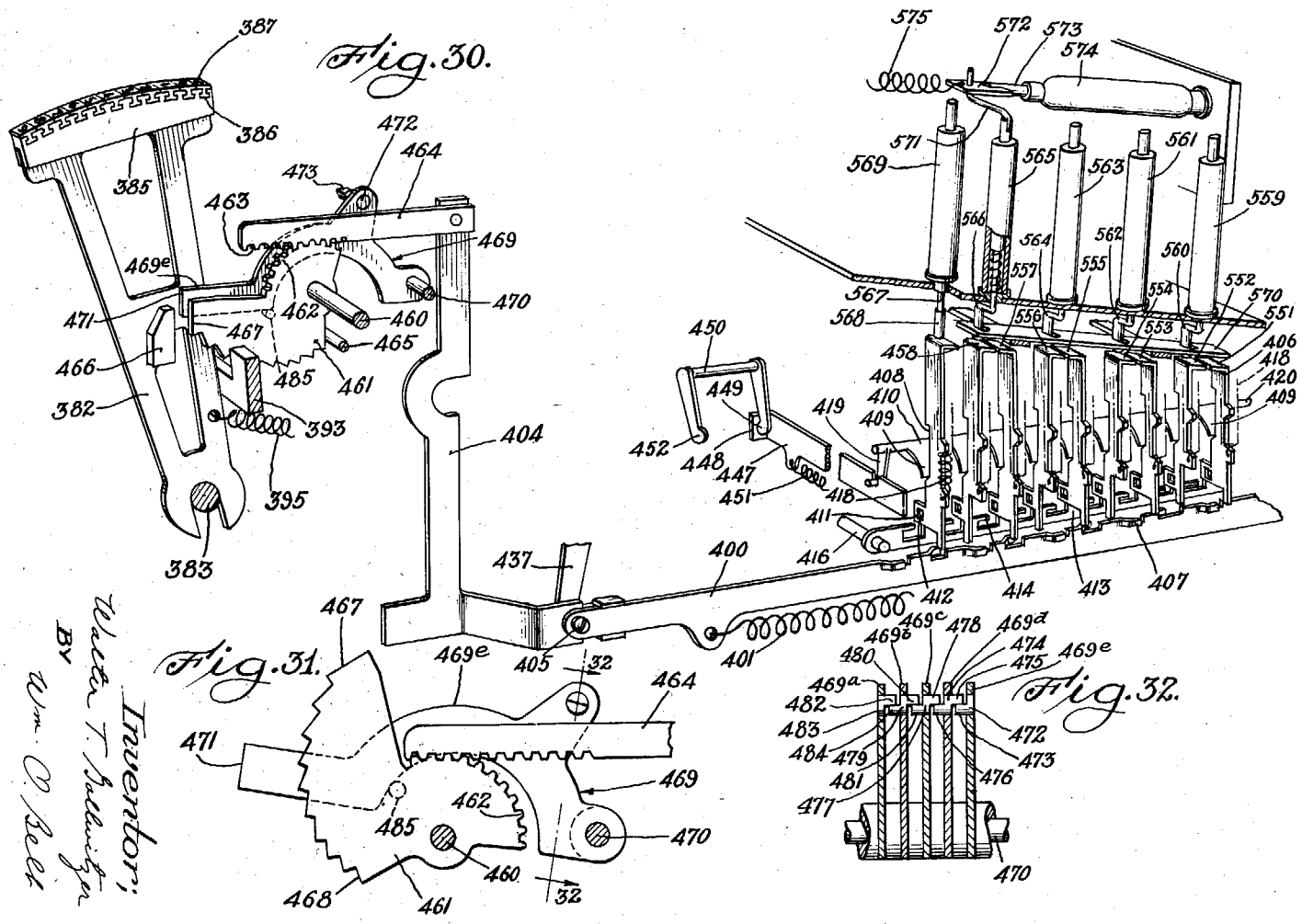
Inventor;
Walter T. Gollwitzer
BY
Wm. O. Belt
Attorney.

PRINTING MACHINE
Original Filed Feb. 24, 1936 17 Sheets-Sheet 15
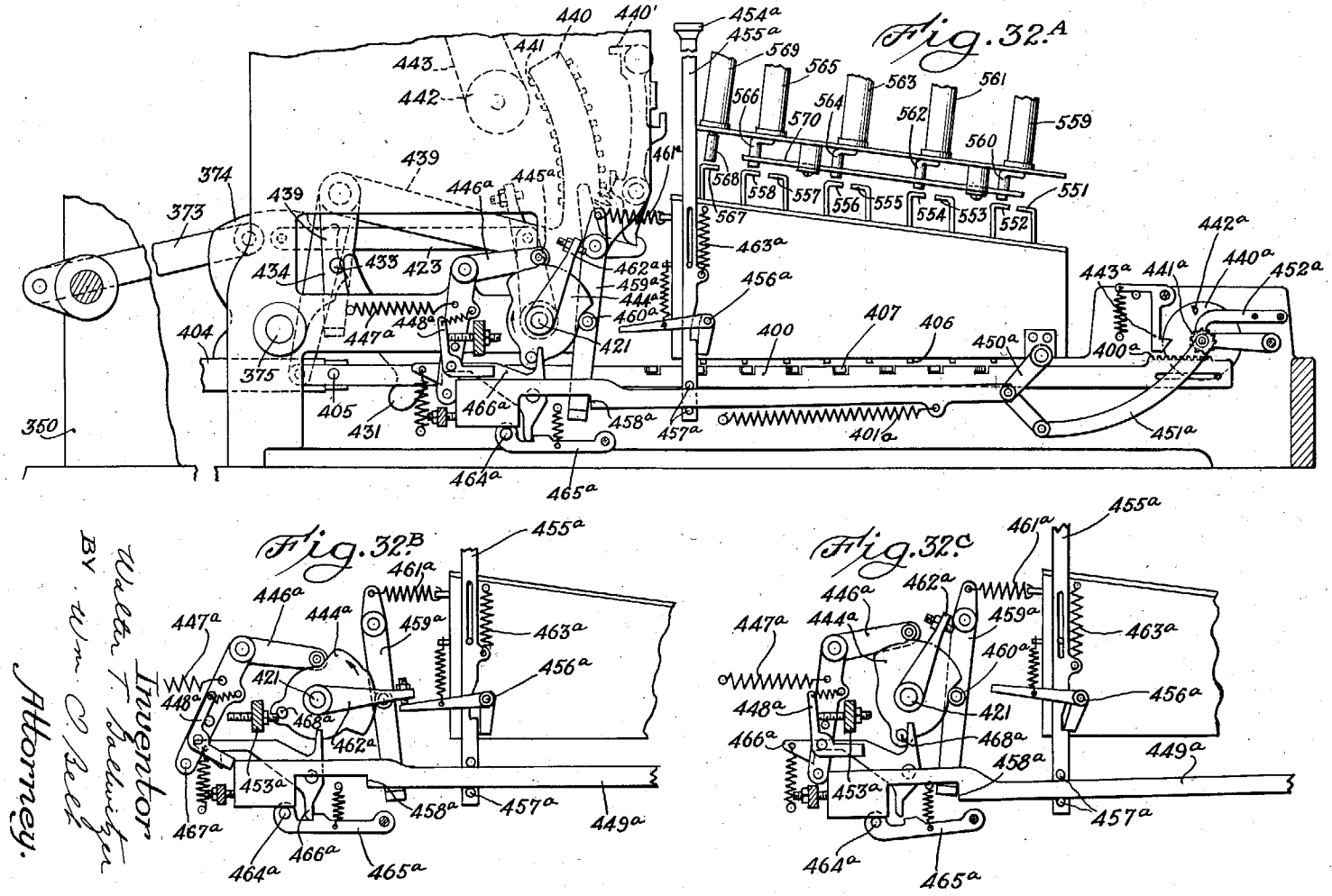
Inventor
Walter T. Gollwitzer
BY Wm. C. Belt
Attorney.

Sept. 19, 1939. W. T. GOLLWITZER Re. 21,208

PRINTING MACHINE

Original Filed Feb. 24, 1936 17 Sheets-Sheet 16

Inventor;
Walter T. Gollwitzer
BY
Wm. O. Belt
Attorney.

PRINTING MACHINE

Original Filed Feb. 24, 1936 17 Sheets-Sheet 17

Inventor
Walter T. Gollwitzer
BY
Wm. O. Belt
Attorney.

Reissued Sept. 19, 1939

Re. 21,208

UNITED STATES PATENT OFFICE 21,208

PRINTING MACHINE

Walter T. Gollwitzer, Euclid, Ohio, assignor, by mesne assignments, to Addressograph-Multigraph Corporation, Cleveland, Ohio, a corporation of Delaware Original No. 2,132,411, dated October 11, 1938, Serial No. 65,376, February 24, 1936. Application for reissue August 4, 1939, Serial No. 288,451

106 Claims. (Cl. 235—61.9)

This invention relates to printing machines of the kind in which impressions are made from printing devices sequentially fed through the machine and the primary object is to make impressions directly from the printing devices as well as to make other impressions under control of the printing devices.

Heretofore printing devices sequentially fed through printing machines have been equipped to print names and addresses or other identification of the shareholders of a corporation, the policyholders of an insurance company, the customers of a public utility or of other groups of persons and impressions have been made directly from the printing devices, for example, on dividend checks for the shareholders, premium notices to the policyholders, bills of the public utilities or on other similar business instruments to be distributed among groups of persons. It is desirable, however, not only to print names and addresses or other identification but also to print other information such as numerical accounting data and if such data are printed it may be advantageous to accumulate the total of amounts printed or to perform other mathematical operations. It is therefore another object of the invention to equip printing devices so that impressions may be made directly therefrom and also so that the printing of other information and, if desired, the performance of mathematical operations may be effected therefrom.

It has been proposed to print identifications such as names and addresses from printing devices or the like and to print other information such as numerical accounting data under control of records perforated or otherwise arranged on cards or the like independent of the printing devices. This required sequencing the printing devices and record cards and comparison or other checking thereof to insure that the impression from the printing device for one person was not made on the business instrument on which an impression was made under control of the record card for another person. The comparison or checking has usually been so effected that the machine was stopped when selected of the independently but sequentially fed printing devices and cards did not correspond, a not altogether satisfactory arrangement. Such sequencing and comparing of independent printing devices and cards may be avoided by including printing characters for printing a name and address or the like and control means for effecting the printing of numerical accounting data or the like on a single device whereby the entire record to be printed is accommodated on a single device. This, however, still entails assuring that impressions made from the printing characters and under control of the control means on a particular device be impressed on the same instrument, and hence still another object of my invention is to make impressions directly from a printing and control device and under control of a control means on the device on the same instrument so that the name or other identification of a particular person will be printed on the same instrument as that on which numerical accounting data or the like for that person are printed.

The numerical accounting data or the like printed on different business instruments may vary widely and therefore a further object of my invention is to employ a novel variable printer settable to afford a wide variety of combinations of type from which impressions may be made to print varying numerical accounting data or the like on business instruments, and another object is to set up such a variable printer under control of printing and control devices sequentially fed through a printing machine in which impressions may be made directly from the devices on the business instruments which are printed in the variable printer.

It is often desirable to totalize the numerical accounting data or the like printed on business instruments or to effect other mathematical operations based on such data and it is often desirable to prepare a record of such data. Hence other objects of my invention are to employ a calculating machine wherein numerical accounting data printed on business instruments may be totalized or other mathematical operations based on such data may be performed; to prepare a record of data entered in such a calculating machine; to operate such a calculating machine under control of printing and control devices sequentially fed through a printing machine to have impressions made directly therefrom; to associate a calculating machine with the variable printer of this invention and to totalize the numerical accounting data or the like printed by the variable printer or to perform other mathematical operations and, if desired, to prepare a record of data entered in the calculating machine; and to enable conjoint operation of a calculating machine and variable printer by utilizing for this purpose the same control means on printing and control devices sequentially fed through a machine whereby corresponding operation of the calculating machine and variable printer will be assured.

The control of a variable printer and, if desired, a calculating machine under records on printing and control devices fed through a machine may be effected by affording in a field on each device locations in which there may be positioned individual indications for each digit that can be printed by the variable printer or entered in the calculating machine but so to do requires relatively large fields on the devices. However, such large fields can only be accommodated on printing and control devices of relatively large size and it is advantageous to restrict the size of such devices. Moreover, such an arrangement of indications requires as many operating parts in the operating means for the variable printer, and for the calculating machine when one is used, as there are possible locations in the fields for individual digit indications and this makes it difficult to compactly arrange the variable printer, and when used, the calculating machine, and particularly operating means therefor. Hence, still further objects of my invention are to arrange at least part of the record on a printing and control device in accordance with a novel system that will enable a large number of digit indications to be accommodated in relatively small fields on printing and control devices of restricted size; to classify the digits, and therefore the indications thereof under the system; to provide novel parts in the operating means capable of effecting printing or entry of digits in different classes; and to selectively position such parts, prior to operation thereof, to effect printing or entry of the digit of a selected class.

Printing and control devices are fed through a printing or other machine and are collected and stored in a predetermined sequence as, for example, alphabetically. But it is not always desired to make an impression from the printing characters nor to effect a printing or other operation under control of the control means on every printing and control device in a sequence of devices fed through the machine. Hence, a still further object of my invention is to selectively make impressions from printing characters and effect printing or other operations under control of control means on printing and control devices automatically under control of the devices themselves, and another object is to selectively make impressions directly from the devices under control of the instruments or the like being printed.

The preparation of business instruments is expedited by printing the names or other identifications directly from printing and control devices fed through a printing machine and printing the numerical accounting data or the like under the control of the devices. But most business instruments also contain additional printed matter such as the name of the issuing company and like matter re-occurring on every instrument and they also contain other matter such as a date or a classification designation which, while it re-occurs on a great many instruments, changes from time to time or otherwise. In addition to this such instruments often contain an account number or other identification which, while it changes from instrument to instrument, does so regularly and in a uniform manner in contradistinction to the widely varying numerical accounting data or the like which may vary from instrument to instrument or may be alike on several consecutive or on even distributed instruments. Thus, a still further object of my invention is to completely print business instruments and ancillary objects are to provide a replaceable form for making identical impressions on all instruments passed through the machine; to enable printing of matter which reoccurs on a number of instruments but which changes from time to time or otherwise such as a date or a classification designation; and to provide for printing matter which changes from instrument to instrument in a uniform manner as does an account number or other identification.

Many business instruments contain matter which is advantageously printed in a contrasting manner as, for example, in distinguishing colors and an example of this is a check on which a signature, date and number are printed preferably in contrasting colors, and a still further object of my invention is to print selected matter on business instruments in a contrasting or distinguishing manner, and an ancillary object is to provide a novel printing couple wherein impressions may be made on business instruments or the like in contrasting colors.

It is advantageous to perform the various printing operations on business instruments at a plurality of positions in the machine to enable the instruments to be prepared rapidly and therefore further objects of my invention are to provide a plurality of printing positions whereat impressions may be made on business instrument blanks; to rapidly and accurately pass the blanks through the printing positions; to interrupt or otherwise alter operation of the machine upon improper passage of the blanks through the machine or upon the failure of a blank to advance from one position to another by providing novel safety devices operable by the presence or absence of a blank as the case may be; and to enable the safety devices to be rendered inoperative when so desired as when the machine is initially set in operation.

The preparation of business instruments may also be facilitated by severing the instruments from a web and a further object of my invention is to rapidly and uniformly sever blanks for business instruments or the like from a web and an ancillary object is to provide a novel severing device capable of attaining this end.

A further object is to position devices, such as printing and control devices, accurately relative to means in the machine through which the devices are fed and thereby insure accurate cooperation of the means in the machine and the devices.

Still further objects of the invention are to supply power directly to those operable parts of the machine having the highest inertia and indirectly to parts having lower inertia; to utilize relatively short shafts and other power transmitting means and thereby insure more positive operation of the machine; to facilitate installation and removal of changeable control elements in the machine; and to provide a novel machine of simple and economical construction and efficient and positive operation.

Other and further objects will appear in the following description wherein reference is made to the accompanying drawings in which Fig. 1 is a top plan view of the entire machine;

Fig. 2 is a vertical sectional detail view of a switch device employed in the machine and taken substantially on the line 2—2 on Fig. 1;

Fig. 3 is a detail view of a cam mounting employed in the machine;

Fig. 4 is a vertical sectional detail view taken substantially on the line 4—4 on Fig. 3;

Fig. 11 is a vertical sectional view taken substantially on the line 11—11 on Fig. 5;

Fig. 12 is a transverse sectional view taken substantially on the line 12—12 on Fig. 1;

Fig. 13 is a detail view taken substantially on the line 13—13 on Fig. 12;

Fig. 18 is a vertical sectional view taken longitudinally through the printing device guideway;

Fig. 18A is a rear view of a safety device illustrated in Fig. 18;

Fig. 18B is a fragmentary view similar to Fig. 18A showing the parts in other positions;

Fig. 30 is a perspective detail view of one type segment of the variable printer and the operating means therefor;

Fig. 31 is an enlarged detail view of a stop device employed in the mechanism illustrated in Fig. 32;

Fig. 32 is a sectional view taken substantially on the line 32—32 on Fig. 31;

Fig. 32A is another side view of the calculating machine and showing the total taking devices;

Figs. 32B and 32C are views showing alternative positions of certain of the parts shown in Fig. 32A;

Fig. 37 is a view of a typical business instrument printed in the machine;

Figure 5:
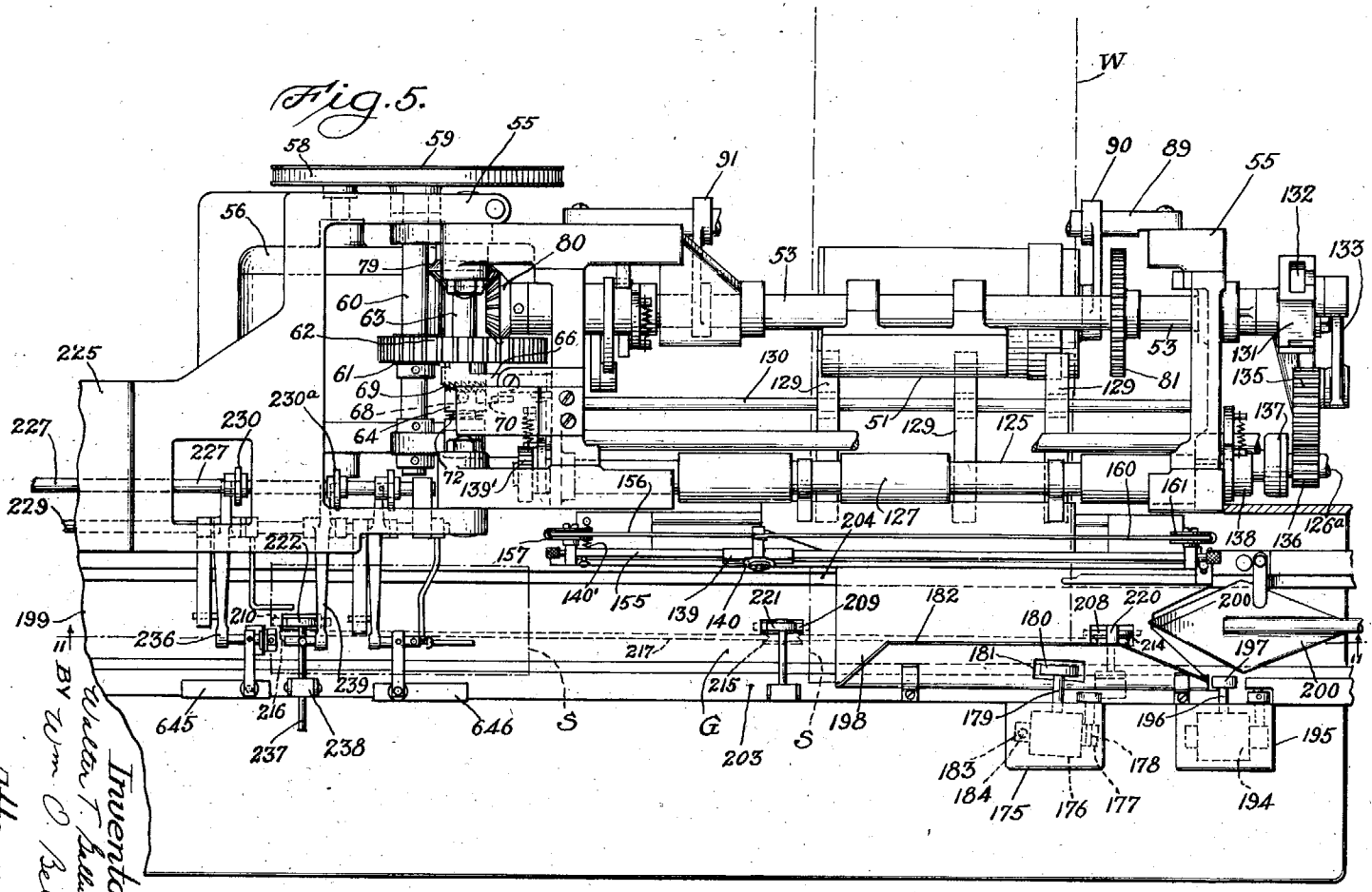
Fig. 5 is a top plan view, drawn to an enlarged scale, of the right hand end of the printing machine as viewed in Fig. 1.

The selected embodiment of the invention shown in the accompanying drawings is adapted for the preparation of checks and more particularly dividend payment checks of a corporation, but it is to be understood that this is merely an illustrative use of the invention for many other kinds of business instruments for many other purposes may be prepared as will be apparent from the following description.

The number of shareholders in a corporation is often very large and their holdings vary from a few to quite a large number of shares. The distribution of a dividend declared by a corporation among its shareholders is usually done by checks and because of a large number of shareholders and the variety of their holdings the preparation of the dividend checks has been an arduous and time-consuming task.

One manner in which the preparation of dividend checks has been simplified and speeded up has been by providing the names or other identification of the shareholders of a corporation on printing devices which have been passed through a printing machine to address or otherwise identify the checks. One form of printing device suitable for this purpose is shown in my Patent 2,030,865, patented February 18, 1936, and while printing of dividend checks by the use of such printing devices facilitated the preparation and distribution thereof it was still necessary to perform other operations on the checks as, for example, entering of the amounts thereon. Moreover, the name of the issuing company, the bank upon which the checks were drawn and similar matter re-occurring on all of the checks was usually printed thereon prior to passage thereof through a printing machine for addressing or other identification and the printing of this re-occurring matter on the checks has been relatively expensive. Moreover, it is necessary to date, number and sign the checks and it is preferable that such matter be printed on the checks in a way that it will contrast with other matter appearing on the checks, and this is also true of the amounts printed on the checks. It will thus be seen that it was necessary to perform a number of separate operations in order to prepare the dividend checks and that while printing addresses or other identification on the checks by the use of printing devices facilitated preparation thereof it did not solve all of the problems entailed in economically preparing the checks.

However, I propose to facilitate the preparation of dividend checks by not only providing devices for printing the name and address or other identification of a shareholder but which will also carry control means so that the entire record may be printed by the devices. The record, by way of example, may be the identification of a share holder and the amount which the shareholder is to receive by reason of the declaration of a dividend. This amount represents the number of shares owned by the shareholder multiplied by the rate of the dividend. Such a record may be provided on the printing devices in a variety of ways of which the manner shown in the accompanying drawings and described hereinafter is but illustrative.

For the purpose of illustrating this invention I have shown a printing device of the kind disclosed in my above referred to patent. Such a printing device includes a carrier or frame, a removable plate and an index card. It is to be understood, however, that the invention is not limited to the use of such a printing device and could, if desired, be used in connection with a printing device of the kind shown in the patent to Mohler, No. 1,790,717, patented February 3, 1931, or with any other suitable form of printing device.

Thus, I have shown a printing device D including a frame 40 on which a flat metal plate 41 is removably retained preferably adjacent the lower part thereof. This plate is adapted to be embossed or otherwise provided with printing characters from which the name and address or other identification of the shareholder of a corporation may be printed. In addition to this the printing device is also provided with an index card 42 bearing an impression from the printing characters on the plate 41 and this facilitates filing and other handling of the printing device. The index card is preferably located in one upper corner of the frame 40.

I provide a plurality of openings 43 in the other upper corner of the frame. In the present instance I provide nine rows of openings with five openings in each row and preferably these openings are positioned in transverse and longitudinal alignment with each other. Each of the nine rows of openings may be used to indicate the digit of a number of other numerical accounting data or the like and I may therefore arrange the indications of a nine place number on the printing device illustrated, and when the number is expressed in terms of dollars and cents I may indicate any amount up to 9,999,999 dollars and 99 cents.

Figure 38:
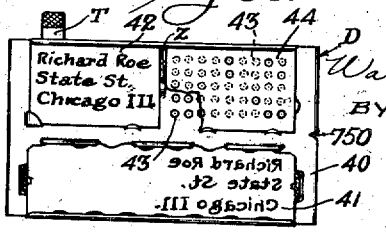
Fig. 38 is an elevation of a typical printing device used in the machine.

I could, if desired, provide nine or ten openings in each of the nine rows and then use a particular opening in each row as an indication of a particular digit in each row but so to do would entail the use of a field of relatively large size to accommodate openings so arranged and, as will be apparent from an inspection of Fig. 38, this would entail increasing the size of the printing device D. I therefore provide but five openings in each row which number may be accommodated without increasing the size of the printing device, and I utilize these openings in accordance with a system or code, to be explained, whereby I am enabled to provide an indication for any digit in every row.

I have explained that nine rows of openings with five openings in each row are provided in the frame 40 and in order to render operative only selected of the openings so as to thereby indicate particular digits I employ a control card 44 which is mounted over the openings 43. The control card 44 as well as the plate 41 and index card 42 are removably secured on the frame by suitable retaining devices such as, for example, those shown and described in my above referred to Patent 2,030,865.

Figure 39:
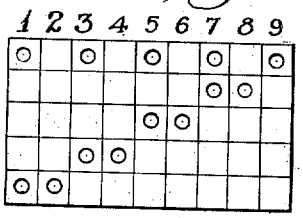
Fig. 39 is a chart illustrating the system or code under which a record is provided on the printing devices.

When it is desired to indicate a particular digit in any one of the nine rows, one or more perforations are provided in the control card 44 in alignment with one or more of the openings 43. The manner in which such perforations in the card 44 are located to indicate particular digits is illustrated in Fig. 39 wherein it will be noted that in order to indicate the digit "1" in any one of the nine rows perforations are made in the control card 44 in alignment with the uppermost and lowermost perforations 43 in that particular row while in order to indicate the digit "2" a perforation is made in alignment with only the lowermost opening in the particular row. The manner in which perforations are located for the other digits can be readily ascertained by reference to Fig. 39.

As shown in Fig. 39 the odd digits 1, 3, 5 and 7 in a particular row are all indicated by two perforations in the control card, one of which is always located in alignment with the uppermost perforation in the particular row. It will also be noted that when only one perforation is made in the control card in alignment with the uppermost opening in a particular row it is indicative of the digit 9. Furthermore, the even digits 2, 4, 6 and 8 are each indicated by a single perforation in the control card, the opening being respectively located in alignment with openings other than the opening uppermost in a particular row. It may therefore be said that under the system or code disclosed in Fig. 39 the digits and indications therefor are classified, the odd digits 1, 3, 5 and 7 being in one class, the even digits 2, 4, 6 and 8 being in another class, and the odd digit 9 being still in another class. The utility of such classification of the digits is more fully explained hereinafter.

I have referred to the devices on which the record to be printed on a business instrument is provided as printing devices and will so refer to such devices hereinafter from time to time since such is the utility of the devices. It will be noted, however, that these devices are printing and control devices and therefore it is to be understood that reference to printing devices hereinafter is in the generic sense of printing and control devices.

In Fig. 37 I have shown a check C as an illustration of a business instrument which may be prepared by this invention and by referring thereto it will be seen that this check includes a form F such as the name of the issuing company, the bank on which it is drawn, the formal words of a negotiation and the like; a date B; a number N; an amount E; an address A and a signature X. It is to be understood that more or less matter might be printed if so desired.

While this invention is primarily directed to making impressions directly from and under control of the printing devices I have shown a machine which will completely print the check C and to this end I have provided a printing couple wherein the date B, the number N and signature X may be conveniently printed, a variable printer under control of the printing device for printing the amount E, printing means for making an impression directly from the printing device to print the address A and another printing couple wherein the form F may be conveniently printed.

Furthermore, in preparing dividend checks and many other business instruments it is often desirable to accumulate a total of the various amounts printed on the instruments or to perform other mathematical operations, and it is likewise advantageous to prepare a record, such as a detail strip, of the amounts printed and I have therefore shown and will describe more particularly hereinafter a calculating machine, and more particularly an adding machine, wherein a total of the amounts E printed on the various checks may be accumulated and wherein a record of the amounts so printed may be prepared.

I have also shown and will describe hereinafter withdrawing a web from a roll of blank paper and severing the business instrument blanks from this web, but it is to be understood that this is merely illustrative and that the primary feature of the invention, that is, printing directly from and under control of printing devices, can be used in other ways for which it is or may be adapted and that it is not limited to use in the preparation of business instruments severed from a web.

*Signature, date and number printing couple*

A roll R of blank paper, which may be so-called safety paper when checks are to be printed, is mounted in a suitable supporting stand 50, as for example, like that shown in my co-pending application Serial No. 78,681, filed May 8, 1936. A web W is withdrawn from the roll and, if desired, suitable unwinding means such as that disclosed in my just referred to co-pending application may be associated with the roll so that tension on the web will be kept uniform.

The web W is passed between the cylinders 51 and 52 of a printing couple, which cylinders are respectively mounted on shafts 53 and 54 that are suitably journaled in a frame 55 mounted at the right hand end of the printing machine, described more fully hereinafter, as best illustrated in Fig. 1. During impression operations of the cylinders 51 and 52 the web W is fed therethrough, additional feeding means for the web being mounted in the frame 55, as will be explained presently.

Figure 16:
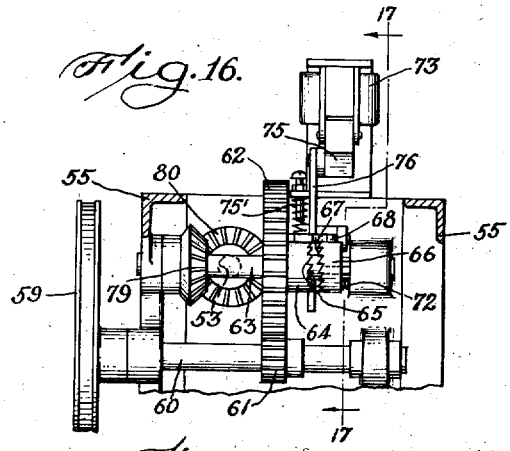
Fig. 16 is a detail view of a clutch controlling operation of the printing couple best illustrated in Figs. 7 and 9.
Figure 17:
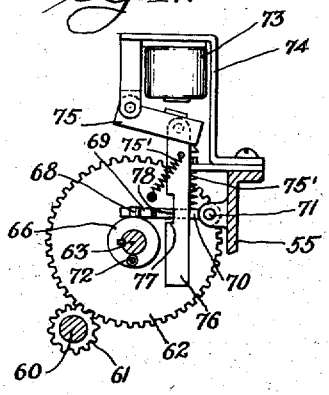
Fig. 17 is a detail view taken substantially on the line 17—17 on Fig. 16.

Power is supplied to the shafts 53 and 54 from a motor 56 suitably mounted on the frame of the printing machine, a pulley 57 being mounted on the shaft of the motor and having an endless belt 58 passed thereabout, and this belt is also passed about the pulley 59 fast on the shaft 60 that is journaled in the frame 55 and which shaft 60 is continuously rotated so long as the motor 56 is in operation. A pinion 61 (Figs. 16 and 17) fast on the shaft 60 meshes with a gear 62 rotatably mounted on the shaft 63 rotatably journaled in the frame 55.

Preferably the shafts 53 and 54 are intermittently rotated and to this end a clutch is provided so that power may be intermittently picked up from the gear 62 and imparted to the shaft 63. To this end a hub 64 is provided on the gear 62 which has clutch teeth 65 thereon. A collar 66, slidably but non-rotatably mounted on the shaft 63, has clutch teeth 67 thereon adapted to cooperate with the clutch teeth 65. A stud 68 is provided on the collar 66 and is adapted to cooperate with a cam face 69 (Fig. 5) on the plate 70 pivotally mounted on the frame 55 as indicated at 71. Springs 72 normally urge the clutch teeth 67 on the collar 66 toward the clutch teeth 65, and when these teeth are engaged the shaft 63 rotates with the gear 62. However, when the cam face 69 on the plate 70 is in engagement with the stud 68, as shown in Fig. 5, the clutch teeth 67 are held separated from the clutch teeth 65 and the gear 62 rotates freely without imparting movement to the shaft 63.

The engagement of the clutch teeth 67 with the clutch teeth 65 is under control of an electromagnet 73 carried by a bracket 74 fast on the frame 55. The armature 75 of the electromagnet retracts by gravity when the electromagnet is deenergized. A link 76 pivoted on the armature 75 has a notch 77 therein in which a boss 78 on the plate 70 is positioned and a spring 75' urges the link 76 toward the boss 78. When the electromagnet 73 is energized in a manner to be described more fully hereinafter, the armature 75 is attracted and moved upwardly which moves the link 76 upwardly whereupon the lower edge of the notch 77 engages the boss 78 and moves the plate 70 upwardly, thereby disengaging the cam face 69 from the stud 68 permitting the springs 72 to engage the clutch teeth 67 with the clutch teeth 65 and therefore the shaft 63 rotates with the gear 62. When the electromagnet 73 is deenergized, the spring 75' retracts the armature 75 lowering the link 76 disengaging the lower edge of the notch 77 from the boss 78 whereupon the plate 70 resumes the position shown in Fig. 17, and the cam face 69 is repositioned for engagement with the stud 68 which in the course of its rotation with the collar 66 engages the cam face 69 and at a predetermined time disengages the clutch teeth 67 from the clutch teeth 65, thereby interrupting rotation of the shaft 63.

A bevel gear 79 fast on the shaft 63 meshes with a bevel gear 80 fast on the shaft 53 whereby shaft 53 is rotated with shaft 63 whenever said shaft 63 is rotated. Equally sized intermeshing gears 81 and 82 (Fig. 7) are respectively fast on the shafts 53 and 54 whereby these two shafts rotate in synchronism. The cylinder 51 is segmental in shape and affords an interrupted platen adapted to cooperate with the printing cylinder 52.

In the present instance when checks are being printed the printing cylinder 52 is equipped with devices for printing the signature X, the number N and the date B on the check C.

Thus a signature printing form 85 is removably mounted on the periphery of the cylinder 52. This form may be a rubber block or an electroplate and preferably the signature printing means appears in relief thereon.

A date printing form 86 is also removably mounted on the periphery of the printing cylinder 52 in predetermined relation with the signature printing form 85, that is to say, the positioning of the signature printing form and the date printing form is determined by the relative positions the impressions therefrom are to occupy on the checks to be printed. Preferably the date printing form is arranged to be readily removable inasmuch as it will be necessary to frequently replace this form from time to time.

In addition to the signature printing form and the date printing form, a suitable accumulating number printing device 87 is mounted in the printing cylinder 52 with the impression surface thereof lying above the periphery of said cylinder. This accumulating numbering device may be of the usual form and includes a trigger 88 or other operable part engageable with a rod 89 or the like on the frame 55 in each rotation of the printing cylinder 52 to operate the accumulating numbering device to effect advancing thereof in the manner well understood in the art.

I have shown a signature printing form, a date printing form and an accumulating numbering device on the printing cylinder 52 but it is to be understood that these might be replaced with other suitable devices, the nature of which would be dictated by the characteristics of the business instrument being printed, the described devices being pertinent to printing checks.

It is desirable that signature, number and date impressions made on a check be contrasted with other impressions made thereon because this facilitates examination, sorting and verification of checks and I have therefore provided an arrangement whereby the signature, number and date may be printed on the checks in contrasting colors. Thus, for example, the signature impression may be colored green, the number impression red and the date impression black, and means are provided for supplying inks of these colors to the various printing forms or devices which make these impressions.

Figure 9:
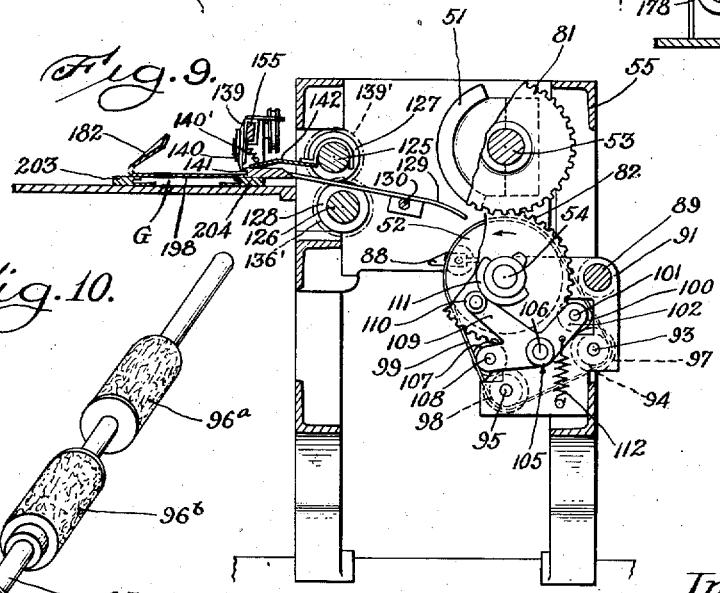
Fig. 9 is a view taken substantially on the line 9—9 on Fig. 7.
Figure 10:
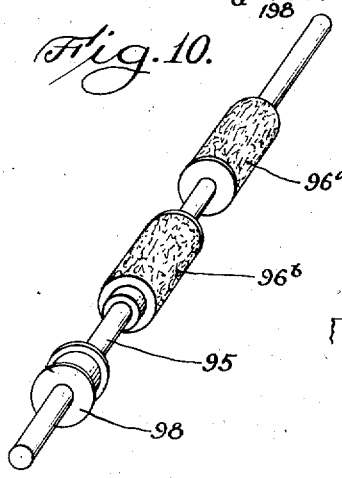
Fig. 10 is a perspective detail view of an inking roller employed in the printing couple illustrated best in Figs. 7 and 9.

A pair of brackets 90 and 91 support the devices which supply ink to the printing forms on the printing cylinder 52. As best shown in Fig. 9, the bracket 91 is supported by the rod 89 and rests against the frame 55, this bracket affording a journal for the inner end of the shaft 54. The bracket 90 is similarly carried by the rod 89 and frame 55 and the shaft 54 also passes through this bracket. A shaft 93 is journaled in the brackets 90 and 91 and an ink roller 94 is mounted thereon. This ink roller is preferably formed of felt or similar material so that it may be soaked with ink and this roller is used to supply ink to the signature printing form and will, in the illustrated embodiment of the invention, be supplied with green ink. Another shaft 95 is journaled in the brackets 90 and 91 and a sectional ink roller embodying sections 96*a* and 96*b* is mounted thereon. This ink roller is adapted to supply ink to the date printing form and number printer. As explained heretofore, preferably the date and number are printed in contrasting colors and therefore the section 96*a* of this roller, which supplies ink to the numbering device, is soaked with red ink while the section 96*b* is soaked with black ink, the sections 96*a* and 96*b* being formed of the same material as that of which the roller 94 is formed.

Pulleys 97 and 98 are respectively mounted on the shafts 93 and 95 and an endless belt 99 is passed about these pulleys and about the periphery of the printing cylinder 52 so that whenever the printing cylinder 52 is rotated rotation is also imparted to the shafts 93 and 95 and the ink rollers carried thereby.

Preferably ink is supplied to the various printing forms on the periphery of the printing cylinder 52 only immediately prior to a printing operation thereof and to this end I provide transfer rollers which are interposed between the ink rollers and the periphery of the cylinder 52.

Thus, a transfer roller 100 is mounted on a shaft 101 which has the ends thereof journaled in the arms 102 and 103, respectively, of brackets 104 and 105, which brackets, as best illustrated in Fig. 9, are rockably mounted on a shaft 106 journaled in the brackets 91 and 92.

Another transfer roller 107 is mounted on a shaft 108 carried by arms of the brackets 104 and 105 extending in a direction opposite to the arms 102 and 103.

The various printing forms on the cylinder 52 project above the periphery thereof and normally the transfer roller 100 is in a position to supply ink to the signature printing form 85 and is out of engagement with the ink roller 94. Normally the transfer roller 107 is in engagement with the sections 96*a* and 96*b*. In order to operate the transfer rollers so that they will only supply ink to the forms with which they are intended to cooperate, an arm 109 is provided on the bracket 105 which carries a roller 110 at the free end thereof that is engageable with a cam 111 fast on the shaft 54.

The roller 110 normally engages a dwell on the cam 111 to hold the transfer rollers 100 and 107 in their normal positions, and in the rotation of the cylinder 52 and shaft 54 at a time immediately after the signature printing form 85 has passed the transfer roller 107 the roller 110 moves into a relief on the cam 111 under the action of a spring 112, whereupon the transfer roller 107 is moved from engagement with the sections 96*a* and 96*b* and into a position to engage the date printing form 86 and the number printer 87 which will immediately follow this positioning of the roller 107. At this same time the transfer roller 100 is engaged with the ink roller 94 to pick up ink therefrom, and immediately after the date printing form 86 and number printer 87 have moved from alignment with the transfer roller 107 the roller 110 encounters a dwell on the cam 111 which repositions the rollers 100 and 107 in their normal positions, and immediately thereafter the signature printing form 85 engages the transfer roller 100 to have ink supplied thereto. The transfer roller 100 is now in such a position that it would supply ink to the date printing form and number printer. So immediately after the signature printing form has passed from alignment with the roller 100, the roller 110 moves into another relief part on the cam 111 and hence the roller 100 is moved out of position in which the date printing form and number printer might contact therewith. However, immediately after the date printing form and number printer have moved past the roller 100 the roller 110 again contacts the dwell on the cam 111 and the rollers 100 and 107 are repositioned in their normal positions for a repetition of this just described operation during the next revolution of the printing cylinder 52.

The interrupted platen 51 is adapted to cooperate with the printing forms on the printing cylinder 52 and in each revolution of the platen 51 and printing cylinder 52 impressions are made on the web W from the signature printing form 85, date printing form 86, and number printer 87, the number printer advancing after each impression operation thereof. The impressions are made on the web at spaced intervals and the web is fed forwardly during an impression operation thereon. However, other feeding means are provided for the web which so feed the web that the various impressions made thereon in the just described printing couple are properly spaced relative to the longitudinal margins of the checks. The web is severed intermediate each set of impressions made by the devices on the printing cylinder 52 so that one set of such impressions appears on each of the checks.

I have included the signature printing form, date printing form and number printer in a single printing couple for I have found it convenient so to do, and I have provided an arrangement whereby different colored inks may be supplied to these different printing means so that different colored impressions may be made thereby, but it is to be understood that only one or even more impressions could be made in the foregoing manner and that all impressions could be printed in the same color Moreover, if business instruments other than checks were being printed in the machine, other types of printing forms might be provided as dictated by the requirements of the particular instrument.

*Web feeding and severing means*

In the form of the invention illustrated I employ a web of a width equal to the desired length of the checks for checks are usually of greater length than width and by severing the checks from the web in this manner I am enabled to sever a great many more checks from a web of a given length than I would be able to do if the web was the same width as that desired of the checks and the web was severed transversely of the checks rather than longitudinally thereof. However, it is important that the checks be of a uniform width and I therefore feed the leading edge of the web past a severing device in an equal amount in each operation of the feeding means and by so doing I insure that the checks will be of uniform width.

In the accompanying drawings I have shown a web feeding means somewhat like that shown and described in the patent to Hartley, No. 1,955,-806, patented April 24, 1934, but it is to be understood that any other suitable intermittently operable web feeding means may be employed without departing from the purview of my invention.

Figure 8:
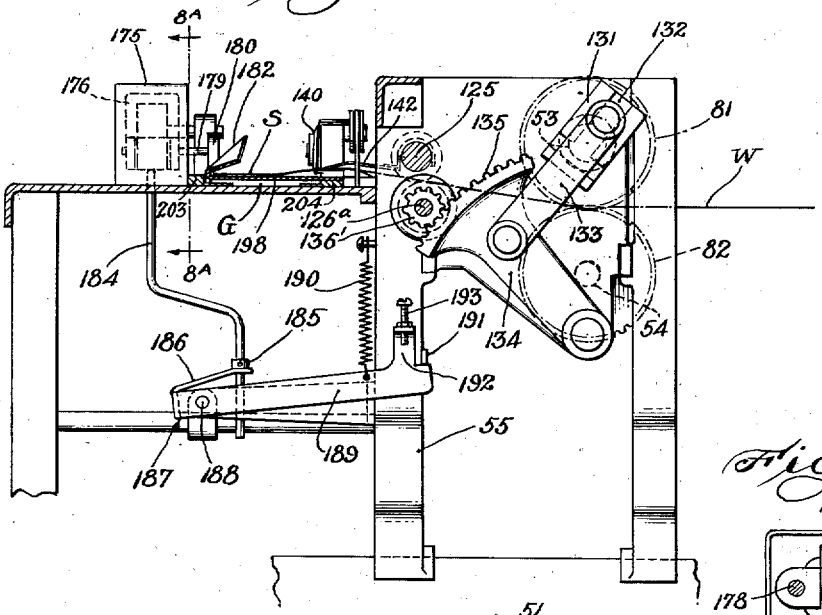
Fig. 8 is a view taken substantially on the line 8—8 on Fig. 7.

The web feeding means, as best illustrated in Figs. 8 and 9, includes a pair of shafts 125 and 126 rotatably mounted in the frame 55. Suitable resilient clamping rollers 127 and 128 or the like are provided on the shafts 125 and 126 and the web is clamped in the bight between these rollers. Suitable guide strips 129 extend between the shafts 125 and 126 in staggered relation with the rollers 127 and 128, the inner free ends of these guide strips being supported near the discharge of the bight between the cylinders 51 and 52 by a rod 130, and as the web passes from the bight between the cylinders 51 and 52 it moves up over the guides 129 into the bight between the rollers 127 and 128. By resting the web on the strips 129 as it passes from the cylinders 51 and 52 it may buckle upwardly and the loop thus formed is diminished as the feed rollers 127 and 128 operate. This arrangement insures accurate registration of the impressions made on the web.

Inasmuch as there may be conditions causing variations in the width of the checks I provide an adjustable crank arrangement in the means which imparts rotative movement to the shafts 125 and 126 and to the feed rollers 127 and 128 carried thereby. Such an adjustable crank includes the arm 131 fast on the shaft 53 and has a bifurcated guideway 132 therein. One end of a link 133 is adjustably secured in the guideway 132. The arm 131 rotates with the shaft 53 and the adjustable mounting of one end of the link 133 in this arm enables variation of the throw imparted to said link.

A rock arm 134 is pivotally mounted in the frame 55 and the free end of the link 133 is pivotally connected thereto. A gear segment 135 on the rock arm 134 meshes with a pinion 136 fast on the shaft 126*a* that is in axial alignment with the shaft 126. An overrunning clutch 137 (Fig. 5) and a brake 138 of a design similar to the overrunning clutch 137 are interposed between the shafts 126 and 126*a*. When the rock arm 134 is moved upwardly, the gear segment 135 rotates the pinion 136 and engages the clutch 137 and disengages the brake 138 and rotates the shaft 126. A pinion 136′ is provided at the end of the shaft 126 opposite the end at which the brake 138 is positioned and a pinion 139′ fast on the shaft 125 meshes with this pinion so that when the shaft 126 is rotated the shaft 125 is also rotated. This effects rotation of the rollers 127 and 128 and feeding of the web. When, however, the rock arm 134 moves downwardly, the gear segment 135 drives the pinion 136 but this disengages the clutch 137 and engages the brake 138 whereupon the shafts 126 and 125 and therefore the rollers 128 and 127 are held against movement and the web is clamped therebetween. The rock arm 134 is normally in the position shown in Fig. 8 and moves downwardly during the first half of a cycle of operation and upwardly during the last half of the cycle.

The feed rollers 127 and 128 are operated by the just described devices during the last half of a cycle of operation and during impression operations of the platen cylinder 51 and printing cylinder 52 and feed the web past the severing device in an amount equal to the desired width of the check.

The severing device operates during the first half of a cycle of operation and severs the check from the web that was fed thereby in an amount equal to the desired width of the check in the preceding cycle of operation. This severing device includes a carriage 139 on which a rotary cutter 140 is mounted. This rotary cutter 140 is urged into engagement with the leading edge of the ledge 141, by a spring 140′, onto which ledge the web is directed by the guiding fingers 129 and against which it is held by suitably mounted clamping fingers 142. In one severing operation the carriage 139 moves to the right, as viewed in Fig. 11, across the web and in the next severing operation moves to the left across the web, and this alternate movement of the knife continues throughout operation of the machine intermediate operations of the rollers 127 and 128.

Such reciprocatory movement is imparted to the carriage 139 from a rocker 143 (Figs. 14 and 15) pivotally mounted at 144 on the frame 55 and carrying a roller 145 engageable with the cam disc 146 rotatably mounted on the shaft 53, said rollers being urged toward the periphery of said cam disc by a spring 147 that acts on the rocker 143.

The cam disc 146 includes a hub having studs 149 mounted thereon in diametrical relation with each other. An arm 150 is fast on the shaft 53 and carries a pawl 151 that is urged toward the shaft 53 by a spring 152 and the notch 153 in the pawl 151 is adapted to alternately engage one or the other of the studs 149, such engagement of the notch with these studs being regulated by a trip 154 on the frame 55.

The carriage 139 is mounted for reciprocation on a track 155 (Figs. 9 and 11). A cable 156 is connected to the carriage and is led about a pulley 157 at one end of the frame supporting the track 155 and this cable 156 is also led about and connected to a pulley 158 mounted on the shaft 159 journaled in the frame 55. Another cable 160 is connected to the carriage 139 and is directed about a pulley 161 at the end of the frame supporting the track 155 opposite the end at which the pulley 157 is mounted. The cable 160 is also directed about a pulley 161' rotatably mounted on a bracket 162 carried by the frame 55 and also about a pulley 163 and the free end of the cable 160 is fast to the frame as at 164. The pulley 163 is mounted in a block 165 to which one end of a spring 166 is fast, the other end of said spring being fast to the frame 55.

A hub 167 is provided on the pulley 158 and has a spiral groove in the periphery thereof in which a cable 168 may wind, one end of said cable being fast to the pulley 168 as indicated at 169. The cable 168 is passed about a pulley 170 carried by the frame 55 and is fast to the lower end of the rocker 143 (Fig. 14) so that upon movement of the rocker 143 the cable 168 may wind or unwind in the groove in the periphery of the hub 157 under tension of the spring 166 in a manner now to be explained.

Figure 14:
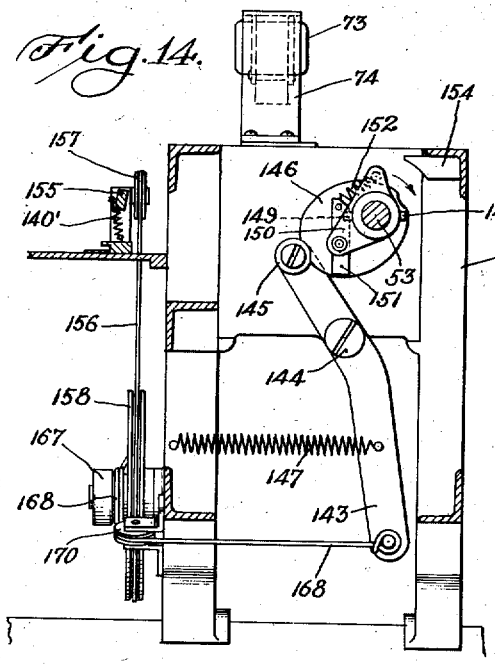
Fig. 14 is a vertical sectional view taken substantially on the line 14—14 on Fig. 7.

In the cycle of operation of the machine immediately preceding that now to be described, the carriage 139 was moved to the left as viewed in Fig. 11 into the position shown in Fig. 11. This reduced the bight in the cable 160 on opposite sides of the pulley 163 and tensioned the spring 166 and at the end of this movement the cam disc 146 was positioned as shown in Fig. 14 with the notch 153 engaged with the stud 149 with which it is engaged in Fig. 14, and during the first part of the cycle of operation now to be described the carriage 139 is to be moved to the right as viewed in Fig. 11 and this results because of the engagement of the notch 153 with said stud 149. The notch 153 engaged this stud 149 just at the end of the preceding cycle of operation.

Engagement of the notch 153 with said stud 149 causes rotation of the cam disc 146 with the shaft 53. The rocker 143 will be in the position shown in Fig. 14 and as the cam disc 146 rotates with the shaft 53 during the first part of the present cycle of operation, that is to say, during the time the rocker 134 is moving downwardly, the roller 145 follows the periphery of the cam disc 146 and the rocker 143 moves from the position shown in Fig. 14 into the position shown in Fig. 15 and attains the position shown in Fig. 15 when the present cycle of operation is half completed, that is to say, at the time the rocker 134 attains its lowermost position. The rocker 134 will now start to move upwardly operating the feed rollers 127 and 128 but by this time the severing operation will be completed and the carriage 139 will be in and remain in position at the right in Fig. 11. Thus since the carriage is at rest at this time the pawl 151 engages the trip 154 just prior to the time the cycle of operation is completed and the engagement of the pawl and this trip disengages the notch 153 from the stud 149 and the cam disc 146 stops in the position shown in Fig. 15 and remains there until the subsequent cycle of operation.

Figure 15:
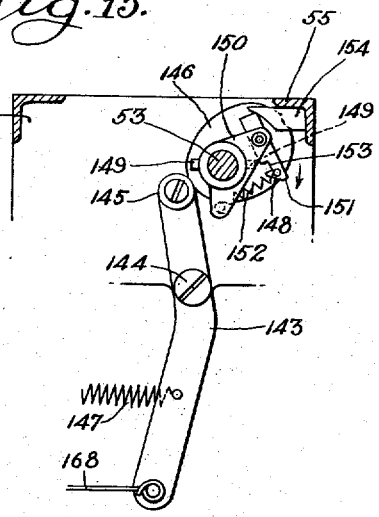
Fig. 15 is a view similar to Fig. 14 showing the parts in another position.

When the rocker 143 moves from the position shown in Fig. 14 into the position shown in Fig. 15 during the first half of a cycle of operation, the cable 168 winds up in the groove in the hub 167 of the pulley 158 under the action of the spring 166 which causes the cable 156 to be unwound from the periphery of the pulley 158 and this increases the bight in the cable 160 on opposite sides of the pulley 163 during the time the rocker 143 moves from the position shown in Fig. 14 into the position shown in Fig. 15. This movement of the rocker is rather rapid by reason of the outline of the cam disc 146 and this increase in the bight in the cable 160 causes the carriage 139 to move from the position shown in Fig. 11 rapidly across the web to a right hand position whereupon the rotary cutter 140 severs the check from the web. Near the end of this cycle of operation the tapered nose 148 on the pawl 151 rides up over the other of the studs 149 and at the end of this cycle of operation, that is to say, when the rocker 134 has attained its uppermost position, the notch 153 will be seated on said other stud 149.

The next cycle of operation will immediately start and again the cam disc 146 will move with the shaft 53 and this time the rocker 143 will move from the position shown in Fig. 15 into the position shown in Fig. 14 and during this cycle of operation the cable 168 is unwound from the groove in the hub 167 and this pulls the cable 156 so as to wind it on the pulley 158. This takes place against the action of the spring 166 and decreases the bight in the cable 160 on opposite sides of the pulley 163, and again by reason of the outline of the cam disc 146 the carriage 139 is moved rapidly across the web and the cutter 140 again severs a check from the web, said check having been fed past the cutter by the rollers 127 and 128 during the last half of the preceding cycle of operation. Midway in this latter cycle of operation the pawl 151 engaged the trip 154 and the notch 153 was disengaged from the stud 149 whereupon the cam disc 146 remained in the position shown in Fig. 14 until the subsequent cycle of operation.

It will thus be seen that during the first half of each cycle of operation a sheet such as a check fed past the rotary cutter in the preceding cycle of operation is severed from the web and is deposited in position to be fed through the machine in the manner now to be described.

*Sheet feed*

The checks or sheets S severed from the web are deposited on a pan 198 (Fig. 8) above the sheet guideway G for a purpose to be explained. The sheets are fed from this pan and through the guideway to receive impressions under control of the printing and control devices and directly from the devices and then into a printing couple wherein the form F is printed on the checks. In the present machine impressions are made on the sheets under control of the printing and control devices to the right, as viewed in Fig. 1, of the position whereat these sheets are severed from the web, and impressions are made on the sheets directly from the printing devices and the form is printed on the sheets to the left of such position, as viewed in Fig. 1. It is to be understood, however, that the sheets could be severed from the web to the left or to the right of all devices for making impressions thereon or individual sheets could be deposited in the guideway in any desired way for passage through the various printing mechanisms.

In the present machine where sheets are severed from the web I first make an impression thereon under control of the printing and control devices and to this end the sheets are first fed into a variable printer, operable under control of control means on the printing and control devices.

The variable printer is located to the right, as viewed in Fig. 1, of the position where the sheets are severed from the web, and suitable means are provided for feeding the sheets into this variable printer.

Figure 8A:
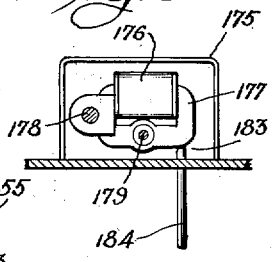
Fig. 8A is a sectional detail view taken substantially on the line 8A—8A on Fig. 8.

Thus, as best shown in Fig. 5, a housing 175 is mounted on the frame of the machine adjacent the position in which the severed sheets S are deposited on the pan 198. A motor 176 (Figs. 5, 8 and 8A) is provided in this housing which is mounted in a frame 177 that is pivotally mounted in the housing 175 as indicated at 178. The motor includes a shaft 179 carrying a roller 180 that is extended through an opening 181 in the sheet guide 182 on the pan 198, which receives the sheet when it is severed from the web.

The motor 176 is so mounted that the shaft 179 thereof extends slightly at an angle relative to the longitudinal extent of a sheet fed theretoward and this insures proper feeding of the sheet.

The motor is of relatively small size and in order that feeding of a sheet by the roller 180 will be assured I elevate and lower the motor, this also having the effect of preventing the roller from crumpling or tearing a sheet moving into position therebelow when the sheet is severed from a web in the manner above described.

The roller 180 is lowered into engagement with the sheet after it has been severed from the web and this is effected under control of a rod 184 that engages the frame 177 carrying the motor 176. The rod 184, as best shown in Fig. 8, is adjustably secured in a bushing 185 on the arm 186 of a rocker 187 pivotally mounted on the frame 55 at 188.

The rocker 187 includes an arm 189 to which one end of a spring 190 is connected, the other end of said spring being suitably anchored on the frame 55. The spring 190 normally urges the shoulder on the arm 189 upwardly against the stop 191 and when the shoulder is engaged with this stop the arm 186 and therefore the rod 184 are held in upper position whereby the roller 180 is held in an upper position and the lower part of this roller is then out of sheet engaging position.

It will be remembered that the sheet severing operation is completed about the time the rocker 134 attains its lowermost position. Thus a boss 192 is provided on the arm 189 in which an adjustable stop 193 is mounted and this adjustable stop is engaged by the rock arm 134 about the time it attains its lowermost position and at the time the rock arm attains its lowermost position the rocker 189 is pivoted downwardly whereupon the roller 180 engages the sheet on the pan 198 and feeds this sheet off of the pan 198. The roller 180 will be rotating rapidly and its inertia is sufficient to effect such feeding of the sheet and therefore I may use a motor of relatively small power to drive this roller. The roller 180 feeds the sheet toward the right, as viewed in Fig. 5.

Another motor 194 is mounted in a housing 195 positioned to the right of the pan 198, as viewed in Fig. 5, and this motor has a shaft 196 carrying a roller 197 under which a sheet fed to the right by the roller 180 passes, and the roller 197 acts to rapidly feed the sheet toward the right and into the variable printer, which printer is described more fully hereinafter.

In the present machine the sheets move in opposite directions in a portion of their line of travel. Thus the pan 198 is mounted above the bottom wall 199 of the sheet guideway G. As the sheets are severed from the web they pass onto the plate 198 and the roller 180 engages the sheets as they pass onto this plate to eject them therefrom.

Figures 6, 7:
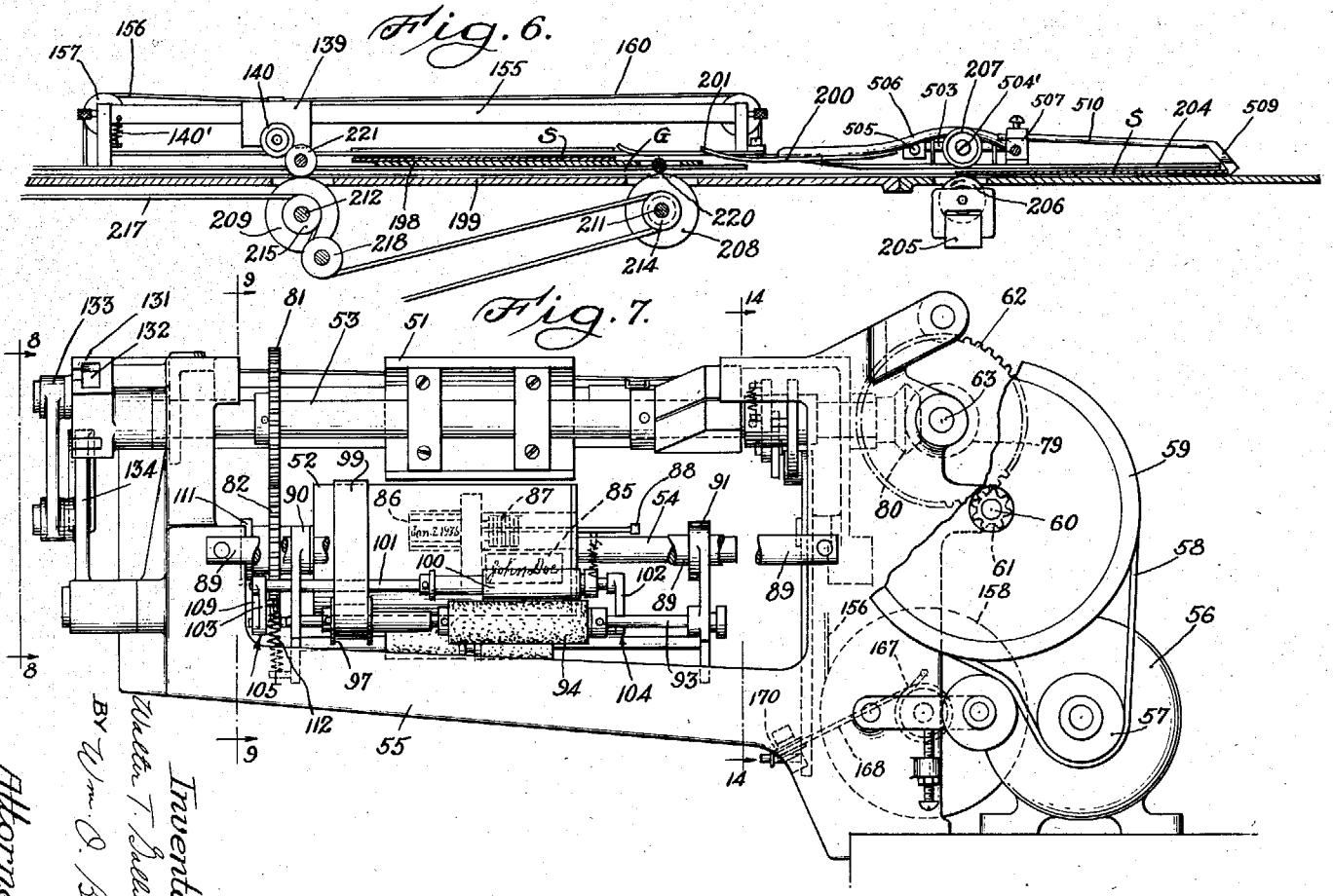
Fig. 6 is a vertical sectional view taken substantially on the line 6—6 on Fig. 1.
Fig. 7 is a rear elevational view of the parts illustrated in Fig. 5.

When the roller 180 moves a sheet toward the right, as viewed in Figs. 5 and 6, the shutter 200 is in the elevated position shown in Fig. 6 and the sheet engages the upturned end 201 of this shutter and is deflected thereby down onto the bottom wall 199 of the sheet guideway and the sheets are then fed onto the table 202 of the variable printer. The guideway G is provided by two strips 203 and 204 undercut on their adjacent sides and the sheets S pass through these undercut portions. By referring to Fig. 5 it will be noted that the roller 197 is positioned to engage the sheets after they have passed below the shutter 200. Suitable means, to be described more fully hereinafter, are provided for determining whether or not a sheet is properly positioned in the variable printer and if properly positioned an impression is made thereon by the variable printer in a manner described hereinafter.

After an impression has been made on a sheet by the variable printer it is fed to the left, as viewed in Fig. 1, and in this instance the sheet travels on the bottom wall 199 of the sheet guideway G and it will therefore pass below the pan 198. To insure such passage of the sheet, the shutter 200 is lowered into engagement with the right hand edge of the pan 198, the manner in which said shutter is so moved being explained hereinafter.

In order to move the sheet rapidly toward the left, a motor 205 (Figs. 6 and 28) is mounted below the guideway G and includes a roller 206 that projects up through an opening in the lower wall on the sheet guideway. A clamping roller 207 is mounted above the guideway and, in a manner to be described hereinafter, after an impression has been made on a sheet by the variable printer this roller 207 lowers and clamps the sheet in engagement with the roller 206 whereupon the sheet is rapidly fed toward the left as viewed in Fig. 1.

As best shown in Figs. 6 and 11, three rollers 208, 209 and 210 project through suitable openings in the bottom wall 199 of the sheet guideway and, as best shown in Fig. 6, clamping rollers mountedimmediately thereabove cooperate therewith. The rollers 208, 209 and 210 are respectively fast on shafts 211, 212 and 213 on which shafts pulleys 214, 215 and 216 are respectively fast. An endless belt 17 is passed about the pulleys 216, 215 and 214 and about a suitably mounted idler pulley 218 and also about a pulley 219 mounted on the end of the shaft of the motor 56 opposite the end of such shaft whereas the pulley 57 is mounted. Thus so long as the motor 56 is in operation the rollers 208, 209 and 210 are rotated and after a sheet has been fed by the rollers 206 and 207 it first moves into the bight between the roller 208 and its permanently mounted clamping roller 220 and then into the bight between the roller 209 and its permanently mounted clamping roller 221 and thence into position above the roller 210 and below the movably mounted clamping roller 222 that cooperates with the roller 210. The just described rollers feed the sheet into the addressing machine. The cooperation of the clamping roller 222 with the roller 210 will be described more fully hereinafter.

It will thus be seen that after a sheet is severed from the web it is first fed to the right into the variable printer, then printed, and then fed to the left into the printing machine and that in a part of its movement to the left the sheet moves below a part of its line of travel to the right.

The timing of the sheet movement in conjunction with operation of the variable printer and the timing of operation of the variable printer relative to the web feeding and severing means are explained in connection with the description of the variable printer, but this timing is such that the sheets are fed one at a time into and from the variable printer. In the present instance upon moving from the variable printer the sheets are fed into an addressing machine wherein the name and address A on the check C or other identification is printed on the sheets.

*Addressing machine*

The addressing machine includes a frame 225 (Figs. 18 and 19) in which a main drive shaft 226 is journaled. Power is supplied to this main drive shaft in a manner to be explained presently. A cam shaft 227 is also journaled in the frame 225 and in the present instance a gear train 228 interconnects the main drive shaft 226 and the cam shaft 227 for operation in a one-to-one ratio, that is to say, so that the cam shaft will make one revolution each time the drive shaft makes one revolution. A rod 229 (Figs. 5 and 18) is mounted in the frame 225 adjacent the cam shaft 227. The means which control the movement of sheets through the sheet guideway G are mounted on the rod 229 and are operated by cams carried by the cam shaft 227. Stop fingers are provided in the present instance which are movable to and from engagement with the leading edge of sheets moving through the guideway, these fingers being moved into stopping position and holding the sheets against further movement until a predetermined time in the operation when they are retracted from engagement with the sheets to permit the sheets to move to the left through the guideway.

The stop fingers are mounted for pivotal movement on the rod 229 and are moved to and from stopping position by cams mounted on the cam shaft 227. If it is desired to change the time at which the stop fingers move to or from stopping position, it is necessary to change the cams, peripheral cams being used for this purpose. One such cam is indicated by 230 in Figs. 3 and 4 and is in the form of a disc having a configuration which will operate one of the stop fingers in the manner required. A slot 231 extends inwardly from the periphery of the disc 230 and is adapted to embrace the shaft 227 when the disc is slipped into the slot 231 in the collar 232 fast on the shaft 227. An opening 233 is provided in the disc 232 in which a spring-pressed ball 234, mounted in an axially extending opening 235 in the collar 232, is adapted to seat. The seating of the ball 234 in the opening 233 prevents undesired displacement of the cam 230 from the collar 232 but the cam can be removed when desired by merely exerting sufficient force to unseat the ball 234. It will be seen that this arrangement enables a cam such as the cam 230 to be quickly removed and replaced by another of a different configuration when it is desired to change the time of operation of a stop finger or the like controlled by the cam.

A stop finger of the kind just referred to is indicated by 236 in Fig. 5 and this stop finger is mounted on the rod 229 and is pivoted to and from stopping position by the cam 230 mounted on the cam shaft 227 in the manner just described. The configuration of the cam 230 is such that when a sheet is moved by the rollers 208 and 209, and their cooperating clamping rollers, into position above the roller 210 the stop finger 236 will be in position to engage the leading edge of the sheet and arrest its movement so that the sheet will be positioned above the roller 210 and under the roller 222, as previously described.

The roller 222 is carried on a rod 237 pivotally mounted at 238 on the bed of the printing machine. A finger 239 is connected to the rod 237 and is pivotally mounted on the rod 229. The finger 239 is controlled by the cam 230*a* mounted on the cam shaft 227. At a predetermined time after a sheet has been stopped by the stop finger 236, the cam acts to raise the stop finger 236 and the cam 230*a* acts to lower the finger 239 whereupon the rod 237 is lowered, and the roller 222 clamps the sheet against the roller 210 so that the sheet is moved forwardly in the sheet guideway into the printing position of the addressing machine, that is to say, below the platen P of such a machine.

A stop finger 240 (Fig. 1) is provided which, after the stop finger 236 has been elevated, is moved into lowered position to engage the leading edge of the sheet S and position it relative to the platen P so that an impression can be made at the proper place thereon, this impression in the present instance being the name A and the like on the check C. A motor in the housing 241 operates the roller 242 that engages the sheet S prior to and during the time it is engaged by the stop finger 240 so that as soon as the platen P has made an impression on the sheet S and the stop finger 240 is raised the sheet will be fed through the sheet guideway to the form printing couple, to be described presently. If desired, the roller 242 may be controlled by the stop finger 240 so that it will be lowered when the stop finger is raised.

The platen P makes impressions on the sheets S from printing devices D in the present instance through an ink ribbon IR, although it is to be understood that impressions could be made from printing devices in any desired way depending, of course, upon the nature of the printing devices, an ink ribbon IR being a convenient way to make impressions when the printing characters are embossed on the plate such as 41 as in the present instance.

Printing devices are initially introduced into the machine by stacking them in a magazine M at the rear end of the printing device guideway 243. Chains, such as 244, are mounted at each side of the printing device guideway and are directed about sprockets 245 and 246 respectively mounted on shafts 247 and 248 mounted in the frame 225 beyond the front and rear ends of the printing device guideway 243. Pawls, such as 249, are provided at spaced intervals on the chains 244 and these pawls successively move into position to engage the lowermost printing device in the magazine M and then as a step by step movement is imparted to the chains, in a manner to be described, the printing devices are successively moved through stations until they reach printing position below the platen P after which they are discharged past the guide 250 to be collected in the usual manner. In the present instance the printing devices move through three stations intermediate the magazine M and printing position, the utility of which will be explained more fully hereinafter.

A step by step movement is imparted to the chains 244 from a rocker 251 carrying a pawl 252 successively engageable with spaced pins 253 mounted in the sprocket 245. The rocker 251 is mounted on a shaft 254 journaled in the frame 225. Another arm 255 is fast on the shaft 254 and is suitably connected to a sleeve 256 in which the lower end of a plunger 257 is releasably retained by a locking pawl 258. An eccentric 259 is mounted on the shaft 226 to be rotatable therewith and is surrounded by a band 260 connected to the plunger 257, and as the shaft 226 rotates the eccentric through the band 260 reciprocates the plunger 257 whereby the arm 255 and rocker 251 are rocked to successively disengage the pawl 252 from one of the pins 253 and engage it with the succeeding pin and to then impart an advancing movement to the chains 244 as the newly engaged pin 253 is driven forwardly.

The platen P is carried by a platen arm 261 pivotally mounted as at 262 on the frame 225. The platen arm carries a pair of rollers 263 and another pair of rollers 264 which respectively engage pairs of conjugated cams 265 and 266 that are releasably connected, in a manner to be explained, to the shaft 226. When the conjugated cams 265 and 266 are connected to the shaft 226 they operate in timed relation with the eccentric 259, and these cams cooperate with the rollers 263 and 264 on the platen arm 261 to move the platen on said arm downwardly to make an impression from a printing device during an at rest interval in the step by step movement of the printing devices through their guideway and to elevate the platen out of engagement with the printing devices at a time when a feeding movement is imparted to the printing devices. It is, of course, to be understood that if desired the feed of the printing devices can be so controlled that more than one impression can be made therefrom prior to their discharge from printing position, arrangements for this purpose being well understood in the art.

In a manner which will be explained more fully hereinafter an impression operation of the platen P may be arrested in event no sheet is fed into engagement with the stop finger 236, and therefore operation of the platen P is under control of the sheets fed through the machine.

After an impression has been made on a sheet S by the platen P the stop finger 240 is raised from engagement with the sheet whereupon the roller 242 feeds the sheet to the left toward the form printing couple wherein the form F is printed on the check C. If more than one impression is to be made from each printing device, one or more stop fingers would be provided to the left of the stop finger 240 and such fingers would be located so as to stop the sheet in position below the platen P to receive impressions in proper relation to other impressions thereon.

*Form printing couple*

Figure 25:
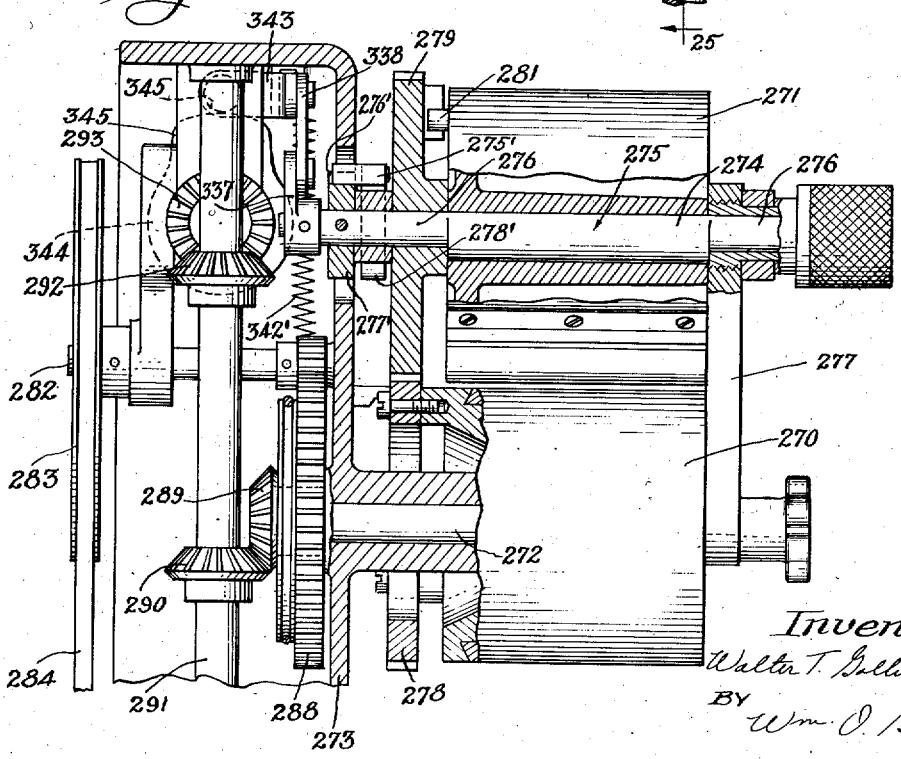
Fig. 25 is a vertical sectional view taken substantially on the line 25—25 on Fig. 24.
Figure 26:
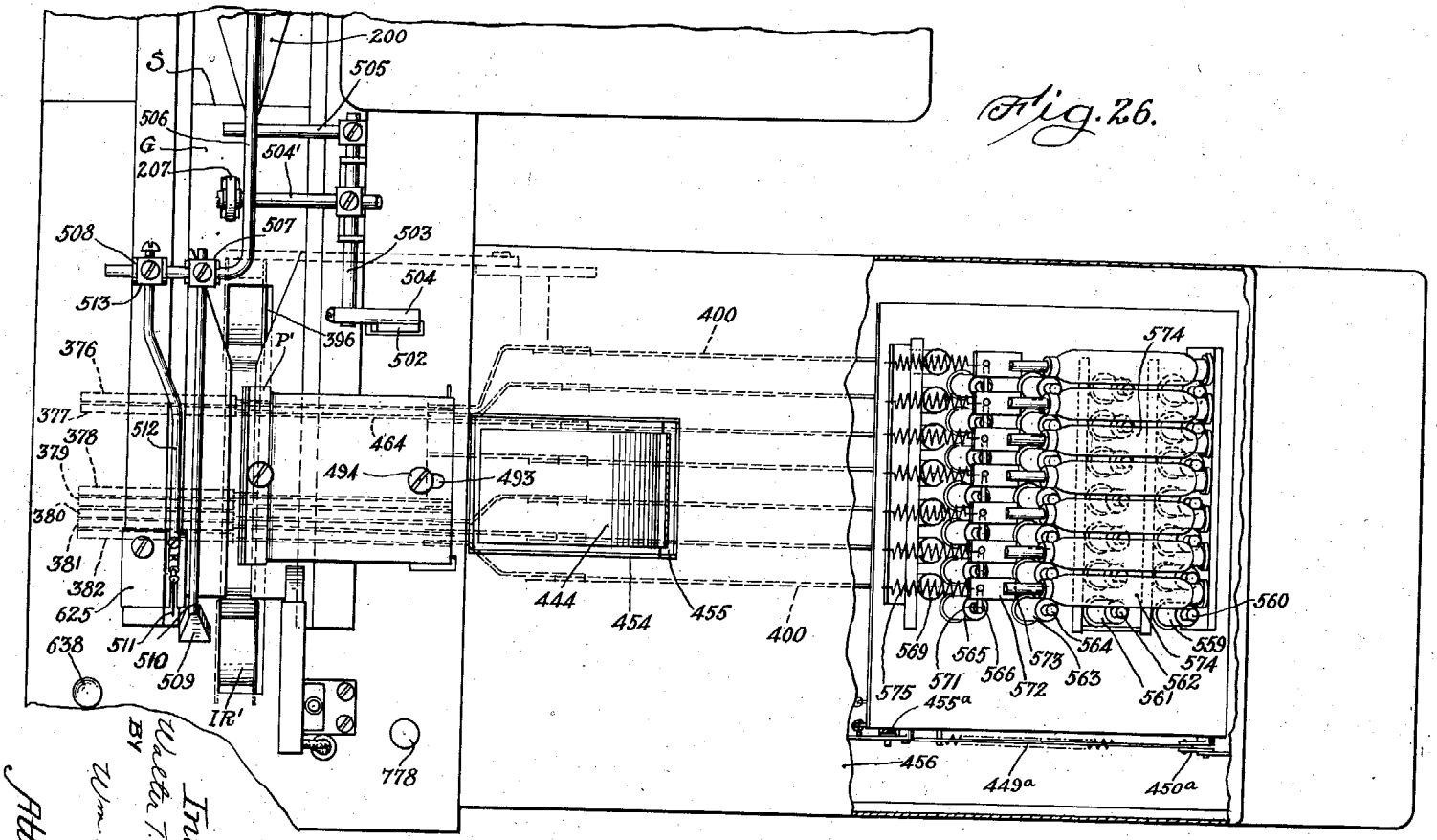
Fig. 26 is a top plan view of the variable printer and calculating machine employed in this invention.

The form printing couple illustrated in the accompanying drawings is of the kind shown in the application of Horace P. Brownsey, Serial No. 74,044, filed April 13, 1936, and includes a printing cylinder 270 and a platen cylinder 271. The printing cylinder 270 is fast on a shaft 272 journaled in the form printing couple frame 273. The platen cylinder 271 is mounted on the eccentric part 274 of the shaft 275 which has concentric bearings 276 at opposite ends thereof, one of the bearings 276 being journaled in the frame 273. The shafts 272 and 275 project outwardly from the frame 273 and an overhanging bearing device 277 is provided at the free ends of these shafts to increase the rigidity of the structure. A gear 278 is fast to the printing cylinder 270 in the manner best illustrated in Fig. 25 and meshes with a gear 279 rotatably mounted on the bearing 276 journaled in the frame 273. The gear 279 carries a lug 280 engageable with a stud 281 fast in the platen cylinder 271. The engagement of the stud 281 with the lug 280 enables the cylinder 271 to be moved relative to the gear 279. The gears 278 and 279 are of the same size and when rotated drive the printing cylinder 270 and the platen cylinder 271 in synchronism. The cylinders 270 and 271 are moved into cooperating relation to make impressions on sheets S fed through the bight therebetween and this relationship of the cylinders is so controlled that offsets are not made on the blanket on the cylinder 271 when no sheet is passed through the bight, as will be explained more fully hereinafter.

A shaft 282 is journaled in the frame 273 and a pulley 283 is fast thereon. An endless belt 284 is passed about the pulley 283 and a pulley 285 (Fig. 1) fast on the shaft of the motor 286 mounted on the frame 225 of the printing machine. When the motor 286 is set in operation, the shaft 282 is driven therewith and the pinion 287 fast thereon and meshed with the gear 288 drives this gear and the shaft 272 on which it is fast.

Figures 19, 20, 21:
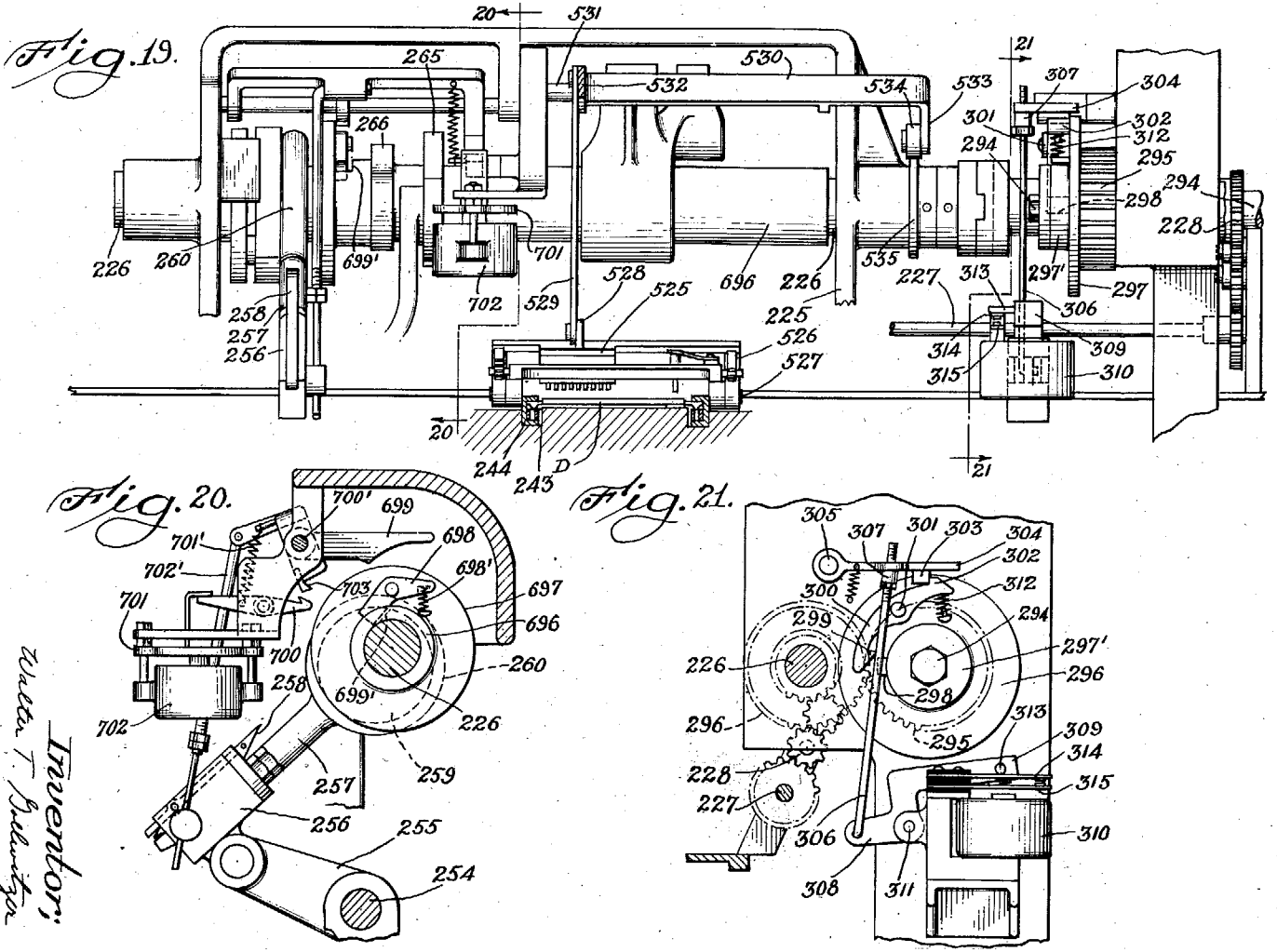
Fig. 19 is a rear view showing the main drive shaft of the printing machine and the parts mounted thereon.
Fig. 20 is a vertical sectional view taken substantially on the line 20—20 on Fig. 19.
Fig. 21 is a vertical sectional view taken substantially on the line 21—21 on Fig. 19.
Figure 24:
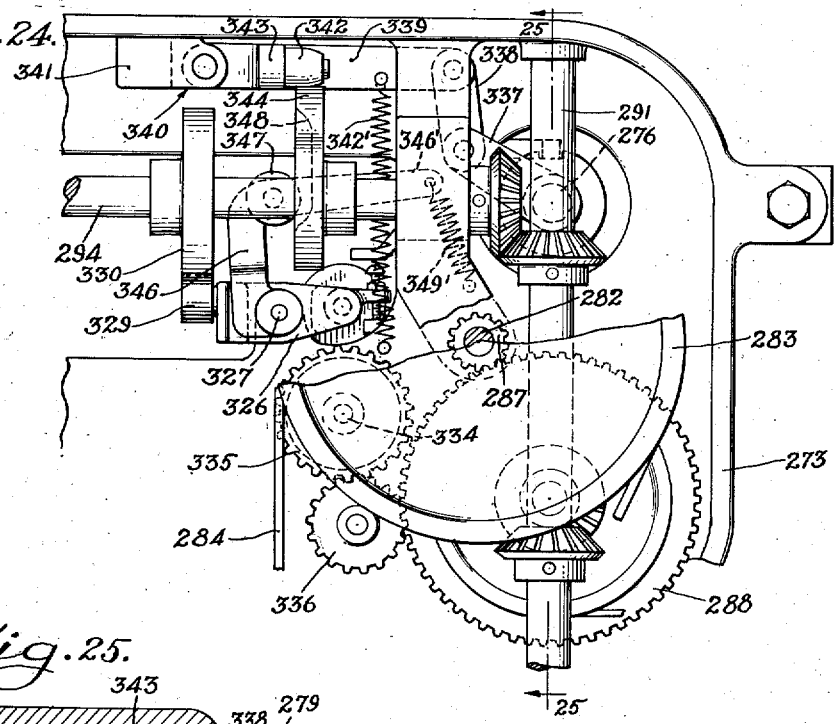
Fig. 24 is a rear elevation, in which certain parts are broken away, of the printing couple shown in Fig. 22.

A bevel gear 289 is also fast on the shaft 272 and meshes with a bevel gear 290 fast on the vertical shaft 291 journaled in the frame 273. Another bevel gear 292 on the shaft 291 meshes with a bevel gear 293 fast on the shaft 294 (Figs. 1, 19 and 24). So long as the motor 286 is kept in operation the shaft 272 and therefore the printing cylinders 270 and 271 are rotated as are the shafts 291 and 294.

A gear 295 (Figs. 1, 19 and 21) rotatably mounted on the shaft 294 meshes with a gear 296 fast on the shaft 226. A disc 297 is fast to the gear 295 adjacent a collar 297' fast to the shaft 294. The collar 297' carries a stud 298 engageable with the hook 299 on the pawl 300 pivotally mounted at 301 on the disc 297. The pawl 300 also carries a hook 302 engageable with a stud 303 on the plate 304 that is pivotally mounted at 305 on the frame of the machine. A rod 306 has an adjustable boss 307 thereon that is engageable with the plate 304. The lower end of the rod 306 is connected to an arm 308 of the armature 309 of an electromagnet 310. When the electromagnet 310 is energized, the armature 309 thereof is attracted and said armature turns about its shaft 311 thereby elevating the rod 306 which lifts the plate 304 and disengages the stud 303 from the hook 302 whereupon the spring 312 forces the hook 299 into engagement with the stud 298 to thereby connect the disc 296 to the collar 297 so that said disc and therefore the gear 295 rotate with the shaft 294, this also imparting rotative movement to the shaft 226 and to the camshaft 227 through the gear train 228. When the hook 299 is disengaged from the stud 298, the hook 302 will engage the stud 303 at a predetermined time, this stopping the shaft 226 in identical position each time so as to maintain timed relation between the addressing machine and the form printer.

For a purpose to be explained more fully hereinafter, the armature 309 carries a pin 313 engageable with the contact 314 to force this contact into engagement with the contact 315 when the electromagnet 310 is energized.

After a sheet is released by the stop finger 240 it passes between the paper guides 316 and 317 (Figs. 1 and 23) at opposite sides of the sheet guideway. A motor 318 is adjustably mounted on the guide 317 and is inclined to the direction of movement of the sheet S so that the roller 319 thereof acts on the sheet to not only force it to the left, as viewed ni Fig. 23, but also forcibly into engagement with the guide 317 to thereby accurately align the sheet with the usual printing form, such as an electroplate, provided on the printing cylinder 270.

As the sheet is moved along by the roller 319 it passes below the feeler finger 320 into engagement with the stop finger 321 which is shown out of stopping position in Fig. 22. When in stopping position this finger holds the sheet until the printing form on the printing cylinder 270 is in proper position whereupon the sheet or check is released by the stop finger 321 and fed into the bight between the cylinders 270 and 271 to have the form F printed thereon. The stop finger 321 is raised and lowered in timed relation with the rotation of the cylinders 270 and 271.

The stop finger 321 is fast on a shaft 322 supported by bosses 323 (Fig. 23) and is provided with an abutment 324 with which an adjustable pin 325 is engaged. The adjustable pin 325 is carried by a rocker 326 pivotally mounted on the shaft 327 journaled in the boss 328 (Fig. 23) carried by the frame 273. The pin 325 is urged toward the abutment 324 by a spring 325' acting on the rocker 326. A roller 329 on the rocker 326 engages a peripheral cam 330 fast on the shaft 294 which, since it is driven from the shaft 291, operates in timed relation with the shaft 272. Hence the configuration of the cam 330 may be such that a rocking movement is imparted to the rocker 326 in timed relation with the rotation of the cylinder 270 and therefore the cylinder 271. The rocking movement imparted to the rocker 326 acts through the adjustable pin 325 to raise the stop finger 321 in timed relation with the rotation of the cylinders 270 and 271, said finger 321 falling by gravity into stopping position when permitted so to do by the rocker 326.

A shaft 331 fast in the rocker 326 carries a clamping roller 332 that is adapted to cooperate with the sheet driving roller 333 to force a sheet S into the bight between the cylinders 270 and 271 upon elevation of the stop finger 321, said roller 332 moving into clamping relation with the roller 333 when the rocker 326 moves downwardly to elevate the stop finger 321. The roller 332 is mounted on a shaft 334 on which a gear 335 (Fig. 24) is fast that meshes with an intermediate gear 336 which in turn meshes with the gear 288, the ratio between these gears being such that a rapid rotary motion is imparted to the shaft 334 and therefore the roller 333, the utility of the intermediate gear 336 being to drive the roller 333 toward the bight between the cylinders 270 and 271.

It has been explained that the platen cylinder 271 is mounted on an eccentric portion 274 of the shaft 275. When an impression is to be made of a sheet S, the eccentric portion 274 of the shaft 275 is so disposed that the platen cylinder 271 is in cooperating relation with the printing cylinder 270. The eccentric portion 274 is initially moved into and held in such a position when the first sheet to be printed is in engagement with the stop finger 321, and this is accomplished in the following manner. An arm 337 (Figs. 24 and 25) is fast on the bearing 276 of the shaft 275 journaled in the frame 273 and a link 338 is pivotally connected to the free end of the arm 337. A link 338 is connected to one end of an arm 339 of a rocker 340 (Fig. 23) which is pivotally mounted in a bifurcation in a block 341 fast on the frame 273. A spring 342' (Fig. 24) acts on the arm 339 to urge it downwardly and thereby hold a roller 342 on an arm 343 on the rocker 340 in engagement with a peripheral cam 344 fast on the shaft 294. A lobe 345 on the cam 344 engages the roller 342 immediately prior to the time the stop finger 321 is elevated by the rocker 326, and this lobe is so shaped that it moves the arm 343 and therefore the arm 339 upwardly and this movement is transmitted through the link 338 and arm 337 to bearing 276 of shaft 275 whereupon the eccentric portion 274 is so moved that the cylinder 271 is moved into cooperating relation with the cylinder 270. However, by reference to Fig. 25 it will be noted that the lobe 345 is of relatively short extent and shortly after the cylinder 271 is moved into cooperating relation with the cylinder 270 this lobe disengages the roller 342. Such disengagement would permit the spring 342' to lower the arm 339 with the result that the eccentric portion 274 would be so turned that the cylinder 271 would be moved from cooperating relation with the cylinder 270. This is prevented by providing a stop lug 275' engageable in a notch 276' in a collar 277' fast on the bearing 276 of the shaft 275 journaled in the frame 273. The stop lug 275' is carried by a rocker 278' pivotally mounted, as indicated at 279' on the frame 273. The stop lug 275' remains in the notch 276' and prevents rotation of the shaft 275 and of the eccentric portion 274 thereof so long as sheets are successively fed into engagement with the stop finger 321. However, when no sheet is fed into engagement with the stop finger 321, the shaft 275 is to be rotated to so position the eccentric part 274 that the cylinder 271 will be moved from cooperating relation with the cylinder 270, and this prevents the formation of offsets on the blanket carried by the cylinder 271.

Figures 22, 23:
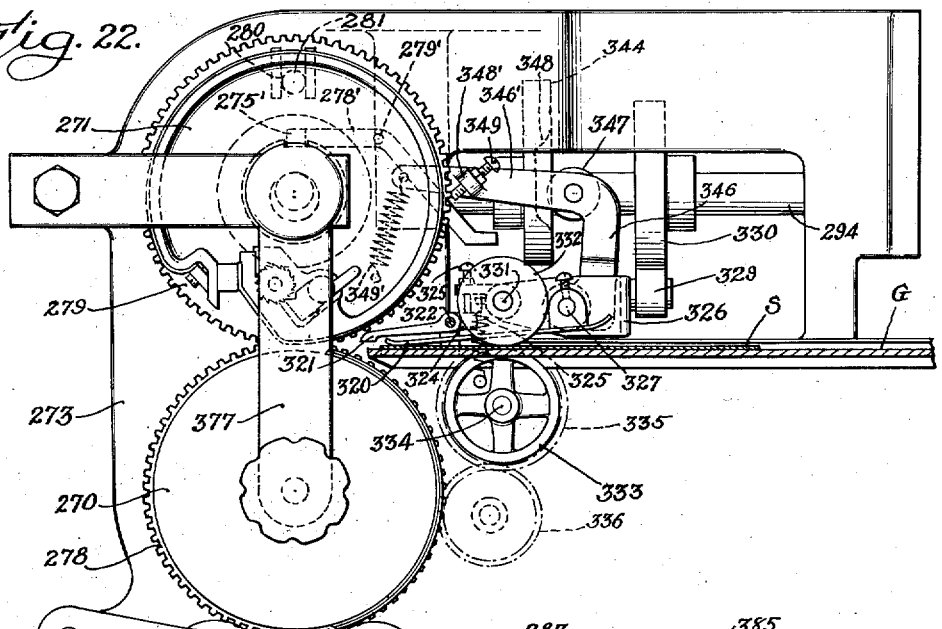
Fig. 22 is a fragmentary front elevation of another printing couple employed in the machine.
Fig. 23 is a top plan view of the printing couple and associated parts shown in Fig. 22.

The feeler finger 320 determines whether or not a sheet is engaged with the stop finger 321, said finger, as best illustrated in Fig. 22, resting on such sheet. This finger 320 is fast on the shaft 327 on which the rocker 326 is pivotally mounted and an arm 346 is also fast on this shaft 327, the finger 320 being mounted on one side of the rocker 326 and the arm 346 being mounted on the other side of said rocker. The arm 346 carries a roller 347 engageable with a face cam 348 formed in one face of the cam 344. The arm 346 includes an extension 346' which has a lug 348' thereon that carries an adjustable pin 349. The finger 320 is urged toward the sheet S and the roller 347 is urged toward the cam 348 by a spring 349' (Fig. 22) that acts on the extension 346'.

When the finger 320 engages a sheet S, the roller 347 is held from following the contour of a drop in the face cam 348. When, however, no sheet is engaged with the stop finger 321, the feeler finger 320 may fall into a recess 320' formed in the bottom wall of the sheet guideway and when the finger 320 moves into such position, the roller 347 is permitted to follow the contour of the drop in the face cam 348 under the action of the spring 349'. This permits the extension 346' to move downwardly and the adjustable pin 349 thereon then engages the rocker 278' and so pivots this rocker that the stop lug 275' is moved out of the notch 276'. Thus when the lobe 345 moves from engagement with the roller 342, the spring 342' will lower the arm 339 which will so rotate the bearing 276 of the shaft 275 that the eccentric portion 274 will move the cylinder 271 from cooperating relation with the cylinder 270, and this occurs prior to the time the printing form on the cylinder 270 moves into association with the blanket 221 and hence no offset is formed. The drop in the cam 348 is so shaped that immediately after the shaft 275 has been rotated to separate the cylinder 271 from the cylinder 270 the roller 347 moves out of the drop in the cam 348 which disengages the pin 349 from the rocker 278'. In the succeeding cycle of operation the stop lug 275' will reengage in the notch 276' and if a sheet is below the feeler finger 320 the cylinder 271 will remain in cooperating relation with the cylinder 270, but if there is no sheet below the feeler finger 320 then the just described operation will be repeated and will repeat in each cycle of operation until the feeler finger 320 engages a sheet S.

The electroplate or other form provided on the printing cylinder 270 may be retained thereon in the manner shown in the patent to Kranz, No. 1,955,814, patented April 24, 1934, and ink may be supplied to this printing form in the manner shown in the patent to Kranz, No. 1,946,217, patented February 6, 1934. Furthermore, to insure that neat and uniform impressions may be made in the printing couple, the platen cylinder 271 is preferably equipped with a tensionable blanket such as, for example, that shown and described in the patent to Kranz, No. 1,937,119, patented November 28, 1933.

After leaving the printing couple afforded by the cylinders 270 and 271, the sheets pass to a suitable collecting tray H (Fig. 1).

It will be apparent that in the machine as thus far described a web may be withdrawn from a roll and impressions may be made at spaced intervals on the web and thereafter the web may be divided into sheets intermediate the spaced impressions made thereon. Then the sheets may be passed to a variable printer wherein impressions may be made thereon under control of the printing devices and thereafter the sheets may be passed to an arrangement such as an addressing machine to have impressions made thereon directly from printing devices and then the sheets are passed to a printing couple wherein a form is printed on the sheets. It is believed that it will be apparent from this that business instruments, such as checks, notices, bills and the like, may be printed in this machine and that impressions may be made thereon directly from and also under control of printing devices sequentially fed through the machine so that an identification such as a name and numerical accounting data such as a sum of money may be printed thereon and also so that a form and other pertinent data may be printed thereon. The numerical accounting data to which reference has just been made is in the present instance representative of the sum of money to be paid by the check and is printed in the variable printer of this invention.

*Variable printer*

The variable printer of this invention is preferably associated with a calculating machine, which in the present instance is an adding machine, so that the amounts printed on the checks may be totalized to facilitate verification and preferably the amounts printed on the business instruments by the variable printer are also printed on a detail strip in the calculating machine to afford a record useful for checking purposes and the like.

The printing members of the variable printer of this invention may be set up in a number of different ways. I have in the present instance shown these printing members as being positioned by the slide bars that are under control of the keys of the adding machine, but it is to be understood that other means, independent of the adding machine, may be employed for this purpose.

The variable printer illustrated in Figs. 26 to 32C, inclusive, includes a frame 350 (Figs. 27 and 28) in which a drive shaft 351 is journaled. Power is imparted to this drive shaft 351 from a motor 352 mounted on the frame 350 and having a pinion 353 on the shaft thereof. The pinion 353 meshes with a gear 354 mounted on a stud shaft carried by the frame 350 and the gear 354 in turn meshes with a gear 355 fast on a stud shaft 356. A pinion 357 also fast on the stud shaft 356 meshes with a gear 358 rotatably mounted on the drive shaft 351.

The gear 358 includes a hub 359 (Fig. 28) having clutch teeth 360 thereon engageable with the clutch teeth 361 on a collar 362 slidably but nonrotatably mounted on the drive shaft 351. A stud 363 (Fig. 27) on the collar 362 is engageable with a cam surface 364 (Fig. 28) on a plate 365 pivotally mounted on the frame 350 at 366. A shoulder 367 is provided on an arm 368 carried by the armature 369 of the electromagnet 370 that is slidable vertically on the guides 371. When the electromagnet 370 is energized, the armature 369 is moved upwardly correspondingly moving the arm 368 whereupon the shoulder 367 engages the free edge of the plate 365 and pivots this plate upwardly to disengage the cam surface 364 from the stud 363, whereupon the springs 372 force the collar 362 toward the hub 359 to thereby engage the clutch teeth 361 with the clutch teeth 360 whereupon the shaft 351 is connected to the gear 358 to rotate therewith, and so long as the electromagnet 370 is energized the shaft 351 will continue to rotate. When, however, the electromagnet 370 is deenergized the armature 369 thereof resumes the position shown in Fig. 28 and the shoulder 367 disengages the free edge of the plate 365 which thereupon pivots back into the position shown in Fig. 27, and at a predetermined time in the rotation of the collar 362 with the shaft 351 the stud 363 engages the cam surface 364 and moves over this cam surface to disengage the teeth 361 from the teeth 360, thus interrupting operation of the shaft 351. The variable printer and the calculating machine are operated from the shaft 351. A reciprocatory movement is imparted to a link 373 from a crank fast on the shaft 351 in each rotation of the shaft 351. The link 373 is pivotally connected to a crank member 374 fast on the main operating shaft 375 of the calculating machine. The variable printer is operated directly from the shaft 351.

It has been explained heretofore that nine rows of openings are provided in the frame 40 of the printing device D and that these nine rows of openings afford the indication for the digits of a nine place number. In the present instance, however, I have equipped the variable printer to print a seven place number and as a result the two left hand rows of openings, as the printing device is viewed in Fig. 38, are not employed in the machine as illustrated. Furthermore, since the present machine is adapted for preparation of checks and more particularly dividend checks, I have arranged the variable printer so that it will print dollars and cents. By reference to Fig. 37 it will be noted that the cents digits are spaced considerably from the dollar digits on the check C, in the present instance the words "Dollars and" appearing between the last digit of the dollars and the first digit of the cents amount. Thus in the machine as illustrated I provide a pair of type segments 376 and 377 for printing the cents amounts on the checks. The type segment 377 is spaced from a type segment 378, the type segment 377 being adapted to print the first digit of the cents and the type segment 378 being adapted to print the last digit of the dollars in the amount E on the check C. Other type segments 379, 380, 381 and 382 are provided in side by side relation with the type segment 378 for printing the other digits of the dollars of the amount E. The type segments are bifurcated at their lower ends and a shaft 383 is embraced in these bifurcations whereby the type segments are supported for rockable movement on the shaft 383, spacing collars 384 being mounted on the shaft 383 between the respective type segments and the adjacent parts of the frame 350.

Figure 29:
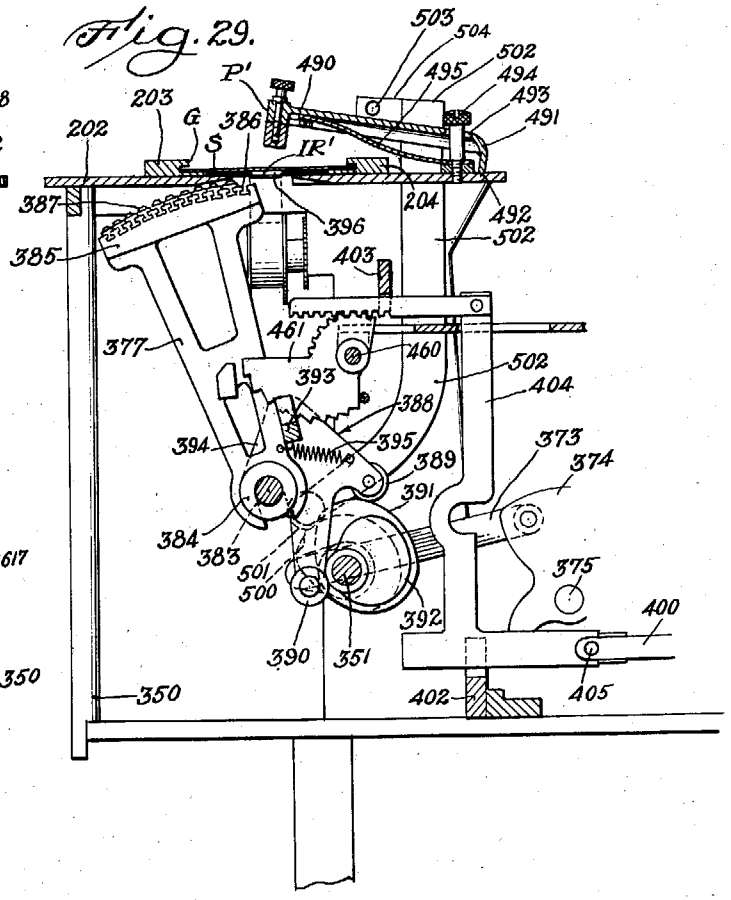
Fig. 29 is a vertical sectional view through the variable printer and taken substantially on the line 29—29 on Fig. 28.

Each of the type segments includes a type carrying head 385. Eleven key slots 386 are formed in the upper surface of the type heads 385 and type members 387 are adapted to be removably mounted in these key slots. All of the key slots are utilized in the dollar printing type segments, type members for printing figures 0 to 9 being provided as well as a type member for printing a star (*). As best shown in Fig. 30, the type member for printing the numeral 9 is arranged in the outermost position on the type heads 385 and the type members for printing the other figures and the star are arranged in declining order inwardly from the type member for printing the numeral 9, the star being last. As best shown in Fig. 29, the type heads 385 of the cents printing type segments do not carry a type member for printing a star.

A rocker 388 is rockably mounted on the shaft 383 and carries a pair of rollers 389 and 390 which respectively engage conjugated cams 391 and 392 on the shaft 351. A stop bar 393 is connected to the rocker 388 and has arms 394 at opposite ends that are pivotally mounted on the shaft 383. Each of the type segments is acted on by a spring 395 and these springs urge the type segments into engagement with the stop bar 393. When the machine is at rest the rocker 388 and stop bar 393 are positioned as shown in Fig. 29, and the type segments which are engaged therewith are so positioned that the innermost of the slots 386 is positioned just forwardly of the opening 396 in the bottom of the sheet guideway G through which opening impressions are made from the type members 387 in a manner to be described presently.

At a predetermined time in the rotation of the shaft 351, as will be explained more fully hereinafter, the cams 391 and 392 cause the rocker 388 to be moved clockwise in Fig. 29. This retracts the stop bar 393 from engagement with the type segments and the type segments may then be set up to have an impression made therefrom. Such set-up of the type segments is effected by the devices now to be described.

The type segments for printing dollar figures of the amount E on the checks are equipped, as stated, with stars and these stars are printed on the checks to the left, as the check is viewed in Fig. 37 of the first dollar digit. The type members which print such stars and the type members, on all type segments, which print the zeros are set up in a manner explained hereinafter. The type members on all type segments which print the digits 1 to 9 may be positioned in printing position in a variety of ways. However, in the illustrated embodiment I show these members as being positioned under control of devices in the adding machine, but it is to be understood that such devices or similar devices could be employed without being incorporated in an adding or other calculating machine.

The illustrated devices which position such digit printing type members include a slide bar, such as 400, which in the present instance is the usual slide bar provided in the adding machine. In Fig. 30 I have illustrated but one of these slide bars and I will now describe the arrangement and operation of this slide bar and the type segment with which it cooperates but it is to be understood that the other slide bars and type segments are arranged and operated in a similar manner.

A comb 402 (Fig. 29) is supported on the frame 350 below the plane of the slide bar 400 and another comb 403 is carried by the frame 350 well above the slide bar. An upright slide 404 is mounted in aligned teeth in the combs 402 and 403 and, as indicated at 405, is suitably connected to the slide bar 400. A stop arrangement under control of the vertical slide 404 positions the type segment which is under control of the slide bar 400, as is explained in detail hereinafter.

A row of nine keys 406 representative of the digits 1 to 9 is arranged above the slide bar 400 and when a digit from 1 to 9 is to be printed the key 406 corresponding to the selected digit is depressed, and in the present machine this is effected automatically, as will be explained hereinafter. Each of the keys 406 is urged upwardly by a spring 418 against a positioning stop 420.

Nine stops 407 are provided on the slide bar 400. These stops are alternately positioned on opposite sides of the slide bar and starting from the right hand end, as viewed in Fig. 30, each of the stops 407 is progressively spaced further from the stop to the right thereof than the preceding stop is positioned from the stop to its right. Each of the stops is adapted to cooperate with one of the keys and the first key and stop from the right are adapted to cooperate to position the type member on the type segment that will print the digit 1 in printing position below the opening 396, while the last of the keys and stops are adapted to cooperate to so position the type member which prints the digit 9 and the intervening keys and stops cooperate to position the type members corresponding to their numerical positions intermediate the first and last stops.

It has been explained that the stops 407 are unequally spaced one from the other and that a particular key is adapted to cooperate with each of the stops. Thus when the spring 401 acting on the slide bar 400 is permitted to move this slide to the right it does so until one of the stops 407 encounters the depressed key, and since the stops are unequally spaced apart there will be a different movement of the slide bar 400 for each different stop engagement with its particular key. The least movement will be imparted to the slide bar 400 when the first stop engages the first key and the greatest movement is imparted, that is to say, the movement for positioning the type member for the digit 9, when the last stop is to engage the last key.

When one of the keys 406 is depressed, it is locked in its depressed position until after a printing operation has been performed from the resultingly positioned type member whereupon the key is released. To this end a notch 408 is provided in the side of each key. A member 410 has a plurality of fingers 409 thereon and each of these fingers cooperates with a notch 408 and when one of the keys 406 is initially depressed the finger aligned with this key moves into the notch 408 therein and holds it down until the locking means engages this depressed key.

A boss 411 is provided on each of the keys 406 and an opening 412 is provided in each of these bosses. A slide bar 413 includes a plurality of fingers 414 that are adapted to selectively move into the openings 412, a finger 414 moving into the opening 412 on the depressed key. The slide bar 413 is urged toward the right, as viewed in Fig. 30, by a spring 415 (Fig. 27) and is held against the action of this spring by a bail, such as 417, that engages the rod 416 to which the slide bar 413 is connected. The bail 417 frees the rod 416 each time the crank member 374 is reciprocated and therefore in each cycle of operation any key that has been depressed will be locked down until released from the finger 44 engaged in the opening 412 therein.

Figure 27:
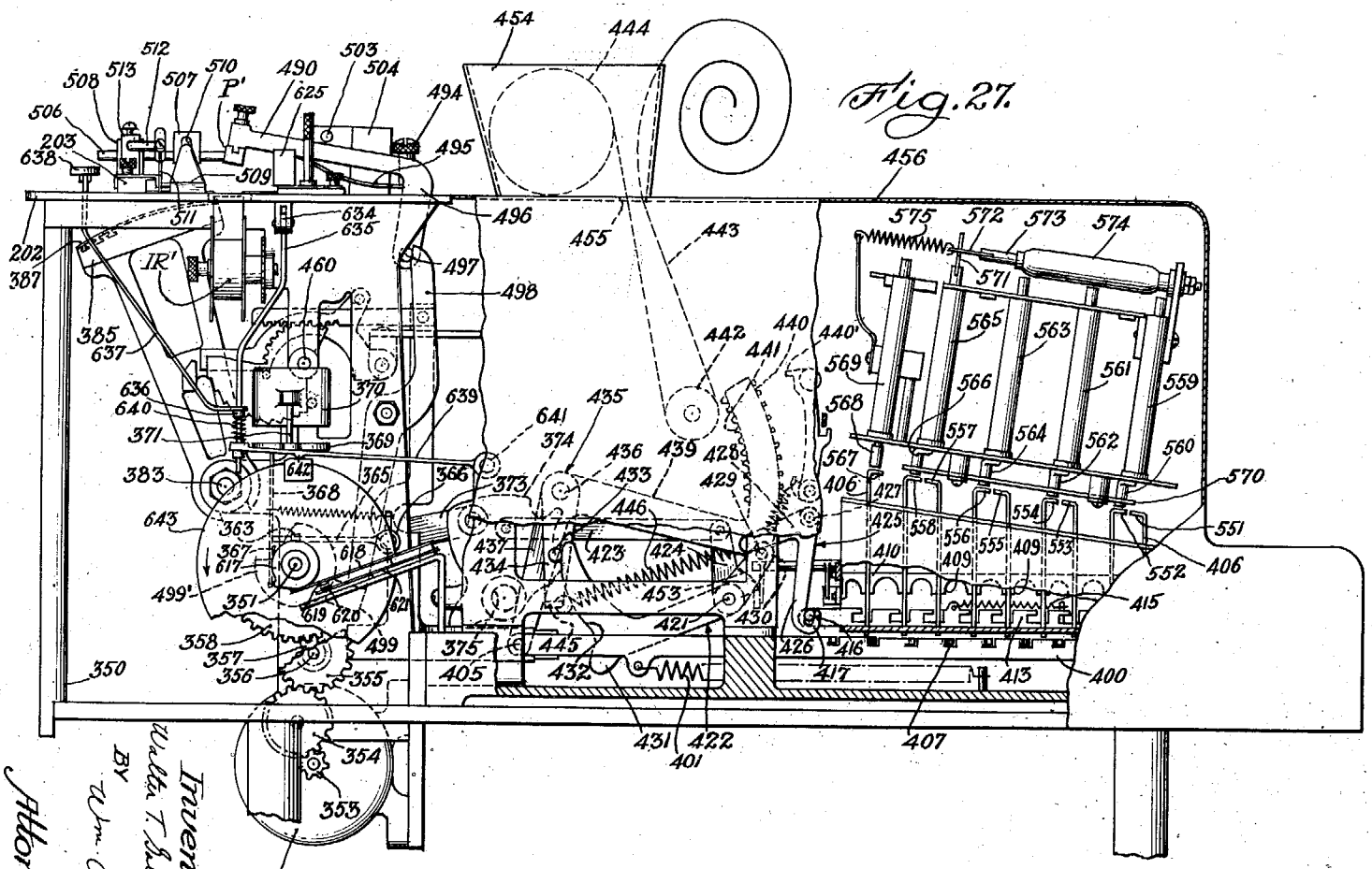
Fig. 27 is a side view of the variable printer and calculating machine.

It has been explained that it is desirable to prepare a detail strip by making impressions thereon corresponding to the impressions made on the checks C and to also accumulate a total of the amounts printed on the checks. While the total may be accumulated in any desired way, one means suitable for this purpose is described hereinafter. In order to prepare a detail strip, type segments are provided which in the present instance make impressions on the detail strip 443 withdrawn from the roll 444 mounted in the bin 454, the detail strip passing from the roll 444 through an opening 455 in the cover plate 456 and about the platen roller 442 and thence back out through the opening 455 and through the bin 454 to coil up exteriorly of the cover plate 456, as illustrated in Fig. 27. In the manner well understood in the art the platen roller 442 is advanced step by step intermediate impression operations on the detail strip 443.

The type segment of the kind which make impressions on the detail strip 443 is indicated by 40 and includes type members 441 which are selectively forced against the detail strip 443 on the platen roller 442 in the manner common in adding machines as, for example, by the hammer 440' released by devices in the adding machine at a predetermined time. The type segment 440 is carried by the arm 439 of a bell crank 435 fast on the shaft 436. The bell crank 435 also includes an arm 437 which is pivotally connected to the vertical slide 404 and the slide bar 400 at 405. Thus, each time the slide bar 400 moves to the right the bell crank 435 is correspondingly moved and since the type members 441 are positioned relative to the type members 387 a type member corresponding to one of the type members 387 will be positioned relative to the platen roller 442 to make an impression on the detail strip 443.

The type segment 440 is held in normal position illustrated in Fig. 27 by a stop bar 445 carried by an arm 434 pivotally mounted on the shaft 436. A pin 433 on the arm 434 is urged into engagement with the cam surface 432 on the crank arm 431 by a spring 446. The crank arm 431 is part of a crank structure 422 that is fast on a shaft 421. The arm 424 of the crank structure 422 is pivotally connected to a link 423 that is in turn pivotally connected to the crank member 374. Each time the crank member 374 is reciprocated by the link 373 movement is imparted to the crank structure 422 and the arm 431 is raised and the pin 433 rides over the cam surface 432 under the action of the spring 446 to thereby free the arm 437 and therefore the slide bar 400 and vertical slide 404 from the stop bar 445 which, as it is carried by the arm 434, is retracted away from the arms 437 when the pin 433 rides over the cam surface 432.

A pin 429 on the arm 430 of the crank structure 422 rides over a cam surface on the arm 428 of the bell crank 425 each time the crank member 374 is reciprocated. The bell crank 425 is pivotally mounted on a shaft 427 and includes arms 426 of the bail 417. Thus each time the pin 429 moves clockwise along the cam surface on the arm 428 the spring 415 may retract the slide bar 413 rearwardly to engage a finger 414 in the opening 412 of a depressed key, but when the pin 429 moves along said cam surface counterclockwise the slide bar 413 is moved against the action of the spring 415 and the engaged finger 414 is retracted from the opening 412 permitting the spring 418 acting on the depressed key to raise it up against the stop 420.

After one of the fingers 414 has engaged in an opening 412, the member 410 is rocked to disengage the fingers 409 from the keys 406. To this end an arm 419 is provided on the member 410 and this arm is connected to a slide bar 447 including an angle portion 448 against which the foot 449 of the rocker 450 bears. A spring 451 acts on the slide bar 447 to urge the angle portion 448 against the foot 449, and this spring also has the effect of holding the cam follower 452 on the rocker 450 in engagement with the cam 453 (Fig. 27) which is provided on a part of the crank structure 424, and these parts so operate that after the finger 414 has been disengaged in the manner above described and the depressed key 406 has reengaged the stop 420 the follower 452 attains a position on the cam 453 which enables the spring 451 to so actuate the slide 447 that the member 410 repositions the fingers 409 for engagement with the keys 406.

A shaft 460 is provided in the variable printer and a plurality of stop plates, such as 461, are rotatably mounted thereon adjacent each of the type segments 376 to 382, inclusive. In Fig. 30, the stop plate 461 and associated parts for a dollar printing type segment are shown while in Fig. 29 the stop plate is shown in the arrangement in which it cooperates with a cents printing type segment. Referring first to Fig. 30 it will be noted that a gear segment 462 is provided on the stop plate 461 and that a rack 463 on a bar 464 meshes with this gear segment. The bar 464 is connected to the vertical slide 404 to move therewith.

The stop plates 461 normally rest against a stop rod 465 and when engaged with this stop rod the stop plates position all type segments to print zeros when the type segments engage therewith. This positioning of the type segments is effected by the engagement of a block 466 on the type segment with a stop 467 on the stop plate 461 when a zero is to be printed or with a stop 468 (Fig. 31) on the stop plate 461 when "9" is to be printed, and when digits 1 to 8 are to be printed the block 466 engages stops on the stop plate 461 successively positioned intermediate the stops 467 and 468. In order to print "0" or any digit from 1 to 9, one of the stops on the stop plate 461 is disposed in position to be engaged by the block 466 and the manner in which the stops on the stop plate are positioned to effect this will be explained presently.

However, the dollar printing type segments are equipped to print a star and on these type segments the star is positioned to the right of the zero, as viewed in Fig. 30. Thus a stop arm 469 is provided which is mounted on a shaft 470 and this stop arm is adapted to position the dollar printing type segments so that a star may be printed therefrom, and to this end it should be noted that the stop 471 on the stop arm 469 is positioned forwardly of the zero printing stop 467 on the stop plate 461.

A stop plate 461 is associated with each of the type segments 378 to 382, inclusive, but a stop arm 469 is associated only with the stop plates 461 that control the dollar printing type segments 378 to 382, inclusive. Furthermore, it has been explained that it is desirable to print stars to the left, as viewed in Fig. 37, of the first digit in the amount E and it is for this reason that the stop 471 is positioned forwardly of the stop 467 for if the stop 471 is not moved out of the path of the block 466 the block 466 will engage therewith and position a star below the opening 396 to have an impression made therefrom. However, after a digit has been printed it is desirable to print zeros where necessary in the dollars portion of the amount E, and in order that this may be accomplished it is necessary to move the stop 471 out of the path of the block 466 so that the block 466 may engage the stop 467 and to this end the following arrangement is provided.

In Fig. 32 I have illustrated stop arms 469*a* to 469*e* that are adapted to be respectively associated with the type segments 378 to 382, inclusive. A pin 472 is mounted in the stop arm 469*e* and projects toward the stop arm 469*d*, as indicated at 473. The upper half of the part 473 of the pin 472, however, is cut away. A pin 474 is mounted in the stop arm 469*d* and includes a part 475 which projects toward the stop arm 469*e* but the lower half of this part 475 is cut away so that the part 475 may rest on the part 473. The pin 474 includes a part 476 similar to the part 473 and a pin 477 in the stop arm 469*c* includes a part 478 which rests on the part 476 of the pin 475. Likewise a pin 479 in the stop arm 469*b* includes a part 480 which rests on the part 481 of the pin 477 and a part 482 of the pin 483 in the stop arm 469*a* rests on the part 484 of the pin 481. A pin 485 (Fig. 30) is fast in each of the stop plates 461 associated with the dollars printing segments and these pins are respectively disposed below the stop arms 469*a* to 469*e*, inclusive.

When the type segment 382 is positioned to print a digit from 1 to 9, the stop plate 461 is rotated to bring one of the stops behind the stop 467 thereon into the path of the block 466. This movement of the stop plate is transmitted through the pin 485 to raise the stop arm 469*e* associated with this stop plate 461. It will be noted that the part 473 of the pin 472 in the stop arm 469 is below the part 475 of the pin 474 in the stop arm 469*d* and that progressively to the left, as viewed in Fig. 32, each of the pins in one of the stop arms 469*a* to 469*d* is below a part of the pin fast in the stop arm to the left of its position. Hence, when the stop plate 461 associated with the type segment 382 is raised all of the stop arms 469*a* to 469*e* are raised. However, if no digit from 1 to 9 is to be printed by the type members carried by the type segment 382 but a digit is to be printed from the type member carried by the type segment 381 then a stop on the stop plate 461 associated with the type segment 381 and behind the stop arm 469*e* is positioned to engage the block 466. This will cause the pin 485 in the stop plate 461 associated with the type segment 381 to raise the stop arm 469*d* in the manner previously described. This will cause all of the stop arms to the left of the stop arm 469 to be raised but the part 475 on the pin 474 in the stop arm 469*d* will move away from the part 473 of the pin 472 in the stop arm 469*e* with the result that the stop arm 469*e* will remain in the position illustrated in Fig. 30, and therefore when the block 466 on the type segment 382 engages with the stop 471 on this stop arm the type segment 382 will be so positioned that a star will be printed therefrom but all of the type segments to the left of the segment 382, as viewed in Fig. 28, will either print digits from 1 to 9 or a zero depending upon the position of the stop plate 461 associated therewith.

Normally the zero stops 467 on the plates 461 are in position to be engaged by the stop blocks 466, provided of course on the dollars printing type segments the stop arms 469 are moved as above described. No stop arms are associated with the cents printing type segments since these will either print digits from 1 to 9 or zeros and normally in connection with the cents printing type segments the stops 467 are in position to be engaged thereby. However, when a digit from 1 to 9 is to be printed it is necessary to move one of the other stops on the stop plates into position to be engaged by the stop block 466 and this is effected from the slide bars 400. When the slide bars 400 move to engage depressed keys in the manner previously described, the vertical slides 404 are moved through the teeth in the combs 402 and 403 in an amount corresponding to the amount of movement of the slide bars with which they are connected. This movement of the vertical slides 404 is transmitted through the arms 464, racks 463, gear segments 462 to the stop plates 461 and this movement so rotates the stop plates 461 that a stop corresponding to the digit represented by the depressed key is in position to be engaged by the stop block whereupon the type member 387 for this digit is positioned below the opening 396 to have an impression made therefrom by the platen P'.

The platen P' is carried by a plate 490 which is bent downwardly at its rear end to provide a knife edge 492 (Fig. 29) rested in a groove in the table top 202 of the variable printer. An opening 493 is provided in the plate 490 and a post 494 passes through this opening to retain the plate 496 in position. A spring 495 carried by the post 494 and its support acts on the plate 490 to urge it downwardly. An arm 496 (Fig. 27) depends from the rear end of the plate 490 and carries a pin 497 that is engaged by one end of a rocker 498 pivotally mounted on the frame 350 and carrying a block 499 engageable with a cam 499′ fast on the shaft 351. The block 499 follows the cam 499′ and at a predetermined time in the rotation of the shaft 351 the block 499 is forced into a relieved part on the cam 499′, and this permits the platen P′ to quickly move toward the type segments which will be positioned therebelow at this time and an impression is made from the type segments through an ink ribbon IR′ by the platen P′ on a sheet S positioned in the variable printer.

Figure 28:
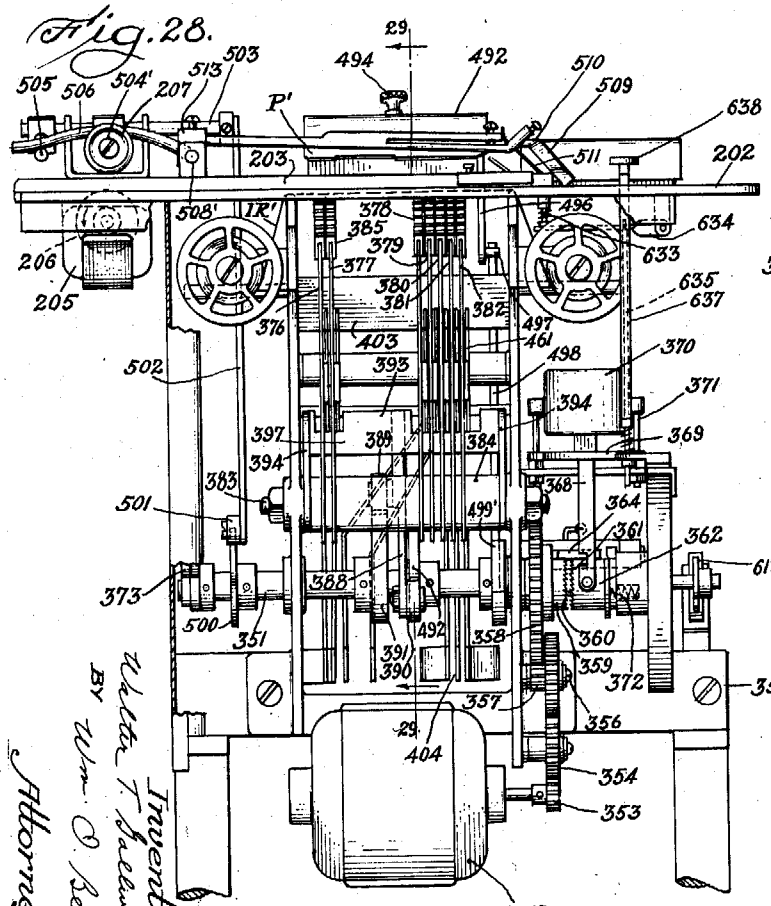
Fig. 28 is a front elevation of the variable printer.

It has been explained heretofore that the shutter 200 is moved from and into engagement with the pan 198 to insure passage of a sheet S from the pan down into the sheet guideway G and to then insure that the sheet will move below the pan 198 and also that the roller 207 is moved into cooperating relation with the roller 206 when the sheet S is to be fed from the variable printer. This is effected under control of a peripheral cam 500 on the shaft 351. A roller 501 on an arm 502 follows the cam 500. The arm 502 is connected to a shaft 503 by a link 504 connected to the shaft and after an impression has been made by the platen P′ the roller 501 moves from a dwell on the cam 500 into a relief on the cam and rotates the shaft 503 to lower the arm 504′ on which the roller 207 is mounted and thereupon the roller 207 cooperates with the roller 206 and feeds the sheet S out of the variable printer. A pin 505 on the shaft 503 is positioned below the rod 506 carrying the shutter 200, said rod 506, as best illustrated in Fig. 28, being bent so as to clear the arm 504′. The rod 506 is pivotally mounted in a bracket 508 mounted on the table top 202 of the variable printer. The rod 506 is urged by gravity into engagement with the pin 505 and follows the movement of this pin with the shaft 503 as the roller 501 follows the cam 500. It will thus be seen that when the roller 207 is retracted from clamping cooperation with the roller 206 the pin 505 elevates the rod 506 and therefore the shutter 200 so that a sheet passing from the pan 198 moves below the shutter down into the guideway G to be forced into printing position below the platen P′ by the roller 197, and that after an impression has been made by the platen P′ the roller 207 is moved into clamping cooperation with the roller 206 to feed the sheet out of printing position below the platen P′ and at this time the shutter 200 is engaged with the pan 198 to insure movement of the sheet therebelow.

The roller 197 forces the sheet into printing position below the platen P′ quite rapidly and the sheet moves into engagement with a stop 509 carried by a rod 510 adjustably mounted in a block 507 mounted on the rod 506. The rod 510 may be shifted through the block 507 to enable proper orientation of the sheet S below the platen P. To prevent rebounding of the sheet S when it engages the stop 509, a whisker 511 is provided adjacent the stop 509 and this whisker engages the sheet about the same time as the sheet engages said stop. The whisker 511 at the free end of a rod 512 is carried by a block 513 pivotally mounted on the rod 506 and it will thus be seen that the whisker 511 is urged by gravity into engagement with the sheets.

It has been explained that the type segments 440 make impressions on the detail strip 443 that correspond to the impressions made on the checks by the variable printer. After a series of checks have been printed it may be desirable to obtain a total of the amounts printed thereon which are likewise printed on the detail strip 443. Hence accumulators 440a (Fig. 32A) are provided such as are common in adding machines. Each of these accumulators is equipped with a pinion 441a adapted to mesh with a rack 400a on each slide bar 400. Each accumulator includes a lug 442a adapted to engage a stop 443a when the accumulator is in zero position.

Subsequent to the time a slide bar has been arrested in its rearward movement to set up its type segment in the variable printer and a type segment 440, the cam 444a on the shaft 421 moves into such a position that the follower 445a on the bell crank 446a moves into a relief portion thereon under the action of the spring 447a whereupon the bell crank 446a moves from the position shown in Fig. 32A into the position shown in Fig. 32B, and the trip latch 448a thereon engages the end of a slide bar 449a and immediately prior to the time the slide bar 400 is returned to its normal position against the action of spring 401 the toggle 450a is straightened, due to the return of cam 444a to the position shown in Fig. 32A, and through the link 451a pivots the arms 452a carrying the accumulator so that the pinion 441a meshes with the rack 400a and the accumulator is operated when the slide bar 400 is returned to normal position against the action of the spring 401 so that the digit printed by a type member 441 and a type member 387 is entered in this accumulator. While the cam 444a is being restored to the position shown in Fig. 32A, and at a predetermined point in the rearward movement of the slide bar 449a, the trip latch 448a engages the stop 453a to be disengaged from the end of the slide bar 449a, thereby permitting the spring 401a to restore the slide bar 449a to its initial position. This operation is repeated each time a slide bar 400 is operated so that the digits printed on the checks and detail strip are entered in the accumulator, suitable carry-over devices being associated with the accumulators for the well understood purpose.

When it is desired to take a total the button 454a which extends through the casing 456 is depressed to force the bar 455a downwardly and a latch 456a locks the bar in its downward position. The bar 455a carries pins 457a between which the slide bar 449a is passed and when the slide bar is forced downwardly in this manner the shoulder 458a thereon moves into the path of the rocker 459a. A follower 460a on this rocker is urged into engagement with the cam 444a by a spring 461a, the shaft 421 carrying the cam 444a being set in operation in a total taking operation, that is, when the button 454a is depressed in a manner described more fully hereinafter. Normally the shoulder 458a is out of the path of reciprocation of the rocker 459a but when it is moved into alignment with this rocker and the rocker is moved by the cam 444a, the toggle is straightened at the beginning of an operation and the pinion 441a is meshed with the rack 400a at the start of such movement. Then when the slide bar 400 is released in the manner previously described at the beginning of a movement and moves rearwardly under the influence of the spring 401, the lugs 442a engage the stops 443 and arrest rearward movement of the slide bar but in this movement of the slide bar the type segments 440 are set up and when the hammer 440′ is released it strikes the type member 441 aligned therewith and makes an impression on the detail strip 443, which impression is a digit of the total that has been entered in the accumulator 440a.

An arm 462a on the shaft 421 engages the latch 456a at the time the total impression is made whereupon the spring 463a restores the bar 455a and button 454a to upper position, which disengages the shoulder 458a from the rocker 459a and the toggle 450a is broken. Then the slide bar 400 is restored to its initial position but at this time the pinion 441a is disengaged from the rack 400a and therefore the accumulators remain in zero position.

When the slide bar 449a is forced downwardly by the bar 455a it engages the pin 464a on the latch 465a which releases the retaining dog 466a that then moves into engagement with a pin 467a on the bell crank 446a and prevents movement of this bell crank by the spring 447a. A pin 468a on the cam 444a restores the dog 466a into engagement with the latch 465a at the end of a total taking operation.

It will be understood that an accumulator is associated with each slide bar and that the above description specifically applied to one slide bar is applicable to each slide bar, and while I have shown one form of total taking arrangement it is to be understood that others could be employed without departing from the purview of my invention.

*Set-up devices for the variable printer*

The set-up of the variable printer is under control of the printing devices moving through the printing device guideway 243 and a detector 525 (Figs. 18, 19, 33 and 34) is associated with the printing device guideway in a position to cooperate with the printing device in a station two removed from printing position below the platen P, the reason for such positioning of the detector being explained more fully hereinafter. It has been explained that, and as shown in Fig. 38, the openings 43 and the control card 44 are located in one upper corner of a printing device D and the detector 525 is positioned to cooperate with such part of the printing devices as they move through the printing device guideway. The detector 525 is carried by a bracket 526 pivotally mounted in the frame of the printing machine, as indicated at 527. A lug 528 is provided on the upper side of the detector 525 and the lower end of a link 529 is pivotally connected thereto. A rocker 530 (Fig. 19) is pivotally mounted on a rod 531 mounted in the frame of the printing machine and the rocker 530 includes an arm 532 to which the upper end of the link 529 is connected. An arm 533 is also provided on the rocker 530 and carries a roller 534 that follows the cam 535 fast on the shaft 226. The cam 535 imparts a rocking movement to the rocker 530 to thereby lower and raise the link 529 to correspondingly raise and lower the detector 525 and inasmuch as such movement is effected from the shaft 226 it occurs in timed relation with the operation of the platen P and the movement of the printing devices D through the printing device guideway 243, and the detector 525 is moved into cooperating relation with the printing device D therebelow during an at rest interval in the step by step movement of the printing devices through the printing device guideway.

A plurality of detector pins 536 are mounted in the housing 537 of the detector 525. The housing 537 is preferably made of insulating material and the detector pins 536 are reciprocally mounted in pockets 538 formed in this housing. The pins are urged downwardly by springs 539. Nine rows of detector pins are provided transversely across the detector 525 and five pins are provided in each of these rows, and it will thus be seen that there is a detector pin 536 for each opening 43 in the frame 40 of the printing device D. A metallic plate 540 is mounted in the housing 537 and an electrical conductor 541 is connected thereto. Openings 542 are provided in the plate 540 in alignment with the first four pins 536 in each of the nine rows of openings and plungers 543 provided on these pins 536 slide in the openings 542. A metallic bar 544 is mounted in the housing 537 and is insulated from the plate 540 by an insulating strip 545 and has an electrical conductor 546 connected thereto. Openings 547 are provided in the bar 544 in alignment with the last pin in each of the nine rows of openings and plungers 548 on these pins slide in these openings. It will thus be seen that the first four pins in each of the nine rows of openings may be connected in an electrical circuit of which the conductor 541 is a part, while the last pin in each of the nine rows of openings may be connected in another electrical circuit of which the conductor 546 is a part.

In the printing device guideway below the detector 525 at what is referred to hereinafter as detecting position, a block 549 of insulating material is provided. A plurality of contacts 550 are mounted in this block 549 in alignment with the detector pins 536 which is to say in alignment with the openings 43 in the printing device D in detector position, and if no printing device were interposed between the detector pins 536 and the contacts 550 and the detector 525 was moved toward the printing device guideway each pin 536 would engage a contact 550.

It has been explained heretofore that the control cards on each of the printing devices D have perforations therein in alignment with selected of the openings 43 to thereby indicate digits from 1 to 9 in the various rows of openings. Hence, when a printing device D moves into detector position the control card 44 therein will be perforated and when the detector 525 is lowered toward the printing device guideway the pins 536 aligned with the openings in the control card 44 will pass through these openings and engage the aligned contacts 550 to thereby establish an electric circuit, but the pins 536 aligned with unperforated portions of the control car 44 will engage the control card and be prevented from passing through the control card into engagement with the contacts 550. Thus circuit is established only to the contacts 550 aligned with perforations in the control card 44 which, in accordance with the system or code heretofore explained, means that circuit is closed to contacts which are indicative of particular digits. The circuit established through the contacts 550 includes control devices, timing devices and means which operate the keys 406 to depress the keys and effect positioning of the slide bars 400, in the manner previously explained.

The operating means for the keys includes solenoids and in the present instance certain of the solenoids operate keys representative of two different classes of digits, it having been explained previously that, in accordance with the code or system employed in this invention, the digits 1, 3, 5 and 7 constitute one class while the digits 2, 4, 6 and 8 constitute another class and the digit 9 still a third class. The certain solenoids referred to are adapted to operate on one digit in each of the first two classes.

The necessary association of a digit from each of the first two classes one with the other is accomplished by providing toes on keys 406. The manner in which this is accomplished will now be explained for the keys 406 cooperating with the slide bar 400 which controls the type segment 382, and it is to be understood that the rows of keys aligned with the slide bars for the other type segments are similarly arranged. Thus a toe 551 is provided on the key 406 representative of the digit 1 and another toe 552 is provided on the key 406 representative of the digit 2, and the toes 551 and 552 are faced toward each other as clearly illustrated in Figs. 27 and 30. Similarly, a toe 553 is provided on the key for the digit 3 and a toe 554 is provided on the key for the digit 4, and these toes are faced toward each other as are the toes 555 and 556 respectively provided on the keys for the digits 5 and 6. Likewise the toes 557 and 558 for the digits 7 and 8 are faced toward each other.

A solenoid 559 includes an armature 560 shiftable into position over either the toe 551 or the toe 552. Another solenoid 561 includes an armature 562 adapted to cooperate with either the toe 553 or the toe 554. Furthermore, another solenoid 563 includes an armature 564 adapted to cooperate with either the toe 555 or the toe 556, while a solenoid 565 includes an armature 566 adapted to cooperate with either the toe 557 or 558. Thus the armatures 560, 562, 564 and 566 of the solenoids 559, 561, 563 and 565 are each adapted to cooperate with a digit from each of the first two classes of digits.

The key 406 for the digit 9, the third class of digits, includes a toe 567 with which the armature 568 of a solenoid 569 is adapted to cooperate, this armature operating only on the toe piece 567.

The armatures 560, 562, 564 and 566 are in the form of cranks and are normally positioned above the keys for the digits of the second class, that is to say, the keys for the digits 2, 4, and 8. These armatures are passed through slots in a plate 570 so that the crank-shaped armatures may be moved in unison into position for the keys for the first class of digits, that is, the digits 1, 3, 5 and 7. In order to effect such shifting of the armatures 560, 562, 564 and 566, a crank 571 in the present instance is fast in the upper end of the armature 566. This crank 571 is pivotally mounted in a plate 572 on the armature 573 of a solenoid 574. A spring 575 normally acts on the plate 572 to hold the armatures 560, 562, 564 and 566 in their normal positions above the keys for the digits of the second class. However, when the solenoid 574 is energized the crank 571 is turned to position the armatures above the keys for the digits of the first class. The manner in which the various solenoids are energized will now be explained.

Figure 36:
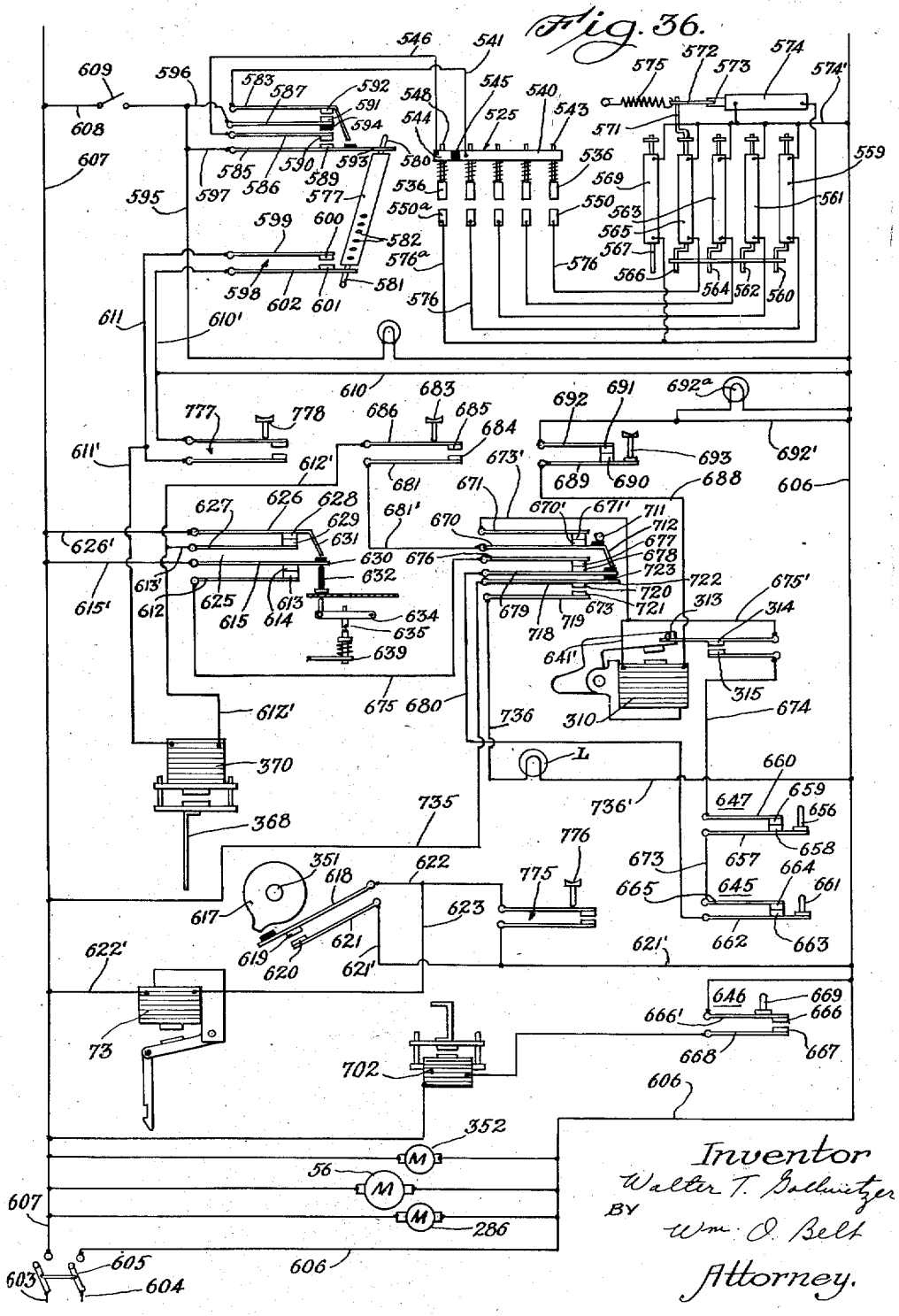
Fig. 36 is a wiring diagram.

When a printing device D having predetermined perforations in the control card 44 thereof moves into position below the detector 525 and comes to rest in this position, the cam 535 acting through the roller 534 and arm 533 moves the rocker 530 forcing the arm 529 and therefore the detector 525 downwardly, and the pins 536 aligned with the predetermined perforations in the control card 44 pass through these perforations and the aligned openings 43 and these pins engage the aligned contacts 550, as best shown in the wiring diagram (Fig. 36). The contacts 550 are respectively connected by conductors 576 with the solenoids 559, 561, 563, 565, 569 and 574 and depending upon which of the pins 536 pass through perforations in the control card 44 and openings 43 circuit is established through the engaged contacts 550 to selected of the solenoids. It will be recalled that the armatures of the solenoids are normally positioned above the keys for one class of digits and that the shifting of these armatures is under control of the solenoid 574, and therefore when the armatures of the solenoids are to operate on keys for the digits of the first class, that is, the odd digits 1,3, 5 and 7, it is necessary that the solenoid 574 be energized to shift the armatures. It will also be recalled that under the system or code illustrated in Fig. 39 the odd digits 1, 3, 5 and 7 are indicated by two perforations one of which, as heretofore explained, is always aligned with the uppermost of the openings 43. Thus whenever a pin 536 moves through a perforation aligned with an uppermost opening 43 the solenoid 574 is energized. It has also been explained that when a perforation is provided in a particular row only in alignment with the uppermost opening 43 this is indicative of the digit 9 and by referring to the wiring diagram (Fig. 36) it will be noted that the solenoid 569 for operating the key for the digit 9 and the solenoid 574 are connected to the same conductor 576. It has also been explained that the pins 536 adapted to cooperate with the uppermost openings 43 are energized from a plate 544 whereas the other pins 536 are energized from a plate 540. The plates 544 and 540 are energized independently and in timed relation, in a manner now to be explained.

All of the printing devices in a sequence passed through the printing machine are not always used in such a manner that impressions are made directly therefrom and under control thereof and this is determined by employing identifying means on the printing devices. The identifying means may be removable tabs T which may be connected to the frames 40 of the printing devices in any suitable manner such as that described in Patent 1,082,505, patented December 30, 1913, or other suitable identifying means may be provided. As explained in my just referred to patent, tabs such as the tab T may be secured to the printing device in any one of a plurality of positions. In the present instance when an impression is to be made from a printing device D, a tab T is removably fast in the printing device in the first of the tab receiving positions and suitable means in the machine cooperate with this tab T to arrange the machine so that impressions will be made directly from the printing device and also under control thereof. However, when a tab is not provided in this position impressions are not made directly from and under control of the printing device.

In order to determine whether or not an impression is to be made from the printing device a detector bar 577 (Figs. 33 and 34) is provided. The detector bar 577 is carried by arms 578 pivotally mounted, as indicated at 579, on the side members of the frame 526. Pins 580 and 581 are provided at opposite ends of the bar 577 and rest against the upper edges of the side frame members to limit downward movement of the detector bar 577 and also for the purpose of operating switches in a manner to be described presently. A plurality of openings 582 are provided in the bar 577 and a feeler pin, such as 583, is selectively mounted in these openings 582 to engage a tab such as the tab T in the various possible positions of the tabs on the printing devices D. In the present instance where impressions are to be made directly from and under control of the printing devices when a tab T is located in the first position on a printing device the pin 583 is located in the first of the holes 582, as illustrated best in Fig. 33. Thus since the bar 577 rests on the frame 526, when said frame is lowered with the detector 525 in the manner previously described the pin 583 engages a tab T when one is on the printing device D in detector position. The engagement of the pin 583 with such a tab T arrests downward movement of the bar 577 and when movement of the bar 577 is so arrested switches controlled by the pins 580 and 581 are closed.

Figure 33:
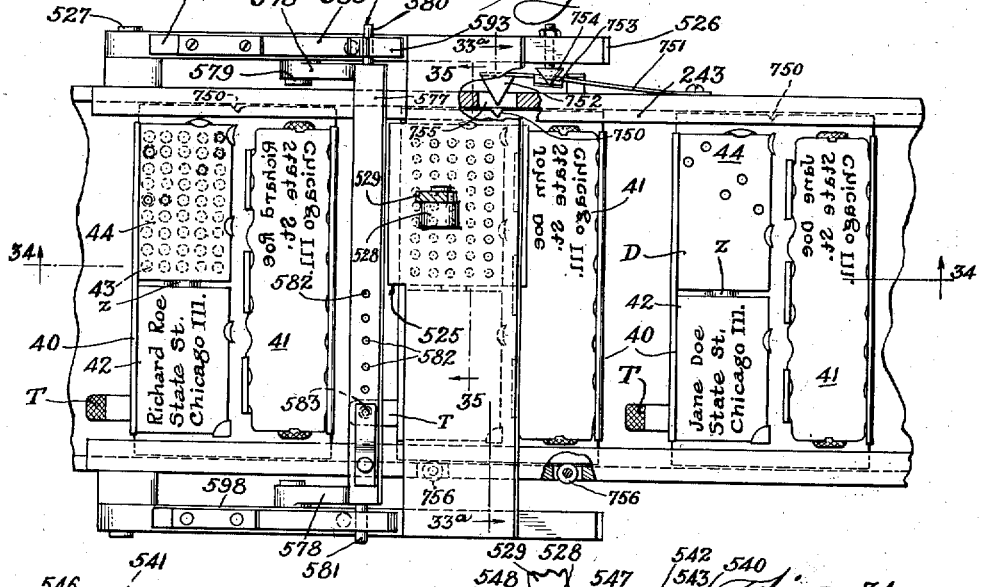
Fig. 33 is a fragmentary plan detail view of a portion of the printing device guideway.
Figure 34:
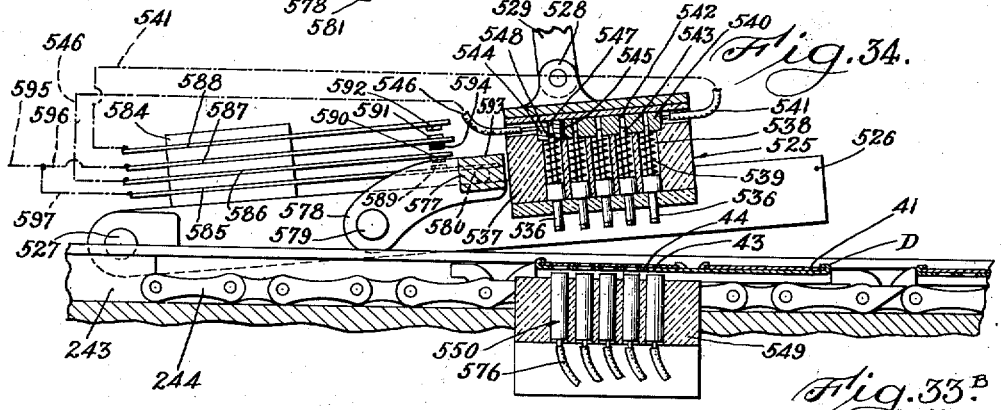
Fig. 34 is a vertical sectional view taken substantially on the line 34—34 on Fig. 33.

The switches controlled by the pins 580 and 581 are best illustrated in Figs. 33 and 34. In Fig. 34 a block 584 of insulating material is fast on one of the side frame members of the frame 526. Blades 585, 586, 587 and 588 are mounted in the block 584 one above the other. The blade 585 carries a contact 589 adapted to cooperate with a contact 590 on the blade 56. The blade 587 carries a contact 591 adapted to cooperate with a contact 592 on the blade 588. A block of insulating material 594 is provided on blade 587 and when blade 586 is moved upwardly the contacts 591 and 592 are engaged.

A conductor 595 (Figs. 34 and 36) is provided and a conductor 596 leads from the conductor 595 to the blade 587 and a conductor 597 leads from the conductor 595 to the blade 585. The conductor 546 connects the blade 586 with the conductor bar 544. The conductor 541 connects the blade 588 with the contact plate 540. Thus when the contacts 589 and 590 are engaged circuit is established between the blades 585 and 586 prior to the time the contacts 591 and 592 establish circuit between the blades 587 and 588 and therefore current is supplied to the bar 544 prior to the time it is supplied to the plate 540.

The conductor 576*a* interconnects the contact 550*a* which is aligned with the pins 536 having plungers 548 connected to the strip 544 and this conductor 576*a* is connected to the solenoids 569 and 574. Therefore, since current will be supplied to contact 550*a* prior to the time it is supplied to the other of the contacts 550 the solenoids 569 and 574 will be energized prior to the time the other solenoids are energized. Thus if there is a perforation in the card 44 in alignment with the uppermost opening 43, the solenoid 574 will be energized to shift the armatures 560, 562, 564 and 566 from position above the keys for the even digits 2, 4, 6 and 8 into position above the keys for the digits 1, 3, 5 and 7 so that if one of the digits of the latter class is to be printed the armature for that key will be thereabove. Then when current is supplied to the strip 544 the proper solenoid will be energized and the armature thereof moved downwardly to depress one of the keys 406 and lock this key in depressed condition, as previously described. However, if there is no perforation in alignment with the uppermost opening 43, the solenoids 569 and 574 will not be energized and there will be no shifting of the armatures 560, 562, 564 and 566 and these armatures will remain above the keys for the even digits 2, 4, 6 and 8 so that if one of the solenoids for these armatures is subsequently energized by engagement of the contacts 591 and 592 the proper key 406 will be depressed.

If there is an opening in the card 44 in alignment only with the uppermost opening 43 in a particular row both the solenoids 569 and 574 will be energized but insofar as energization of the solenoid 574 is concerned this is ineffective. The energization, however, of the solenoid 569 will cause the armature 567 thereof to be lowered and lowering of this armature will depress the key aligned therewith and lower this key into stopping relation with the stop 407 for the digit 9. Of course this stop is lowered every time an odd digit is to be printed but this stop is ineffective in these operations because the stop 407 with which it cooperates is spaced from the stop for the digit 8 in an amount greater than the stops 407 for any of the other digits are spaced from the stop for the next lower digit. Thus it is only when no other key is depressed in a particular row that the stop controlled by the armature 567 is effective in positioning the slide bar 400, and hence the type segment controlled by this slide bar is only set up to print the digit 9 when no other digit is to be printed and this is true even though the stop controlled by the armature 567 be lowered along with another stop.

If a printing device D is not equipped with a tab T in the first tab position, the variable printer is not to be operated and in the machine as illustrated the cylinders 51 and 52 are rendered inoperative as well as the parts associated therewith so that impressions are not made on the web and a sheet is not severed from the web. This is under control of a switch 598 mounted on the side member of the frame 526 opposite that on which the block 584 is mounted and this switch 598 is under control of the pin 581. When a printing device has a tab T in the first tab position and movement of the bar 577 is arrested, the pin 581 closes the switch 598, said switch including a blade 599 carrying a contact 600 and a blade 602 carrying a contact 601, and the contacts 601 and 602 are moved into engagement with each other when the switch 598 is closed.

Current is supplied to the machine from the line wires 603 and 604 through the main switch 605 to the conductors 606 and 607. A conductor 608 leads from the conductor 607 and has a switch 609 therein, which when opened shuts off the variable printer. The solenoids 559, 561, 563, 565, 569 and 574 are connected to the line 606 by a conductor 574′, and therefore circuit to the set-up devices of the variable printer is made to both sides of the line.

A conductor 610 is connected to the conductor 606 and to a conductor 610′ connected to blade 602. A conductor 611′ is connected to one terminal of the solenoid 370 of the clutch controlling the variable printer. The opposite terminal of this solenoid is connected by conductors 612′ and 613′ to the blade 627 of a switch described more fully hereinafter. This switch includes normally closed contacts 629 and 628 and a blade 626 that is connected to conductor 607 by conductor 626′. Whenever pin 581 closes the normally open contacts 600 and 601 and so long as the normally engaged contacts 628 and 629 are engaged the solenoid 370 is energized through the above described circuit and the clutch teeth 360 are engaged with the clutch teeth 361 and the shaft 351 is driven.

A cam 617 (Figs. 27, 28 and 36) is fast on the shaft 351 and a lobe on this cam is engageable with an extension on the blade 618 carrying a contact 619 which, when the lobe of the cam 617 engages the blade 618, engages a contact 620 on a blade 621. A conductor 622 connects the blade 618 with a conductor 623 that is connected to one terminal of the winding of solenoid 73. The other terminal of this solenoid is connected to conductor 607 by conductor 622'. The blade 621 is connected by conductor 621' with the conductor 606. Hence whenever the contacts 619 and 620 are engaged current may flow from conductor 606 through conductor 621', the blades 621 and 618 through the conductors 622 and 623 to the electromagnet 73 and thence through conductor 622' to conductor 607. Thus at a predetermined time in the rotation of the shaft 351 the lobe on the cam 617 closes the contacts 619 and 620 and energizes the electromagnet 73, thereby engaging the clutch teeth 65 with the clutch teeth 67 to operate the cylinders 51 and 52 and the parts associated therewith. Therefore, unless the contacts 600 and 601 are engaged with each other by the pin 581 the variable printer and the cylinders 51 and 52 are not operated.

*Control and safety devices*

The motors 56, 286 and 352 are all connected to the conductors 606 and 607 so that when the main switch 605 is closed these motors are set in operation.

With the exception of the form printing couple the operation of the various devices from the aforesaid motors is controlled through electrically operated clutches, the printing operations of the form printer being controlled by devices associated therewith as previously explained. The other printing and allied operations in the machine are controlled so that in event sheets are not fed or other abnormal conditions in the machine occur operation is interrupted.

In event no sheets are fed it is desirable to interrupt operation of the machine and to this end sheet detecting devices are provided at various places along the sheet guideway. One such sheet detecting device is provided in the variable printer and is indicated by 625. This sheet safety device 625 (Figs. 2 and 36) includes four switch blades 626, 627, 615 and 612. The switch blade 615 includes an extension 630 and the switch blade 626 includes an extension 631 that is disposed above a block 631' of insulating material on the extension 630.

A pin 632 of insulating material is suitably supported above the bed plate 202 of the variable printer in alignment with a pin 633 (Fig. 28) that is normally urged by a spring down into engagement with a plate 634 pivotally mounted on the frame of the variable printer. A rod 635 (Fig. 27) is connected to the plate 634 and is engaged in a bushing 636 on an arm 637 passed up through the bed plate 202 and provided with a finger button 638. The rod 635 also passes through a plate 639, a spring 640 being interposed between the bushing 636 and the plate 639. The plate 639 is pivotally mounted, as indicated at 641, and includes a cam follower 642 engaged with a cam disc 643 on the shaft 351. At a time in the operation of the machine when a sheet should have been fed into engagement with the stop 509 a rise on the cam disc 643 elevates the rod 635 which so pivots the plate 634 that the pin 633 is moved upwardly through an opening 644 in the bed plate 202 into engagement with a sheet S if one is engaged with the stop 509, a sheet being shown in this position in Fig. 2. Such engagement of the pin 633 with the sheet arrests further upward movement of the pin and as a result the engaged contacts 613 and 614 and 628 and 629 are not engaged. When, however, there is no sheet above the opening 644, the pin 633 moves into engagement with the pin 632 and moves this pin into engagement with the extension 630 which is thereupon moved upwardly so that it subsequently engages the extension 631 which is also moved upwardly. When the extension 630 moves upwardly the contact 628 is disengaged from the contact 629 and circuit to the electromagnet 370 is interrupted and an operation of the variable printer is prevented. The purpose of the disengagement of the contact 614 from the contact 613 will be explained presently. When the machine is initially set in operation, the finger button 638 is engaged to prevent upward movement of the rod 635 until a sheet has been moved into position over an opening 644.

As has been explained, after a sheet leaves the variable printer it moves into engagement with a stop finger 236, and switches 645 and 646 are provided which are controlled by a sheet engaged with the stop finger 236. After moving from engagement with the stop finger 236 the sheet moves into engagement with the stop finger 240 and a switch 647 is provided which is adapted to cooperate with a sheet engaged with this stop finger.

In Figs. 12 and 13 I have illustrated the manner in which the switches 645, 646 and 647 are controlled. Each of these switches is associated with a stop finger and, as best shown in Fig. 12, the stop finger 240 with which the switch 647 is associated is carried by an arm 648 pivotally mounted on the rod 229. A leaf spring 650 acts on the arm 648 to force the end thereof at which the stop finger 240 is mounted downwardly whereby the other end of the arm is forced upwardly so that the roller 649 on this end of the arm is normally engaged with a cam 230b on the cam shaft 227. As the cam shaft 227 rotates the cam 230b is moved from the at rest position shown in Fig. 12 and the roller 649 moves from a lobe on this cam onto a dwell and in so doing the spring 650 forces the stop finger 240 downwardly into stopping position and by the time the end of the dwell is reached the stop finger is fully in stop position.

As best shown in Fig. 13, a pin 651 on the arm 648 passes through a vertical slot in the stop finger 240, and when the stop finger 240 is fully in stopping position, that is, engaged with the bottom of the sheet guideway G, the pin 651 will have begun to move through the slot in the stop finger. If a sheet is engaged with the stop finger, the plunger 653 on the pin 651 engages the sheet and further movement of the arm 648 under action of the spring 650 is prevented and the roller 649 does not move onto the relieved part of the cam 230. However, if there is no sheet in engagement with the stop finger 240, the plunger 653 moves through the opening 654 in the bottom of the sheet guideway; the roller 649 moving into the relieved part of the cam to permit such movement. When the plunger 653 moves through the opening 654, the adjustable stop 655' on the extension 655 of the arm 650 engages the plunger 656 of the switch 647 and separates the contacts of this switch. Thus when no sheet engages the stop finger 240 the switch 647 is opened.

The switch 645 is similar to the switch 647 and includes a plunger 661 (Fig. 36) which engages the blade 662 thereof so that when there is no sheet in engagement with the stop finger 236 the switch 645 is opened.

The switch 646 differs from the switches 645 and 647 in that the contacts 666 and 667 thereof are normally separated. These contacts are carried by blades 668 and 666', a plunger 669 engaging the blade 666' to engage the contacts when no sheet engages the stop finger 236.

When it is desired to set the machine in operation, the button 683 is pressed whereby the contacts 685 and 684 are closed. Current is supplied to the blade 686 carrying the contact 685 from conductor 607, through conductor 626, contact 628, contact 629, conductor 613' and conductor 612'. The blade 681 carrying contact 684 is connected by a conductor 681' to blade 670 carrying a contact 670' normally engaged with a contact 671' on a blade 671. A conductor 673' leads from blade 671 to one terminal of the winding of electromagnet 310. A conductor 688 leads from the other terminal of this electromagnet to a blade 689 carrying a contact 690 normally engaged with a contact 691 on a blade 692. A conductor 692' connects the blade 692 with the conductor 607 so that whenever the button 683 is positioned downwardly the electromagnet 310 is energized which sets the shaft 226 of the addressing machine and the form printing couple in operation. A lamp 692a is connected in parallel with the conductor 692 and this lamp indicates that circuit to the electromagnet 310 is closed.

When it is desired to open circuit to the electromagnet 310, the button 693 is pushed downwardly separating the contacts 690 and 691 which open circuit to the electromagnet.

When the electromagnet 310 is energized, the contacts 314 and 315 are engaged as previously described. The contacts 314 and 315 are included in a safety circuit and when all of the other devices in this circuit are closed, as will be explained hereinafter, this engagement of the contacts 314 and 315 maintains the electromagnet 310 energized. However, the other devices in this safety circuit will not be closed until the machine is fully in operation, that is to say, until sheets are moving through the printing device guideway. Hence the button 683 is manually held down until sheets are moving through the printing device guideway in a normal manner.

The circuit in which the contacts 314 and 315 are included is as follows: A conductor 615' is connected to the conductor 607 and leads to blade 615 that carries a contact 614 that is normally engaged with contact 613 on blade 612 which is connected by conductor 675 with blade 676 that carries a contact 677 that is normally engaged with contact 678 on blade 679. A conductor 680 leads from blade 679 to blade 662 of switch 645. A conductor 673 connects blade 665 of switch 645 with blade 657 of switch 647. A conductor 674 connects blade 660 of switch 647 with contact 315. A conductor 675' connects contact 314 with conductor 673' that leads to the electromagnet 310. It is this just described circuit that must be closed before the button 683 can be released to maintain the electromagnet 310 energized.

It has been explained that a control card 44 is provided above the opening 43 to indicate the digits of a number or other data and it has also been explained that pins 536 on the detector 525 are moved toward this control card and that some of the pins 536 are to be arrested while others are to pass through perforations in the control card to thereby set up the variable printer and the calculating machine. It is therefore important that a control card be provided on each printing device and that this control card be accurately positioned so that the proper digits will be set up in the variable printer. Thus I provide means for ascertaining whether or not each printing device is provided with a control card 44 and I so arrange this means that it insures accurate positioning of the control card on each printing device.

Thus in Figs. 18A and 18B I show a feeler 705 which has one end pivotally mounted at 706 on the arm 707 of a bell crank 708 pivotally mounted on a rod 709. The bell crank includes an arm 710 carrying a pin 711 engageable with an extension 712 on a switch blade 670 carrying a contact 670' normally engaged with a contact 671' on the blade 671, the blades 671 and 670 being mounted in an insulating block 717 along with the blades 676 and 679, previously referred to. Blades 718 and 719 are also mounted in the block 717 and respectively carry normally separated contacts 720 and 721, an extension 722 being provided on the blade 718 and carrying a block 723 of insulating material disposed below an extension on the blade 679. A spring 724 acts on the arm 707 of the bell crank 708 to pivot the arm 707 counterclockwise, as viewed in Figs. 18A and 18B.

An extension 532 (Fig. 18) is provided on the rocker 530 on which a vertically extending arm 726 is pivotally mounted, as indicated at 727. A spring 728 acts on the arm 726 to pivot it clockwise, as viewed in Fig. 18. A cam 729 is provided on the arm 726 engageable with a pin 730 on the bracket 731 mounted on the front of the magazine M, the feeler 705 being adapted to cooperate with the printing device in the first station in front of the magazine M. The arm 726 carries a hook 732 engageable with the boss 733 on the lower edge of the arm 710 of the bell crank 708.

It has been explained heretofore that the conductors 675 and 680 respectively connected to the blades 676 and 679 are included in the circuit to the electromagnet 310 and it will thus be seen that when the normally engaged contacts 677 and 678 are separated circuit is broken to the electromagnet 310 which, as previously described, interrupts operation of the shaft 376 and therefore the feed of printing devices through the machine. Normally, as illustrated in Fig. 18A, the feeler 705 rests on top of the track of the printing device guideway 244. When, however, there is no printing device in the first station in front of the magazine M, the feeler 705 rides off the track and engages the bottom of the printing device guideway, as illustrated in Fig. 18A. A half pin 713 projects outwardly from the magazine M and a shoulder 714 is provided on the feeler 705 and when the feeler falls to the bottom of the printing device guideway the shoulder 714 engages the pin 713 and locks the arm 707 against the action of the spring 724. The feeler 705 is normally prevented from moving from the track of the printing device guideway by engagement of the hook 732 with the boss 733, this engagement holding the bell crank 708 in the full line position of Fig. 18A. When, however, the rocker 530 is moved under the action of the cam 535 the extension 532 moves downwardly as does the arm 726 whereupon the cam 729 rides over the pin 730 and at a predetermined time the hook 732 is disengaged from the boss 733 whereupon the spring 724 pivots the feeler 705. When the shoulder 714 engages the pin 713, downward movement of the arm 710 of the bell crank is arrested in the broken line position of Fig. 18A and the pin 711 is prevented from disengaging the contacts 677 and 678 and 670' and 671' and engaging the contacts 720 and 721, and the boss 733 is held in such a position that when the arm 726 starts to move upwardly with the rocker 533 the hook 732 reengages the boss 733 and repositions the parts in the full line position of Fig. 18a. Thus the electromagnet 310 is not deenergized when no printing device is in the first position in front of the printing device magazine.

However, when a printing device moves into the first position in front of the magazine and the arm 726 moves downwardly and the hook 732 is disengaged from the boss 733, the feeler 705 moves from the track of the printing device guideway onto the frame 40 of the printing device, and if a control card 44 is provided on the printing device the feeler 705 engages the right hand end thereof, as viewed in Fig. 38, and under the action of the spring 724 the feeler effectively forces the card 44 into engagement with the stop z (Fig. 38) on the printing device which insures proper positioning of perforations in the card 44 above the openings 43. When the arm 726 moves upwardly, the hook 732 again engages the boss 733 and repositions the bell crank 708 in the full line position of Fig. 18A.

If a printing device moves into the first position in front of the magazine M and does not have a card thereon, the feeler 705 will move across the printing device in the manner described, but since the feeler will be riding on the printing device it will be above the position shown in broken lines in Fig. 18A and therefore the shoulder 714 will not engage the pin 713 but the tapered surface 715 on the feeler will engage this pin and this will permit the arm 707 of the bell crank 708 to be freely turned by the spring 704. Hence the pin 711 will engage the extension 712 and the blade 679 will be so pivoted that the contacts 678 will be disengaged from the contacts 677 and the contacts 670 will be disengaged from the contacts 671, whereupon circuit to the electromagnet 310 will be broken. Likewise, the block 723 will force the extension 722 downwardly and engage the contact 721 with the contact 720. Therefore circuit will be closed from the conductor 607 through the conductor 735 to blade 718 through engaged contacts 720 and 721, blade 719, and conductor 736 to the lamp L which will be located at a suitable place in the machine to indicate that the electromagnet 310 has been deenergized by reason of the fact that a printing device has moved into the first position in front of the magazine M which does not bear a control card 44. The lamp L is connected by a conductor 736' to the conductor 606. The feeler 705 will be in such a position that when the arm 726 moves upwardly the hook 732 will not reengage the boss 733 and consequently the contacts 677 and 678 will be held disengaged and the electromagnet 310 cannot therefore be reenergized until the defect has been rectified.

When the printing devices move through the printing device guideway and into position below the detector 525 it is necessary that the devices be positioned accurately so as to prevent grounding of the pin 536 on the metallic frames of the printing devices. Furthermore, it is essential that the pins 536 move through proper openings in the card 44 so as to prevent the entry of something other than the indicated digit. This is accomplished by accurately positioning the printing device relative to the detector 525. To this end each printing device has a notch 750 in one edge thereof and this notch is located accurately relative to the openings 43 in the printing device. Therefore, if means in the machine are accurately located relative to the detector 525 and this means is engaged in the notch 750, the printing device will be accurately located relative to the detector.

Figure 33B:
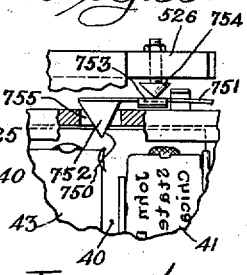
Fig. 33B is a fragmentary plan view showing selected of the parts illustrated in Fig. 33 in another position.
Figure 33A:
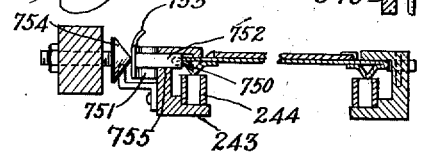
Fig. 33A is a sectional detail view taken substantially on the line 33A—33A on Fig. 33.

Means suitable for this purpose are illustrated in Figs. 33, 33A and 33B wherein a leaf spring 751 is fast to the side of the printing device guideway. A block 752 is fast on the leaf spring 751 and in the present instance this block is V-shaped to correspond to the V-shaped notch 750 in the printing device. If, however, the notch in the printing device is of some other shape, this block will be of a corresponding shape.

In order that the printing device will be located relative to the detector 525 immediately prior to the cooperation of the detector with the printing device the block 752 is engaged in the notch just prior to the time the pins 536 approach the printing device in detecting position.

Such movement of the block 752 is accomplished in the present instance by providing a cam 753 on the leaf spring 751 and a conical-headed adjustable pin 754 in the frame 526. Then when the frame 526 moves downwardly the pin 754 engages the cam 753 and forces the block 752 through the opening 755 in the side of the printing device guideway, and the block thereupon seats in the notch 750 to position the printing device relative to the detector. In event the printing device need be shifted I provide rollers 756 on the opposite side of the printing device guideway and since the edge of the printing device opposite the notch will be engaged with these rollers any necessary shifting of the printing device is facilitated.

The conjugated cams 265 and 266 (Fig. 18) which operate the platen P are mounted on a sleeve 696 (Fig. 20) disposed about the shaft 226. A disc 697 is connected to the shaft 276 and carries a pawl 698 that is normally urged into a notch 699' formed in the end of the sleeve 696. A trip 699 is provided which may be pivoted into engagement with the pawl 698 to disengage it from the notch 699' and thereby disconnect the sleeve 696 from the shaft 226. The trip 699 is pivotally mounted at 700' and is normally urged out of pawl engaging position by a spring 701'. The trip 699 is moved into pawl tripping position against the action of this spring by a link 702' operable with the rocker 255. The trip 699 may be locked in pawl tripping position by latch 700 controlled by the armature 701 of the electromagnet 702. When this electromagnet is energized the latch 700 engages a toe 703' and locks the trip 699 in position to engage the pawl 698.

When no sheet is engaged with the stop finger 236, the switch 646 is closed, as previously described, and this closes circuit to the electromagnet 702 which thereupon causes the sleeve 696 to be disconnected from the shaft 226 and therefore the conjugated cams 265 and 266 are not operated and hence the platen does not make an impression. It will thus be seen that operation of the platen is under control of the sheets passing through the sheet guideway, and the presence or absence of a sheet is determined prior to the time the platen is to make an operation on a particular sheet.

A switch 775 operable by a push button 776 is connected in parallel with the contacts 619 and 620 and when the switch 775 is closed this has the effect of energizing the electromagnet 73 to set the printing couple comprising the cylinders 51 and 52 in operation as well as the parts associated therewith.

Another switch 777 operable by a push button 778 is connected in parallel with the contacts 600 and 601 and may be manually closed to set the variable printer in operation independently of the presence or absence of a printing device in detecting position equipped with a tab T in the desired tab position.

*General operation*

In operation of the machine a roll of paper is mounted in the stand 50 and a web is drawn therefrom and passed between the cylinders 51 and 52 and through the bight of the feed rollers 127 and 128 and beyond the cutter 140. A stack of printing devices D is introduced into the magazine M. The main switch 605 is closed setting the motors 56, 286 and 352 as well as the motors for the feed rollers in operation.

When initially setting the machine in operation the button 776 is depressed to close the switch 775 which energizes electromagnet 73 which sets the cylinders 51 and 52 in operation to print a signature, number and date on the web. The cutter 140 is also operated to sever a sheet from the web. The button 776 is closed only momentarily and at the end of a cycle of operation the electromagnet 73 is deenergized which disengages teeth 67 from teeth 65. The clutch of which these teeth are a part is therefore a one revolution clutch and at the end of each cycle of operation this clutch disengages to stop rocker 134 in its upper position and arrest the cam disc 168 either in the position shown in Fig. 14 or in the position shown in Fig. 15, as explained. The sheet severed from the web in this first operation is manually removed from the machine.

The foregoing operation is repeated three more times, the second and third sheets also being manually removed from the machine. When the fourth sheet extends beyond the cutter 140 the machine is operated in the following manner, this fourth sheet being the first sheet bearing a signature, number and date.

In the next, or fifth, cycle of operation the switch 775 is again closed and the button 638 is manually depressed to retract the pin 633 from the path of movement of sheets into the variable printer. In this cycle of operation the sheet S severed from the web is fed into the variable printer, this sheet being the first bearing a signature, number and date, as stated.

The sheet so fed into the variable printer holds the pin 633 down. The button 683 is manually depressed to start the next, or sixth, cycle of operation and this button is manually held depressed until a later time in the operation of the machine, as will be explained. Pressing this button 683 energizes the electromagnet 310 and sets the shaft 226 in operation with the form printing couple. Inasmuch as there is no printing device in detecting position the contacts 600 and 601 will not be closed, and therefore the variable printer will not be operated (the switch 775 being open) and since the variable printer is not operated the contacts 619 and 620 will not be engaged and the electromagnet 73 will not be energized. In the first cycle of operation effected by depressing the button 683 (the sixth cycle of operation of the machine) a printing and control device will be moved into the first station in front of the magazine and the detector 705 will determine the presence or absence of a control card thereon. If there is no control card on this device the contacts 670′ and 671′ will be separated and circuit to the electromagnet 310 will be broken even though button 683 is held depressed. The lamp L will be rendered operative when the contacts 670′ and 671′ separate to indicate why the machine stopped. Inasmuch as no sheet is engaged with the stop finger 236 the switch 646 will be closed and the platen P will not make an operation.

If there is a card on the first printing and control device and the button 683 is held depressed the machine will start another, the seventh, cycle of operation and in this cycle of operation a printing and control device moves into detecting position. The machine is now set up for an operation in which the variable printer and parts associated therewith and controlled thereby will operate.

Assuming that the printing and control device shown in Fig. 38 is below the detector and that the check shown in Fig. 37 is to be printed, the machine will operate as follows: Immediately after the start of the seventh cycle of operation the pins 536 in detector 525 engage the printing and control device D therebelow.

Figure 35:
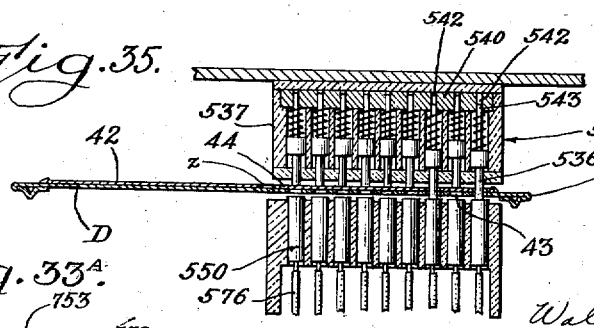
Fig. 35 is a vertical sectional view of the detector switch mechanism taken substantially on the line 35—35 on Fig. 33 but showing the parts in closed position.

The pins 536 in the fifth row from the right, as the detector is viewed in Fig. 35, will enter the two uppermost openings 43 in the corresponding row on the printing and control device, the card 44 thereon having perforations therein in alignment with these two openings to indicate the digit 7, the first digit of the amount to be printed on the check C. Then when the contacts 589 and 590 are engaged the fifth solenoid 574 from the bottom in Fig. 26 will be energized and the plate 570 for the corresponding row of solenoids for the keys will be shifted so that when the contacts 591 and 592 are subsequently engaged the solenoid 565 of this row is energized to lower the armature 566 thereof into engagement with the toe 556 of the "7" key of this row of keys whereby this key is depressed.

Since the next digit of the amount on the check C is a "0" there are no openings in the control card in alignment with the fourth row of openings 43 on the printing and control device and no keys in the fourth row of keys are depressed.

The pin 536 in the third row thereof passes through an opening in the control card aligned with the next to the lowermost opening 43 in this row which indicates the digit 4, the next digit in the amount on the check C. The solenoid 574 for this row will not be energized because there is no opening in the control card 44 in alignment with the uppermost of the openings 43 in this row and the plate 570 for this row will not be shifted. Hence when the contacts 591 and 592 are engaged (this being the same engagement thereof referred to above) the solenoid 559 in the third row is energized and the armature 560 thereof engages the toe 552 for the "2" key of this row and this key is depressed.

The "1" and "2" keys in the second and first rows respectively, are also depressed in the above described manner and therefore keys 406 are depressed to indicated "70412".

Almost simultaneously with the depressing of the keys 406 the electromagnet 370 is energized, by the closing of contacts 600 and 601, if this printing and control device bears a tab T in the proper position. Energization of this magnet sets the shaft 351 in operation. Shortly after the shaft 351 starts to rotate the lobe on cam 617 closes contacts 619 and 620 and sets the printing couple comprising the cylinders 51 and 52 in operation as well as their associated parts which, with reference to the variable printer, operate rather slowly. Shortly after the shaft 351 starts to operate the slide bars 400 move into engagement with the stops of the depressed keys and set up the type segments of the variable printer and the calculating machine.

The type segment 380 is moved to position the type member 387 thereon for the digit "7" below the opening 396. This positioning of this type segment is under control of the stop plate 461 therefor which in turn is positioned by the slide bar 400 therefor. When this stop plate 461 moved to effect such positioning of the type segment 387 the pin 485 on this stop plate raised the stop arm 469c engaged thereby which, as heretofore explained, raises the stop arms 469b and 469a but will not raise the stop arms 469d and 469e. Hence these latter two stop arms remain in stopping position and position the type segments 381 and 382 to print stars or other blanking characters. Since the stop arm 469b is raised the type segment 379 will engage the stop 467 on the stop plate 461 associated with this type segment and the "0" printing type member 387 on this segment will therefore be disposed below the opening 396 inasmuch as the slide bar 400 for this stop plate does not engage a depressed key, no key in this row being depressed, as explained.

The stop plates 461 associated with the type segments 378, 377 and 376 are respectively positioned by their slide bars 400 to position the type members 387 on these respective type segments for the digits "4", "1" and "2" below the opening 396.

Hence the type segments 382, 381, 380, 379, 378, 377 and 376 are respectively set up to print—**704 12—and immediately after they are so set up the platen P' makes an impression therefrom. This impression is the amount represented by the perforations on the control card 44 on the printing and control device in detecting position. The type segments 440 in the calculating machine were set up similarly to the type segments of the variable printer and an impression is made from these type segments on the detail strip 443. Furthermore, the amount printed from these type segments is entered in the accumulator 440a.

As soon as the platen P' has made an impression on the sheet in the variable printer the roller 207 engages this sheet and feeds it out of the variable printer and then the sheet which was severed by the cutter 140 in this cycle of operation moves into the variable printer. The printed sheet which passes out of the variable printer moves into engagement with the stop finger 236. In the latter part of this cycle of operation the printing and control device which set up the variable printer moved from detecting position into a position intermediate detecting position and printing position.

The button 683 is still held manually depressed for the next or eighth cycle of operation which is like that just described, an impression being made by the variable printer, and the calculating machine being operated under control of the second printing and control device in the series thereof. Near the end of this cycle of operation the sheet first printed in the variable printer moves from engagement with the stop finger 236 into engagement with the stop finger 240 and the first printing device to attain detecting position moves into printing position.

Sheets are now below all of the safety switches and the button 683 may be released and the machine will continue in operation until one of the safety devices is rendered operative to stop the machine or the stop button 693 is depressed. In this next, or ninth, cycle of operation the first sheet receiving an impression in the variable printer receives an impression directly from the printing and control device in printing position which is the same device under control of which the variable printer was set up to make an impression on this sheet. After the platen P has made an impression on this first sheet the stop finger 240 is retracted and the sheet advances through the sheet guideway into engagement with the stop finger 321. In other respects this cycle of operation is like the two immediately preceding cycles of operation.

In the next, or tenth, cycle of operation the stop finger 321 is retracted and the first sheet receiving an impression in the variable printer and from the printing and control device moves between the printing cylinders 270 and 271 and the form is printed thereon. This finishes the printing operations on the sheet and it moves into the collecting tray H. This tenth cycle of operation is like the ninth cycle of operation and subsequent operations are similar to these ninth and tenth operations unless one of the safety devices operates.

When a sheet fails to move into the variable printer the contacts of the switch 625 are separated and this prevents energization of the electromagnet 310 either when the button 683 is held depressed manually or when this magnet is held under control of the contacts 314 and 315 and those contacts in series therewith. The contacts in series with the contacts 314 and 315 are in the switches 645 and 647 and in the device for determining the presence or absence of control cards on the printing and control devices fed through the machine. The contacts in the switch 645 are separated when a sheet does not engage the stop finger 236 and the contacts in switch 647 are separated when a sheet does not engage the stop finger 240. The device which determines the presence or absence of a card on the printing and control devices break the circuit to the magnet 310 either when the button 683 is held down manually or when this magnet is held by the contacts 314 and 315.

In the present machine a sheet receives an impression in the variable printer under control of a printing and control device in one cycle of operation and receives an impression directly from that device in a subsequent cycle of operation, there being an intervening cycle of operation between these two cycles. In view of this, selective printing from and under control of the printing and control devices is controlled from the devices when they are in detecting position. When a printing and control device not having a tab T in the selected position moves into detecting position in the machine, the contacts 600 and 601 are not closed and the variable printer does not make an impression.

When the variable printer does not make an operation in a particular cycle of operation, the roller 207 does not cause a sheet to be fed out of the variable printer and no sheet is fed into this printer. The sheet which was fed out of the variable printer in the preceding cycle of operation moves from engagement with the stop finger 236 into engagement with the stop finger 240 in this particular cycle of operation. Thus in the next cycle of operation the switch 645 is opened since no sheet engages stop finger 236 and this opens the circuit to magnet 310 and this also extinguishes lamp 692a. The operator then ascertains from the lamp 692a that the safety circuit is opened but, noting the absence of a sheet in engagement with finger 236, presses button 683 restarting the machine. The switch 646 is closed in this cycle of operation energizing magnet 702 so that the platen operating means will be latched against operation in the next cycle of operation.

In the next cycle of operation no sheet is fed into engagement with stop finger 240 whereby switch 647 acts as did switch 645 in the preceding operation. The operator notes the absence of a sheet in engagement with the stop finger 240 and again presses button 683 restarting the machine. In this cycle of operation the platen P does not make an impression inasmuch as the printing and control device now in printing position is the one which did not effect an operation of the variable printer and hence no impression is to be made therefrom.

If the printing and control device following the device referred to above as not bearing a tab T does bear such a tab the machine remains in operation when restarted after being stopped by the switch 647, but if this printing and control device does not bear a tab the above described stopping and restarting of the machine continues until a tab bearing printing and control device is encountered. When a printing and control device not bearing a card is encountered by the detector 705, the contacts 670' and 671' and 677 and 678 are maintained separated until the detector 705 is manually reset, the lamp L remaining in operation so long as the just named contacts remain open. This prevents a printing device not bearing a control card passing through the machine and therefore proper operation of the variable printer is assured, particularly since the detector 705 insures correct engagement of the control card with the stop z on the printing and control devices.

The clutches controlled by the electromagnet 370 are one revolution clutches and stop the parts operated therethrough at the end of each cycle of operation even though the operations of the machine are to take place consecutively automatically, and it is for this reason that the variable printer and the parts associated therewith and controlled thereby may be operated in the manner previously described.

The printing and control devices may be passed through the machine merely to have impressions made directly therefrom and when this is to be done the switch 609 is opened and means are provided for feeding the sheets out of the variable printer.

However, it may more often be desired to pass the printing and control devices through the machine to make impressions under control thereof or merely to operate the calculating machine. When this is to be done the switches 645 and 647 are maintained closed, a convenient way of doing this being to insert small pieces of paper which will not be fed by the feeding means of the machine in the path of the control means for these switches, this being resorted to when it is not desired to print sheets but merely to operate the variable printer to operate the calculating machine.

It will be seen that when printing and control devices are passed through the machine under this condition amounts indicated on the printing device will be entered in the calculating machine and printed on the record strip, and a total will be accumulated in the accumulators 440a. Of course a special machine could be provided through which the printing and control devices might be passed for interpreting that part of the record provided thereon by the control devices.

When the accumulators 440a are actuated either in the normal operation of the machine or when only the calculating machine is being operated, a total may be taken therefrom by depressing the button 454a and then closing the switch 777 because closing of this switch sets the variable printer in operation whether or not the contacts 600 and 601 are engaged and, as heretofore explained, the button 454a renders operative the total taking devices of the calculating machine.

I have provided a machine wherein a business instrument may be completely printed, and I have explained that the machine may be used for printing directly from or under control of printing and control devices and that when business instruments are being printed preferably impressions are made both directly from and under control of the printing devices. Because of this a record may be provided on each of the printing and control devices, the more permanent part of this record being incorporated thereon by type characters and the more transitory part of the record being provided thereon by a control card. It will thus be seen that the transitory part of the record may be changed easily and inexpensively when so desired.

I have explained the printing of a check and more particularly a check for the purpose of paying dividends, but it is to be understood that checks for any purpose, or other business instruments such as, for example, notices, bills and the like, may be prepared in the machine without departing from the purview of my invention.

I have illustrated and described a preferred form of my invention, but it is to be understood that I do not wish to be limited to the precise details set forth but desire to avail myself of such changes and alterations as may be desired to enable the invention to be used for the purpose for which it is or may be adapted.

I claim:

1. In a printing machine into which a unitary printing and control device bearing a record is inserted and which device includes a carrier having permanently reproducible type characters thereon constituting part of the record and which device has a control card on said carrier and wherein the carrier and card have aligned openings therein positioned and arranged to constitute another part of the record on the device, printing means constructed and arranged to make an impression directly from the permanently reproducible type characters on said device, and other means under control of said aligned openings for producing a record in association with the impression made from said type characters.

2. In a printing machine into which a unitary printing and control device bearing a record is inserted and which device includes a carrier having permanently reproducible type characters thereon constituting part of the record and which device has a control card on said carrier and wherein the carrier and card have aligned openings therein positioned and arranged to constitute another part of the record on the device, printing means constructed and arranged to make an impression upon a sheet directly from the permanently reproducible type characters on said device, and other printing means settable under control of said aligned openings for making an impression on the sheet in association with the impression made thereon from said type characters.

3. In a printing machine into which a unitary printing and control device bearing a record is inserted and which device includes a carrier having permanently reproducible type characters thereon constituting part of the record and which device has a control card on said carrier and wherein the carrier and card have aligned openings therein positioned and arranged to constitute another part of the record on the device, printing means constructed and arranged to make an impression upon a sheet directly from the permanently reproducible type characters on said device, other printing means settable to make an impression on the sheet in association with the impression made thereon from said type characters, and means under control of the aligned openings for setting up said other printing means.

4. In a printing machine into which a unitary printing and control device bearing a record is inserted and which device includes a carrier having permanently reproducible type characters thereon constituting part of the record and which device has a control card on said carrier and wherein the carrier and card have aligned openings therein positioned and arranged to constitute another part of the record on the device, printing means constructed and arranged to make an impression directly from the permanently reproducible type characters on said device, other printing means settable under control of the aligned openings in said device to make an impression, means for effecting movement of separate sheets to both of said printing means, and means for operating both of said printing means and the means effecting sheet movement to cause the impression made from the type characters on said device and the impression made under control of the aligned openings in said device to be made on the same sheet.

5. In a printing machine, means for feeding through the machine a series of printing and control devices each bearing a record and including a carrier having permanently reproducible type characters thereon constituting a part of the record and also having a control card on the carrier and wherein the carrier and card have aligned openings therein positioned and arranged to constitute another part of the record on the device, printing means constructed and arranged to make an impression from the type characters on each of said devices, and other printing means settable under control of the aligned openings in each of said devices to produce another impression.

6. In a printing machine, means for feeding through the machine a series of printing and control devices each bearing a record and including a carrier having permanently reproducible type characters thereon constituting a part of the record and also having a control card on the carrier and wherein the carrier and card have aligned openings therein positioned and arranged to constitute another part of the record on the device, printing means constructed and arranged to make an impression from the type characters on each of said devices, other printing means settable under control of the aligned openings in each of said devices to produce another impression, and means for causing the impressions made from the type characters and under control of the aligned openings in each device to be made in predetermined relation with each other.

7. In a printing machine, means for feeding through the machine a series of printing and control devices each bearing a record and including a carrier having permanently reproducible type characters thereon constituting part of the record and also including a control card on the carrier and wherein the carrier and card have aligned openings therein positioned and arranged to constitute another part of the record on the device, printing means constructed and arranged to produce impressions directly from the permanently reproducible type characters on the devices, other means settable under control of the aligned openings in the devices for producing other impressions, and means for operating the printing and control device feeding means and said printing means to cause each impression produced from the type characters on a particular device to be related to the impression produced under control of the aligned openings in the particular device.

8. In a printing machine, means for feeding through the machine a series of printing and control devices each bearing a record and including a carrier having permanently reproducible type characters thereon constituting part of the record and also including a control card on the carrier and wherein the carrier and card have aligned openings therein positioned and arranged to constitute another part of the record on the device, printing means constructed and arranged to produce impressions directly from the permanently reproducible type characters on the devices, other means settable under control of the aligned openings in the devices for producing other impressions, means for effecting movement of separate sheets to both of said printing means, and means for operating the printing and control device feeding means, both of said printing means and the means effecting sheet movement to cause the impression made from the type characters on one of said devices and the impression made under control of the control means on one of said devices to be made on the same sheet.

9. In a printing machine, the combination of a unitary printing and control device bearing a record and including a carrier having permanently reproducible type characters thereon constituting part of the record carried by the said device and including a control card, said carrier and control card having aligned openings therein positioned and arranged to constitute another part of the said record on the said device, printing means for making an impression directly from the said type characters on the side device, and other means under control of the said aligned openings for producing another part of the said record.

10. In a printing machine, the combination of a unitary printing and control device bearing a record and including a carrier having permanently reproducible type characters thereon constituting a part of the record carried by the said device and including a control card, said carrier and control card having aligned openings therein positioned and arranged to constitute another part of the said record on the said device, printing means for making an impression directly from the said type characters on the said device, and other means under control of the said aligned openings for providing an impression related to the impression produced from the said type characters.

11. In a printing machine through which unitary printing and control devices for producing records are fed, each of said devices including type characters for producing an impression directly and control means for producing a related impression indirectly, a variable printer for making the said indirect impression on a blank, means for setting up said variable printer under the control of said control means on one of said devices, and printing means for subsequently making the direct impression on the blank from type characters on the device bearing the control means under control of which the variable printer was set up to make the direct impression on the blank.

12. In a printing machine through which unitary printing and control devices for producing records are fed, each of said devices including type characters for producing an impression directly and control means for producing another impression indirectly, a variable printer for making the indirect impression on a blank, means for setting up said variable printer under control of said control means on one of said devices, printing means for subsequently making an impression on the blank from type characters on the device bearing the control means under control of which the variable printer was set up to make an impression on the blank, and means for selectively controlling the impression operations of said variable printer and printing means.

13. In a printing machine through which unitary printing and control devices for producing records are fed, each of said devices including type characters for producing part of a record directly and control means for producing another part of the record indirectly, a variable printer for making an impression on a blank, means for setting up said variable printer under control of said control means on one of said devices, printing means for subsequently making an impression on the blank from type characters on the device bearing the control means under control of which the variable printer was set up to make an impression on the blank, means for feeding the blank through the variable printer and the printing means, and means for selectively controlling the impression operations of the variable printer and operable to arrest the feed of the blank when the variable printer is rendered inoperative.

14. In a printing machine through which unitary printing and control devices for producing records are fed, each of said devices including type characters for producing part of a record directly and control means for producing another part of the record indirectly, a variable printer for making an impression on a blank, means for setting up said variable printer under control of said control means on one of said devices, printing means for subsequently making an impression on the blank from type characters on the device bearing the control means under control of which the variable printer was set up to make an impression on the blank, means for feeding the blank through the variable printer and the printing means, means for selectively controlling the impression operations of the variable printer and operable to arrest the feed of the blank when the variable printer is rendered inoperative, and means for interrupting operation of the printing means when the feed of the blank is arrested.

15. In a printing machine through which unitary printing and control devices for producing records are fed, each of said devices including type characters for producing part of a record directly and control means for producing another part of the record indirectly, a variable printer for making an impression on a blank, means for setting up said variable printer under control of said control means on one of said devices, printing means for subsequently making an impression on the blank from type characters on the device bearing the control means under control of which the variable printer was set up to make an impression on the blank, and means for selectively rendering the variable printer, the set-up means therefor and the printing means inoperative under control of the printing and control devices.

16. In a printing machine through which printing and control devices for producing records are fed, each of said devices including a carrier having permanently reproducible type characters thereon from which the identification part of a record may be produced directly and having a control card on the carrier and wherein the carrier and card have aligned openings therein positioned and arranged to produce the numerical accounting data part of the record, printing means constructed and arranged to print the identification part of a record directly from the type characters on said devices, and other means for printing the numerical accounting data part of the record under control of the aligned openings in the device.

17. In a printing machine through which unitary printing and control devices for producing records are fed, each of said devices including type characters for producing the identification part of the record and control means for producing the numerical accounting data part of the record, means for printing the identification part of a record on a blank from the type characters on a device, other means for printing the numerical accounting data part of the record on the blank under control of the control means on the device, and means for making a record of the numerical accounting data printed on blanks under control of the control means on the devices.

18. In a printing machine through which printing and control devices for producing records are fed, each of said devices including a carrier having permanently reproducible type characters thereon from which the identification part of a record may be produced directly and having a control card on the carrier and wherein the carrier and card have aligned openings therein positioned and arranged to produce the numerical accounting data part of the record, printing means constructed and arranged to print the identification part of a record directly from the type characters on a device, other means for printing the numerical accounting data part of the record under control of the aligned openings in the device, and means for making a record of the numerical accounting data printed on blanks under control of the aligned openings in said device.

19. In a printing machine through which unitary printing and control devices for producing records are fed, each of said devices including type characters for producing the identification part of the record and control means for producing the numerical accounting data part of the record, means for printing the identification part of a record on a blank from the type characters on a device, other means for printing the numerical accounting data part of the record on the blank under control of the control means on the device, and means for totalizing the amounts of the numerical accounting data printed on blanks under control of the control means on the devices.

20. In a printing machine through which unitary printing and control devices for producing records are fed, each of said devices including type characters for producing the identification part of the record and control means for producing the numerical accounting data part of the record, means for printing the identification part of a record on a blank from the type characters on a device, other means for printing the numerical accounting data part of the record on the blank under control of the control means on the device, means for making a record of the numerical accounting data printed on blanks under control of the control means on the devices, and means for totalizing the items of said numerical record.

21. In a machine for preparing business instruments and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for printing an identification on each instrument, other means under the direct control of the control means on said devices for printing numerical accounting data on the instruments, each of said printing means operating to print at a predetermined position on said instruments, operating means for each of said printing means, and means operable to effect operation of the operating means for each of said printing means in timed relation with each other to insure proper positioning of the impressions made by the respective printing means on the instruments.

22. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for printing an identification on each instrument from printing and control devices sequentially fed through the machine, other means under the direct control of the control means on said devices for printing numerical accounting data on the instruments under control of the devices fed through the machine, each of said printing means operating to print at a predetermined position on said instruments, operating means for each of said printing means, and means operable to effect operation of the operating means for each of said printing means in timed relation with each other to insure proper positioning of the impressions made by the respective printing means on the instruments.

23. In a machine for preparing business instruments, and through which unitary printing and control devices for producing records are fed, each of said devices including type characters for producing the identification part of the record and control means for producing the numerical accounting data part of the record, means for printing the changeable but reoccurring data on the instruments, means for printing an identification on each instrument from printing and control devices sequentially fed through the machine, other means under the direct control of the control means on said devices for printing numerical accounting data on the instruments under control of the devices fed through the machine, each of said printing means operating to print at a predetermined position on said instruments, operating means for each of said printing means, and means operable to effect operation of the operating means for each of said printing means in timed relation with each other to insure proper positioning of the impressions made by the respective printing means on the instruments.

24. In a machine for preparing business instruments, and through which unitary printing and control devices for producing records are fed, each of said devices including type characters for producing the identification part of the record and control means for producing the numerical accounting data part of the record, means for printing the form on the instruments, means for printing an identification on each instrument from printing and control devices sequentially fed through the machine, other means under the direct control of the control means on said devices for printing numerical accounting data on the instruments under control of the devices fed through the machine, each of said printing means operating to print at a predetermined position on said instruments, operating means for each of said printing means, and means operable to effect operation of the operating means for each of said printing means in timed relation with each other to insure proper positioning of the impressions made by the respective printing means on the instruments.

25. In a machine for preparing business instruments, and through which unitary printing and control devices for producing records are fed, each of said devices including type characters for producing the identification part of the record and control means for producing the numerical accounting data part of the record, means for printing the changeable but reoccurring data on the instruments, means for feeding unitary printing and control devices for producing records through the machine, each of said devices including type characters for producing the identification part of the record and control means for producing the numerical accounting data part of the record, means for printing the identification part of a record on an instrument from type characters on a device, other means for printing the numerical accounting data part of the record on said instrument under the sole control of the control means on the device bearing the type characters from which the identification is printed on the instrument, each of said printing means operating to print at a predetermined position on said instruments, operating means for each of said printing means, and means operable to effect operation of the operating means for each of said printing means in timed relation with each other to insure proper positioning of the impressions made by the respective printing means on the instruments.

26. In a machine for preparing business instruments, and through which unitary printing and control devices for producing records are fed, each of said devices including type characters for producing the identification part of the record and control means for producing the numerical accounting data part of the record, means for printing the changeable but reoccurring data on the instruments, means for feeding unitary printing and control devices for producing records through the machine, each of said devices including type characters for producing the identification part of the record and control means for producing the numerical accounting data part of the record, means for printing the identification part of a record on an instrument from type characters on a device, other means for printing the numerical accounting data part of the record on said instrument under the sole control of the control means on the device bearing the type characters from which the identification is printed on the instrument, each of said printing means operating to print at a predetermined position on said instruments, operating means for each of said printing means, means operating the operating means for each of said printing means in timed relation with each other to insure proper positioning of the impressions made by the respective printing means on the instruments, and means for selectively controlling the impression operations of said printing means without interrupting the timed relation thereof.

27. In a machine for preparing business instruments, and through which unitary printing and control devices for producing records are fed, each of said devices including type characters for producing the identification part of the record and control means for producing the numerical accounting data part of the record, means for printing the changeable but reoccurring data on the instruments, means for feeding unitary printing and control devices for producing records through the machine, each of said devices including type characters for producing the identification part of the record and control means for producing the numerical accounting data part of the record, means for printing the identification part of a record on an instrument from type characters on a device, other means for printing the numerical accounting data part of the record on said instrument under the sole control of the control means on the device bearing the type characters from which the identification is printed on the instrument, each of said printing means operating to print at a predetermined position on said instruments, operating means for each of said printing means, means operating the operating means for each of said printing means in timed relation with each other to insure proper positioning of the impressions made by the respective printing means on the instruments, means for selectively controlling the impression operations of said printing means without interrupting the timed relation thereof, and means for controlling the operation of the means printing the changeable but reoccurring data from the numerical accounting data printing means.

28. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for feeding unitary printing and control devices for producing records through the machine, each of said devices including type characters for producing the identification part of the record and control means for producing the numerical accounting data part of the record, printing means for printing the identification part of a record on an instrument from type characters on a device, a variable printer for printing numerical accounting data, means for setting up the variable printer to print the numerical accounting data part of the record on said instrument under the sole control of the control means on the device bearing the type characters from which the identification is printed on the instrument, each of said printing means and the variable printer operating to print at a predetermined position on said instruments, operating means for each of said printing means and said variable printer, and means for operating the operating means for each of said printing means in timed relation with each other to insure proper positioning of the impressions made by the said printing means and the said variable printer on the instruments.

29. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for feeding unitary printing and control devices for producing records through the machine, each of said devices including type characters for producing the identification part of the record and control means for producing the numerical accounting data part of the record, printing means for printing the identification part of a record on an instrument from type characters on a device, a variable printer for printing numerical accounting data, means for setting up the variable printer to print the numerical accounting data part of the record on said instrument under the sole control of the control means on the device bearing the type characters from which the identification is printed on the instrument, each of said printing means and the variable printer operating to print at a predetermined position on said instruments, operating means for each of said printing means and said variable printer, means for operating the operating means for each of said printing means in timed relation with each other to insure proper positioning of the impressions made by the said printing means and the said variable printer on the instruments, means selectively controlling operation of the printing means without interrupting the timed relation thereof, and other means selectively controlling operation of the variable printer also without interrupting the timed relation thereof.

30. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for feeding unitary printing and control devices for producing records through the machine, each of said devices including type characters for producing the identification part of the record and control means for producing the numerical accounting data part of the record, printing means for printing the identification part of a record on an instrument from type character on a device, a variable printer for printing numerical accounting data, means for setting up the variable printer to print the numerical accounting data part of the record on said instrument under the sole control of the control means on the device bearing the type characters from which the identification is printed on the instrument, each of said printing means and the variable printer operating to print at a predetermined position on said instruments, operating means for each of said printing means and said variable printer, means for operating the operating means for each of said printing means in timed relation with each other to insure proper positioning of the impressions made by the said printing means and the said variable printer on the instruments, means selectively controlling operation of the printing means without interrupting the timed relation thereof, and other means selectively controlling operation of the variable printer also without interrupting the timed relation thereof, the means for controlling operation of the changeable but reoccurring data printing means being controlled from the variable printer.

31. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for feeding unitary printing and control devices for producing records through the machine, each of said devices including type characters for producing the identification part of the record and control means for producing the numerical acounting data part of the record, printing means for printing the identification part of a record on an instrument from type characters on a device, a variable printer for printing numerical accounting data, means for setting up the variable printer to print the numerical accounting data part of the record on said instrument under the sole control of the control means on the device bearing the type characters from which the identification is printed on the instrument, each of said printing means and the variable printer operating to print at a predetermined position on said instruments, operating means for each of said printing means and said variable printer, means for operating the operating means for each of said printing means in timed relation with each other to insure proper positioning of the impressions made by the said printing means and the said variable printer on the instruments, means selectively controlling operation of the printing means other than the form printing means without interrupting the timed relation thereof, and other means selectively controlling operation of the variable printer also without interrupting the timed relation thereof, and means for selectively controlling impression operations of the form printing means.

32. In a machine for preparing business instruments, and through which unitary printing and control devices for producing records are fed, each of said devices including type characters for producing the identification part of the record and control means for producing the numerical accounting data part of the record, means for printing the form on the instruments, means for printing the changeable but reoccurring data on the instruments, means for feeding unitary printing and control devices for producing records through the machine, each of said devices including type characters for producing the identification part of the record and control means for producing the numerical accounting data part of the record, printing means for printing the identification part of a record on an instrument from type characters on a device, a variable printer for printing numerical accounting data, means for setting up the variable printer to print the numerical accounting data part of the record on said instrument under the sole control of the control means on the device bearing the type characters from which the identification is printed on the instrument, each of said printing means and the variable printer operating to print at a predetermined position on said instruments, operating means for each of said printing means and said variable printer, means for operating the operating means for each of said printing means in timed relation with each other to insure proper positioning of the impressions made by the said printing means and the said variable printer on the instruments, means selectively controlling operation of the printing means other than the form printing means without interrupting the timed relation thereof, other means selectively controlling operation of the variable printer also without interrupting the timed relation thereof, the means for controlling operation of the changeable but reoccurring data printing means being controlled from the variable printer, and means for selectively controlling impression operations of the form printing means.

33. In a machine through which are fed unitary printing and control devices having type characters and control means thereon, a calculating mechanism, means for effecting operation of said calculating mechanism, means cooperating with the control means on said devices for determining operation of the means controlling operation of the calculating mechanism, settable printing means under the control of the calculating mechanism for printing an impression on a blank when said settable printing means is set up by operation of said calculating mechanism, and other printing means for printing an impression directly on the blank from the type characters on the particular one of said devices carrying the control means under the control of which the calculating mechanism operated to set up the settable printing means to produce the impression on the blank.

34. In a machine through which are fed unitary printing and control devices having type characters and control means thereon, a calculating mechanism, means for effecting operation of said calculating mechanism, means cooperating with the control means on said devices for determining operation of the means controlling operation of the calculating mechanism, settable printing means under the control of the calculating mechanism for printing an impression on a blank when said settable printing means is set up by operation of said calculating mechanism, other printing means for printing an impression directly on the blank from the type characters on the particular one of said devices carrying the control means under the control of which the calculating mechanism operated to set up the settable printing means to produce the impression on the blank, and means for feeding the blank from one of said printing means to the other printing means intermediate impression operations thereof.

35. In a machine through which are fed unitary printing and control devices having type characters and control means thereon, a calculating mechanism, means for effecting operation of said calculating mechanism, means cooperating with the control means on said device for determining operation of the means controlling operation of the calculating mechanism, settable printing means under the control of the calculating mechanism for printing an impression on a blank when said settable printing means is set up by operation of said calculating mechanism, other printing means for printing an impression directly on the blank from the type characters on the particular one of said devices carrying the control means under the control of which the calculating mechanism operated to set up the settable printing means to produce the impression on the blank, means for feeding the blank from one of said printing means to the other printing means intermediate impression operations thereof, and means for operating said printing means one after the other and operating to effect operation of a printing means at the time the sheet is associated therewith.

36. In a machine through which are fed unitary printing and control devices comprising a carrier having permanently reproducible type characters and a control card thereon and wherein the carrier and card have aligned openings positioned and arranged to constitute control means for producing numerical accounting data, a calculating mechanism, means for effecting operation of said calculating mechanism, and means cooperating with the control means on said devices for determining operation of the means effecting operation of the calculating mechanism.

37. In a machine through which are fed unitary printing and control devices comprising a carrier having permanently reproducible type characters and a control card thereon and wherein the carrier and card have aligned openings positioned and arranged to constitute control means for producing numerical accounting data, a calculating mechanism, means for effecting operation of said calculating mechanism, means cooperating with the control means on said devices for determining operation of the means effecting operation of the calculating mechanism, and means controlled by said printing and control devices for selectively operating said calculating mechanism.

38. In a machine through which are fed unitary printing and control devices comprising a carrier having permanently reproducible type characters and a control card thereon and wherein the carrier and card have aligned openings positioned and arranged to constitute control means for producing numerical accounting data, a mechanism for preparing a record, means for effecting operation of said record preparing mechanism, and means cooperating with the control means on the printing and control devices for determining operation of said record preparing mechanism.

39. In a machine through which are fed unitary printing and control devices comprising a carrier having permanently reproducible type characters and a control card thereon and wherein the carrier and card have aligned openings positioned and arranged to constitute control means for producing numerical accounting data, a mechanism for preparing a record, means for effecting operation of said record preparing mechanism, means cooperating with the control means on the printing and control devices for determining operation of said record preparing mechanism, and means controlled by said printing and control devices for selectively operating said record preparing mechanism.

40. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices, and means controlled by cooperation with the control means on said devices for determining the operation of said adding mechanism.

41. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices, means controlled by cooperation with the control means on said devices for determining the operation of said adding mechanism, and means under control of the printing and control devices for selectively operating said adding mechanism whereby a total will be accumulated under control of control means on only selected ones of said devices.

42. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices and including means for preparing a record of data accumulated in said machine, and means controlled by cooperation with the control means on said devices for determining the operation of said adding mechanism and the record preparing means thereof.

43. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices and including means for preparing a record of data accumulated in said machine, means controlled by cooperation with the control means on said devices for determining the operation of said adding mechanism and the record preparing means thereof, and means under control of the printing and control devices for selectively operating said adding mechanism and the record preparing means thereof whereby a total will be accumulated and a record prepared under control of control means on only selected ones of said devices.

44. In a machine through which are fed unitary printing and control devices comprising a carrier having permanently reproducible type characters and a control card thereon and wherein the carrier and card have aligned openings positioned and arranged to constitute control means for producing numerical accounting data, means operable by the control means on the devices, means for setting up said operable means, means cooperating with the control means for determining the operation of the setting up means, and printing means for making impressions directly from the type characters on said devices.

45. In a machine through which are fed unitary printing and control devices comprising a carrier having permanently reproducible type characters and a control card thereon and wherein the carrier and card have aligned openings positioned and arranged to constitute control means for producing numerical accounting data, means operable by the control means on the devices, means for setting up said operable means, means cooperating with the control means for determining the operation of the setting up means, printing means for making impressions directly from the type characters on said devices, and means controlled by said printing and control devices for selectively operating said operable means and said printing means whereby said operable means will be operated by, and said printing means will make impressions from, only selected ones of said devices.

46. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices, means controlled by cooperation with the control means on said devices for determining the operation of said adding mechanism, and printing means for making impressions directly from the type characters on said devices.

47. In a machine through which are fed unitary printing and control devices comprising a carrier having permanently reproducible type characters and a control card thereon and wherein the carrier and card have aligned openings positioned and arranged to constitute control means for producing numerical accounting data, an adding mechanism for accumulating the total of the numerical accounting data on said devices and including means for preparing a record of data accumulated in said machine, means controlled by cooperation with the control means on said devices for determining the operation of said adding mechanism and the record preparing means thereof, and printing means for making impressions directly from the type characters on said devices.

48. In a machine through which are fed unitary printing and control devices comprising a carrier having permanently reproducible type characters and a control card thereon and wherein the carrier and card have aligned openings positioned and arranged to constitute control means for producing numerical accounting data, a variable printer, a calculating mechanism, means for setting up both the variable printer and the calculating mechanism, and means cooperating with the control means on said printing and control devices for determining the operation of the setting up means.

49. In a machine through which are fed unitary printing and control devices comprising a carrier having permanently reproducible type characters and a control card thereon and wherein the carrier and card have aligned openings positioned and arranged to constitute control means for producing numerical accounting data, a variable printer, a calculating mechanism, means for setting up both the variable printer and the calculating mechanism, means cooperating with the control means on said printing and control devices for determining the operation of the setting up means, and means under control of the printing and control devices for selectively operating the variable printer and calculating mechanism whereby only selected ones of said devices determine operation of the setting up means.

50. In a machine through which are fed unitary printing and control devices comprising a carrier having permanently reproducible type characters and a control card thereon and wherein the carrier and card have aligned openings positioned and arranged to constitute control means for producing numerical accounting data, a variable printer, a calculating mechanism, means for setting up both the variable printer and the calculating mechanism, means cooperating with the control means on said printing and control devices for determining the operation of the setting up means, and printing means for making impressions directly from the printing and control devices.

51. In a machine through which unitary printing and control devices having control means and type characters thereon are sequentially fed, settable printing means operable directly by the control means on the devices, means for setting up said settable printing means, means cooperating with the control means for determining operation of the setting up means, and other printing means for producing impressions directly from the type characters on said devices.

52. In a machine through which unitary printing and control devices having control means and type characters thereon are sequentially fed, settable printing means operable directly by the control means on the devices, means for setting up said settable printing means, means cooperating with the control means for determining operation of the setting up means, other printing means for producing impressions directly from the type characters on said devices, and means controlled by said printing and control devices for selectively effecting operation of both said printing means.

53. In a machine through which unitary printing and control devices having control means, type characters and identifying means thereon are sequentially fed, settable printing means operable directly by the control means on the devices, means for setting up said settable printing means, means cooperating with the control means for determining operation of the setting up means, other printing means for producing impressions directly from the type characters on said devices, and means controlled by the identifying means on said printing and control devices for selectively effecting operation of both said printing means.

54. In a printing machine through which unitary printing and control devices or the like are sequentially fed, means for successively feeding sheets through the machine, printing means for making impressions on the sheets as they pass through the machine, means for interrupting movement of the sheets prior to passage thereof into the printing means, and means for interrupting operation of the printing means upon failure of a sheet to move into engagement with the interrupting means.

55. In a printing machine through which unitary printing and control devices having identifying means thereon are sequentially fed, printing means for making impressions from said devices, means for feeding sheets to said printing means, selective means adapted for cooperation with said identifying means and operable to interrupt the feeding of sheets to said printing means upon predetermined cooperation of the selector means with the identifying means, and detecting means under control of sheets passing to said printing means and operable to interrupt operation of the printing means whenever a sheet is not fed to said printing means.

56. In a safety device for use in a machine having a guideway through which unitary printing and control devices are fed, the devices having control cards thereon, means under the control of the control cards on said devices for controlling operation of the machine, and means cooperating with the devices and the cards thereon for determining operation of the machine operation controlling means and including a movable detector member, and means for preventing the machine operation controlling means from effecting an operation of the machine when said detector member does not engage a card on a control device.

57. In a safety device for use in a printing machine having a guideway through which unitary printing and control devices are fed, the devices having control cards thereon, means under the control of the control cards on said devices for controlling operation of the machine, and means cooperating with the devices and the cards thereon for determining operation of the machine operation controlling means and including a movable detector member, means for locking said detector member when said detector member does not engage a control card on a printing and control device moved into cooperative relation with said detector member, and means for preventing the machine operation controlling means from effecting an operation of the machine when said detector member does not engage a card on a printing and control device.

58. A safety device for use in a machine through which control devices are fed, the devices having control cards thereon and positioning means with which the control cards are engaged to be properly positioned on the devices, and means in the machine engageable with the cards to force the cards toward the positioning means on the devices and thereby insure proper positioning of the cards on the devices.

59. A safety device for use in a machine through which control devices are fed, the devices having control cards thereon, detecting means, means for moving said detecting means into cooperation with the cards on said devices, and means under control of said detecting means for interrupting operation of the machine whenever said detecting means does not engage a control card in one of said devices.

60. A safety device for use in a machine through which control devices are fed, the devices having control cards thereon, detecting means, means for moving said detecting means into cooperation with the cards on said devices, means under control of said detecting means for interrupting operation of the machine whenever said detecting means does not engage a control card in one of said devices, and means operable for preventing further operations of the machine upon operation of said means for interrupting operation of the machine when said interrupting means is operated by said detecting means.

61. A safety device adapted for use in a machine through which printing and control or like devices each of which is adapted to carry a record-bearing member are sequentially fed, said safety device comprising detecting means, means for moving said detecting means into sensing cooperation with said printing and control or like devices to determine the presence or absence of a record-bearing member thereon, and means under the control of said detecting means for interrupting operation of the machine with which said safety device is associated in the absence of a record-bearing member on one of said printing and control or like devices.

62. A safety device adapted for use in a machine through which printing and control or like devices each of which is adapted to carry a record-bearing card are sequentially fed, said safety device comprising detecting means, means for moving said detecting means into sensing cooperation with said printing and control or like devices to determine the presence or absence of a record-bearing card thereon, and means under the control of said detecting means for interrupting operation of the machine with which said safety device is associated in the absence of a record-bearing card on one of said printing and control or like devices.

63. In a safety device adapted for use with a printing mechanism through which printing and control or like devices are sequentially fed to have impressions made therefrom by said printing mechanism, detecting means for determining the presence or absence of a sheet in predetermined relation with the printing mechanism, and means under control of said detecting means for preventing operation of said printing mechanism when a sheet is not in said predetermined relation with said printing mechanism.

64. In a printing machine through which unitary printing and control or like devices are fed, a platen for making impressions on sheets fed through the machine, electrically operated means for regulating the operation of said platen, detecting means for determining the presence or absence of a sheet in a predetermined position relative to said platen, and means under control of said detecting means for determining operation of said electrically operated means and operable to effect operation of said electrically operated means to prevent operation of said platen when a sheet is not in said predetermined relation with said platen.

65. In a printing machine, means for sequentially feeding printing or like devices therethrough in a step-by-step manner, a platen for making impressions from said printing or like devices during at rest intervals in the step-by-step movement thereof, means for feeding sheets through the machine past said platen to have impressions made thereon by said platen from said printing devices, and means for preventing operation of said platen in the absence of a sheet therebelow.

66. In a printing machine, means for sequentially feeding printing or like devices therethrough in a step-by-step manner, a platen for making impressions from said printing or like devices during at rest intervals in the step-by-step movement thereof, means for feeding sheets through the machine past said platen to have impressions made thereon by said platen from said printing devices, and means operable to prevent an operation of said platen in the absence of a sheet therebelow without interrupting operation of the means for sequentially feeding printing and like devices through the machine whereby a printing device is passed through the machine without having an impression made therefrom when a sheet is not fed into printing relation with said platen by said sheet feeding means.

67. In a printing machine, means for sequentially feeding printing or like devices therethrough in a step-by-step manner, a platen for making impressions from said printing or like devices during at rest intervals in the step-by-step movement thereof, means for feeding sheets through the machine past said platen to have impressions made thereon by said platen from said printing devices, means operable to prevent an operation of said platen in the absence of a sheet therebelow without interrupting operation of the means for sequentially feeding printing and like devices through the machine whereby a printing device is passed through the machine without having an impression made therefrom when a sheet is not fed into printing relation with said platen by said sheet feeding means, and means under control of said printing or the like devices for interrupting operation of said sheet feeding means when an impression is not to be made from a particular printing or like device.

68. In a machine through which unitary printing and control devices for producing records are fed, each of said devices including a carrier having a control card thereon and the said carrier and control card being provided with aligned openings constituting control means arranged in a system wherein the data is divided into classes, detecting means in the machine for cooperation with said control means, and means controlled by the said detecting means and operable to produce data according to the said classes.

69. In a machine through which unitary printing and control devices for producing records are fed, each of said devices including a carrier having a control card thereon and the said carrier and control card being provided with aligned openings constituting control means arranged in a system wherein the data is divided into classes, detecting means in the machine including shiftable means, and means controlled by said shiftable means and operable to produce data according to the said classes.

70. In a machine through which unitary printing and control devices for producing records are fed, each of said devices including a carrier having a control card thereon and the said carrier and control card being provided with aligned openings constituting control means arranged in a system wherein the data is divided into classes, detecting means in the machine including shiftable means for cooperation with the said control means, means in the machine for producing the data under control of the control means on said devices, means for operating the data producing means, and means responsive to the shiftable means and the classification of the data for determining the operation of the operating means for the data producing means.

71. In a machine through which unitary printing and control devices for producing records are fed, each of said devices including a carrier having a control card thereon and the said carrier and control card being provided with aligned openings constituting control means arranged in a system wherein the data is divided into classes, detecting means in the machine including shiftable means, means in the machine for producing the data under the sole control of the control means, means for operating the data producing means, and means responsive to the shiftable means and the classification of the data for determining the operation of the operating means for the data producing means.

72. In a machine through which control devices or the like each bearing a numerical record are sequentially fed for controlling operations in the machine, each of said control devices being provided with openings and said openings representing numerical records carried by said control devices, said machine including means responsive to openings in predetermined positions on said control devices for producing records of the even-numbered digits of the numerical records represented by said openings, said machine also including means responsive to openings in the aforesaid positions and to openings in another position for producing records of all of the odd-numbered digits of said numerical records except one, and additional means in said machine responsive to openings in the aforesaid other position for producing records of said one odd-numbered digit.

73. In a machine through which control devices or the like each bearing a numerical record are sequentially fed for controlling operations in the machine, each of said control devices being provided with openings and said openings representing numerical records carried by said control devices, said machine including means responsive to a predetermined number of said openings in said control devices for producing records of the even-numbered digits of the numerical records represented by said openings, said machine also including means responsive to another and different number of openings in said control devices for providing records of the odd-numbered digits, other than the digit 9, of the said numerical records represented by the said openings in said control devices, and further means in said machine responsive to the same number of openings as the means producing records of the even numbered digits and operable to produce records of the digit 9.

74. In a machine through which control devices or the like each bearing a numerical record are sequentially fed for controlling operations in the machine, each of said control devices being provided with openings and said openings representing numerical records carried by said control devices, said machine including means responsive to openings in predetermined positions on said control devices for producing records of the digits 2, 4, 6 and 8 of the numerical records represented by said openings, said machine also including means responsive to openings in the aforesaid positions and to openings in another position for producing records of the digits 1, 3, 5 and 7, and additional means in said machine responsive to openings in the aforesaid other position for producing records of the digit 9.

75. In a machine through which control devices or the like each bearing a numerical record are sequentially fed for controlling operations in the machine, each of said control devices being provided with openings and said openings representing numerical records carried by said control devices, said machine including means responsive to a predetermined number of openings in one of said control devices for producing a record of the odd-numbered digits 1, 3, 5 and 7 of the numerical records represented by said openings, and said machine also including means responsive to another and different number of openings in said control devices for producing a record of the even-numbered digits 2, 4, 6 and 8 and of the odd-numbered digit 9 of the records represented by said openings.

76. In a printing machine for making impressions from and under control of a unitary printing and control device bearing a record and which device includes a carrier having permanently reproducible type characters thereon constituting part of the record, and which device has a replaceable control card on the carrier having aligned openings therein positioned and arranged to constitute another part of the record on the device, printing means for making an impression directly from the type characters on said device, and other means under control of the openings in the control card for producing another part of the said record.

77. In a printing machine for making impressions from and under control of a unitary printing and control device bearing a record and which device includes a carrier having permanently reproducible type characters thereon constituting part of the record, and which device has a replaceable control card on the carrier having aligned openings therein positioned and arranged to constitute another part of the record on the device, printing means for making an impression on a sheet directly from the type characters on the device to thereby produce part of the record on the said device on the said sheet, and other means under the sole control of the openings in the card for producing another part of the said record on the sheet.

78. In a printing machine for making impressions from and under control of a unitary printing and control device bearing a record and which device includes a carrier having permanently reproducible type characters thereon constituting part of the record, and which device has a replaceable control card on the carrier having aligned openings therein positioned and arranged to constitute another part of the record on the device, printing means for making an impression on a sheet directly from the type characters on the device to thereby produce part of the record on the said device on the said sheet, other means under control of the openings in the card for producing another part of the said record on the sheet, and means for positioning the sheet in the printing means and in the said other means during record-producing operations of the said printing means and the said other means.

79. In a printing machine through which unitary printing and control devices are fed, each of said devices including a carrier having permanently reproducible type characters thereon from which part of a record may be produced directly and having a control card thereon in which there is at least one opening positioned and arranged to control the production of another part of the record, printing means constructed and arranged to print part of the record directly from the type characters on one of said devices, and other means for producing another part of the record under the sole control of an opening or openings in the control card of the device.

80. In a printing machine through which unitary printing and control devices are fed, each of said devices including a carrier having permanently reproducible type characters thereon from which part of a record may be produced directly and having a control card thereon in which there is at least one opening positioned and arranged to control the production of another part of the record, printing means constructed and arranged to print part of the record directly from the type characters on one of said devices, and other printing means for printing another part of the record under the sole control of an opening or openings in the control card of the device.

81. In a machine through which unitary printing and control devices for producing records are fed, each of said devices including a carrier having a control card thereon, wherein openings may be arranged pursuant to a system under which data to be produced is divided into classes, detecting means in the machine and adapted for cooperation with the openings in the control cards, and means controlled by said detecting means under the direct control of the control means on said devices and operable to produce data according to said classes.

82. In a machine through which unitary printing and control devices for producing records are fed, each of said devices including a carrier having a control card thereon, wherein openings may be arranged pursuant to a system under which data to be produced is divided into classes, data-producing means, means under the sole control of the openings in the control cards on said carrier for effecting operation of said data-producing means, selecting means for said operation-effecting means, and detecting means adapted for cooperation with the openings and determining operation of the selecting means in accordance with the class of data represented by openings with which the detecting means cooperates in a particular operation thereof.

83. In a machine for preparing business instruments, and through which unitary printing and control devices for producing records are fed, each of said devices including type characters for producing the identification part of the record and control means for producing the numerical accounting data part of the record, means for printing the form on the instruments, means for printing an identification on each instrument, other means under the direct control of the control means on said devices for printing numerical accounting data on the instruments, each of said printing means operating to print at a predetermined position on each of said instruments, operating means for each of said printing means, and means for operating the operating means for each of said printing means in timed relation with each other to insure proper positioning of the impressions made by the respective printing means on the said instruments.

84. In a machine for preparing business instruments, and through which unitary printing and control devices for producing records are fed, each of said devices including type characters for producing the identification part of the record and control means for producing the numerical accounting data part of the record, means for printing the changeable but reoccuring data on the instruments, means for printing an identification on each instrument, other means under the direct control of the control means on said devices for printing numerical occurring data on the instruments, each of said printing means operating to print at a predetermined position on each of said instruments, operating means for each of said printing means, and means for operating the operating means for each of said printing means in timed relation with each other to insure proper positioning of the impressions made by the respective printing means on the said instruments.

85. In a machine through which are fed unitary printing and control devices comprising a carrier having permanently reproducible type characters and a control card thereon and wherein the card has at least one opening therein positioned and arranged to constitute control means, a calculating mechanism, means for effecting operation of said calculating mechanism, and means cooperating with and under the sole control of the control means on said devices for determining operation of the means effecting operation of the calculating mechanism.

86. In a machine through which are fed unitary printing and control devices comprising a carrier having permanently reproducible type characters and a control card thereon and wherein the card has at least one opening therein positioned and arranged to constitute control means, a calculating mechanism, means for effecting operation of said calculating mechanism, means cooperating with and under the sole control of the control means on said devices for determining operation of the means effecting operation of the calculating mechanism, and means controlled by said printing and control devices for selectively operating said calculating mechanism.

87. In a machine through which are fed unitary printing and control devices comprising a carrier having permanently reproducible type characters and a control card thereon and wherein the card has at least one opening therein positioned and arranged to constitute control means, a mechanism for producing a record, means for effecting operation of said record-producing mechanism, and means cooperating with and under the sole control of the control means on the printing and control device for determining operation of said record-producing mechanism.

88. In a machine through which are fed unitary printing and control devices comprising a carrier having permanently reproducible type characters and a control card thereon and wherein the card has at least one opening therein positioned and arranged to constitute control means, a mechanism for producing a record, means for effecting operation of said record-producing mechanism, means cooperating with and under the sole control of the control means on the printing and control device for determining operation of said record-producing mechanism, and another record-producing means adapted for cooperation with said permanently reproducible type characters and operable to produce records directly from said type characters.

89. In a machine through which are fed unitary printing and control devices comprising a carrier having permanently reproducible type characters and a control card thereon and wherein the card has at least one opening therein positioned and arranged to constitute control means, means operable under control of the control means on the devices, means for setting up said operable means, means cooperating with and under the sole control of the control means on said devices for determining the operation of the said setting up means, and printing means for making impressions directly from the type characters on said devices.

90. In a machine through which are fed unitary printing and control devices comprising a carrier having permanently reproducible type characters and a control card thereon and wherein the card has at least one opening therein positioned and arranged to constitute control means, means operable under control of the control means on the devices, means for setting up said operable means, means cooperating with and under the sole control of the control means on said devices for determining the operation of the said setting up means, printing means for making impressions directly from the type characters on said devices, and means controlled by said printing and control devices for selectively operating said operable means and said printing means whereby said operable means will be operated under control of, and said printing means will make impressions directly from, only selected ones of said devices.

91. In a machine through which are fed unitary printing and control devices comprising a carrier having permanently reproducible type characters and a control card thereon and wherein the card has at least one opening therein positioned and arranged to constitute control means, a variable printer, means for setting up said variable printer, and means cooperating with and under the direct control of the control means on the printing and control devices for determining operation of the setting up means.

92. In a machine through which are fed unitary printing and control devices comprising a carrier having permanently reproducible type characters and a control card thereon and wherein the card has at least one opening therein positioned and arranged to constitute control means, a variable printer, means for setting up said variable printer, means cooperating with and under the direct control of the control means on the printing and control devices for determining operation of the setting up means, and printing means for making impressions directly from the type characters on said devices.

93. In a machine through which are fed unitary printing and control devices comprising a carrier having permanently reproducible type characters and a control card thereon and wherein the card has at least one opening therein positioned and arranged to constitute control means, a variable printer, a calculating mechanism, means for setting up both the variable printer and the calculating mechanism, and means cooperating with and under the direct control of the control means on the printing and control devices for determining operation of the setting up means.

94. In a machine through which are fed unitary printing and control devices comprising a carrier having permanently reproducible type characters and a control card thereon and wherein the card has at least one opening therein positioned and arranged to constitute control means, a variable printer, a calculating mechanism, means for setting up both the variable printer and the calculating mechanism, means cooperating with and under the direct control of the control means on the printing and control devices for determining operation of the setting up means, and printing means for making impressions directly from the type characters on said devices.

95. In a printing machine, means for feeding a sequence of unitary printing and control devices each bearing printing means and variable data-representing control means into sensing and printing positions in the machine, means under the control of the control means on said devices when said devices are in sensing position for printing variable data upon a sheet, and means cooperating with the printing means on said devices when said devices are in printing position for printing additional data upon said sheet.

96. In a printing machine, means for sequentially feeding unitary printing and control devices each bearing printing means and variable data-representing control means into sensing and printing positions in the machine, a variable printer including settable printing members, means under the control of the control means on said devices when said devices are in sensing position for setting up said settable printing members to print variable data upon a sheet in the machine, and means cooperating with the printing means on said devices when said devices are in printing position for printing other data directly upon said sheet.

97. In a printing machine, means for sequentially feeding unitary printing and control devices each bearing printing means and variable data-representing control means successively into sensing and printing positions in the machine, a variable printer including settable printing members, means under the direct control of the control means on said devices when said devices are in sensing position for setting up said settable printing members to print variable data upon a sheet in the machine, and means cooperating with the printing means on said devices when said devices are in printing position for printing other data directly upon said sheet.

98. In a printing machine, means for sequentially feeding unitary printing and control devices each bearing printing means and variable data-representing control means successively into sensing and printing positions in the machine, a variable printer including settable printing members, means under the sole control of the control means on said devices when said devices are in sensing position for setting up said settable printing members to print variable data upon a sheet in the machine, and means cooperating with the printing means on said devices when said devices are in printing position for printing other data directly upon said sheet.

99. In a printing machine, means for sequentially feeding unitary printing and control devices each bearing printing means and control means into sensing and printing positions in the machine, means for feeding a web into the machine, means for printing changeable data upon a portion of said web, means for severing the printed portion of said web from the body thereof, means under the control of the control means on said unitary printing and control devices when said devices are in sensing position for printing variable data upon the printed and severed portion of said web, and means cooperating with the printing means on said printing and control devices when said devices are in printing position to print additional data directly upon the said printed and severed portion of said web.

100. In a printing machine, means for successively feeding unitary printing and control devices each bearing printing means and control means into a plurality of different positions in the machine, means under the control of the control means on said devices when said devices are in one of said positions for printing variable data upon a blank in the machine, and means cooperating with the printing means on said printing and control devices when said devices are in a different one of said positions for printing other data directly upon said blank.

101. In a printing machine, means for successively feeding unitary printing and control devices each bearing printing means and control means into a plurality of different positions in the machine, means under the direct control of the control means on said devices when said devices are in one of said positions for printing variable data upon a blank in the machine, and means cooperating with the printing means on said printing and control devices when said devices are in a different one of said positions for printing other data directly upon said blank.

102. In a printing machine, means for successively feeding unitary printing and control devices each bearing printing means and control means into a plurality of different positions in the machine, means under the sole control of the control means on said devices when said devices are in one of said positions for printing variable data upon a blank in the machine, and means cooperating with the printing means on said printing and control devices when said devices are in a different one of said positions for printing other data directly upon said blank.

103. In a printing machine, means for feeding a web into the machine along a predetermined path, means for printing changeable data upon a portion of said web, means for severing the printed portion of said web from the body thereof, a variable printer arranged at one side of said path, means for successively feeding unitary printing and control devices each bearing printing means and control means into sensing and printing positions in the machine, means for feeding the severed portion of said web into the said variable printer in a direction at an angle to and at one side of the said path along which the said web is fed into the machine, means under the control of the control means on said printing and control devices when said devices are in sensing position to print variable data upon the severed portion of said web, means for feeding the severed and printed portion of said web away from the variable printer at an angle to the said path along which said web is fed into the machine and at the opposite side of said path from the side thereof on which said variable printer is located, and means cooperating with the printing means on said devices when said devices are in printing position to print additional data directly upon the severed portion of the web.

104. In a machine for producing business instruments or the like, means for feeding a web into the machine, means for printing identification data relative to business instruments upon a portion of said web, means for severing the said printed portion of said web from the body thereof to provide a sheet to be formed into a business instrument, means for sequentially feeding unitary printing and control devices each bearing printing means and control means into sensing and printing positions in the machine, means under the control of the control means on said devices when said devices are in sensing position for printing variable numerical amount data upon said sheet, and means cooperating with the printing means on said printing and control devices when said devices are in printing position for printing additional identification data directly upon said sheet.

105. In a machine for producing business instruments or the like, means for feeding a web into the machine, means for printing identification data relative to business instruments upon a portion of said web, means for severing the said printed portion of said web from the body thereof to provide a sheet to be formed into a business instrument, means for sequentially feeding unitary printing and control devices each bearing printing means and control means into sensing and printing positions in the machine, means under the direct control of the control means on said devices when said devices are in sensing position for printing variable numerical amount data upon said sheet, and means cooperating with the printing means on said printing and control devices when said devices are in printing position for printing additional identification data directly upon said sheet.

106. In a machine for producing business instruments or the like, means for feeding a web into the machine, means for printing identification data relative to business instruments upon a portion of said web, means for severing the said printed portion of said web from the body thereof to provide a sheet to be formed into a business instrument, means for sequentially feeding unitary printing and control devices each bearing printing means and control means into sensing and printing positions in the machine, means under the sole control of the control means on said devices when said devices are in sensing position for printing variable numerical amount data upon said sheet, and means cooperating with the printing means on said printing and control devices when said devices are in printing position for printing additional identification data directly upon said sheet.

WALTER T. GOLLWITZER.